US012711763B2

(12) United States Patent
Delp, III et al.

(10) Patent No.: US 12,711,763 B2
(45) Date of Patent: Aug. 18, 2026

(54) METHODS AND APPARATUS FOR VISUAL-AWARE HIERARCHY-BASED OBJECT RECOGNITION

(71) Applicant: Eli Lilly and Company, Indianapolis, IN (US)

(72) Inventors: Edward John Delp, III, West Lafayette, IN (US); Jiangpeng He, West Lafayette, IN (US); Runyu Mao, West Lafayette, IN (US); Zeman Shao, West Lafayette, IN (US); Sri Kalyan Yarlagadda, West Lafayette, IN (US); Fengqing Maggie Zhu, West Lafayette, IN (US)

(73) Assignee: Eli Lilly and Company, Indianapolis, IN (US)

( * ) Notice: Subject to any disclaimer, the term of this patent is extended or adjusted under 35 U.S.C. 154(b) by 346 days.

(21) Appl. No.: 17/997,709

(22) PCT Filed: Apr. 28, 2021

(86) PCT No.: PCT/US2021/029610
§ 371 (c)(1),
(2) Date: Nov. 1, 2022

(87) PCT Pub. No.: WO2021/225842
PCT Pub. Date: Nov. 11, 2021

(65) Prior Publication Data

US 2023/0222821 A1 Jul. 13, 2023

Related U.S. Application Data

(60) Provisional application No. 63/020,571, filed on May 6, 2020.

(51) Int. Cl.
*G06V 20/20* (2022.01)
*G06V 10/20* (2022.01)
(Continued)

(52) U.S. Cl.
CPC ............. *G06V 20/20* (2022.01); *G06V 10/44* (2022.01); *G06V 10/454* (2022.01);
(Continued)

(58) Field of Classification Search
CPC ...... G06V 20/20; G06V 20/70; G06V 10/454; G06V 10/761; G06V 10/82; G06V 20/68; G06V 10/255; G96V 10/762
See application file for complete search history.

(56) References Cited

U.S. PATENT DOCUMENTS 6,508,762 B2 1/2003 Karnieli
8,439,683 B2 5/2013 Puri et al.
(Continued)

FOREIGN PATENT DOCUMENTS

JP 2008097607 A 4/2008
JP 2014093058 A 5/2014
WO 2018232378 12/2018

OTHER PUBLICATIONS

Zhao, T., Zhang, B., He, M., Zhang, W., Zhou, N., Yu, J., & Fan, J. (2018). Embedding visual hierarchy with deep networks for large-scale visual recognition. IEEE Transactions on Image Processing, 27(10), 4740-4755. (Year: 2018).*
(Continued)

*Primary Examiner* — David Perlman
(74) *Attorney, Agent, or Firm* — Arthur Shum

(57) ABSTRACT

The techniques described herein relate to computerized methods and apparatus for grouping images of objects based on semantic and visual information associated with the objects. The techniques described herein further relate to computerized methods and apparatus for training a machine learning model for object recognition.

21 Claims, 30 Drawing Sheets

(51) Int. Cl.

| | |
|---|---|
| ***G06V 10/44*** | (2022.01) |
| ***G06V 10/74*** | (2022.01) |
| ***G06V 10/762*** | (2022.01) |
| ***G06V 10/82*** | (2022.01) |
| ***G06V 20/68*** | (2022.01) |
| ***G06V 20/70*** | (2022.01) |

(52) U.S. Cl.

CPC .......... *G06V 10/761* (2022.01); *G06V 10/762* (2022.01); *G06V 10/82* (2022.01); *G06V 20/70* (2022.01); *G06V 10/255* (2022.01); *G06V 20/68* (2022.01)

(56) References Cited

U.S. PATENT DOCUMENTS

| | | | |
|---|---|---|---|
| 8,625,889 | B2 | 1/2014 | De Oliveira et al. |
| 9,042,596 | B2 | 5/2015 | Connor |
| 9,053,392 | B2 | 6/2015 | Yang et al. |
| 9,424,495 | B1 | 8/2016 | Trevino |
| 9,659,225 | B2 | 5/2017 | Suresh et al. |
| 9,734,426 | B2 | 8/2017 | Divakaran et al. |
| 9,892,501 | B2 | 2/2018 | Dehais et al. |
| 10,817,778 | B2 | 10/2020 | Baughman et al. |
| 2008/0089591 | A1 | 4/2008 | Zhou et al. |
| 2010/0249530 | A1 | 9/2010 | Rankers et al. |
| 2017/0061821 | A1 | 3/2017 | Choi et al. |
| 2017/0128007 | A1 | 5/2017 | Hayter et al. |
| 2018/0018825 | A1 | 1/2018 | Kim et al. |
| 2018/0089540 | A1 | 3/2018 | Merler et al. |
| 2018/0122063 | A1 | 5/2018 | Dehais et al. |
| 2018/0197628 | A1 | 7/2018 | Wei et al. |
| 2018/0232689 | A1 | 8/2018 | Minvielle et al. |
| 2021/0342643 | A1* | 11/2021 | Bai ..................... G06F 18/2148 |

OTHER PUBLICATIONS

Wang, et al, "Context Based Image Analysis With Application in Dietary Assessment and Evaluation", HHS Public Access, Multimed Tools Appl., 2018, August; 77(15): 19769-19794.

Alsmadi, M., *Query-Sensitive Similarity Measure for Content-Based Image Retrieval Using Metaheuristic Algorithm*, Journal of King Saud University-Computer and Information Sciences 30, No. 3: 373-381, Jul. 1, 2018; retrieved Oct. 2, 2022 from the internet at https://www.sciencedirect.com/science/article/pll/S1619157817300022.

Anthimopolous, et al., *A Food Recognition System for Diabetic Patients Based on an Optimized Bag-of-Features Model*, IEEE Journal of Biomedical and Health Informatics, vol. 18, No. 4, Jul. 2014, pp. 1261-1271; retrieved Oct. 2, 2022 from the internet at https://ieeexplore.ieee.org/slamp/slamp.jsp?arnumber=6762879.

Anthimopolous, et al., *Computer Vision-Based Carbohydrate Estimation for Type 1 Patients With Diabetes Using Smartphones*, J. Diabetes Science and Technology, vol. 9(3), pp. 507-515, retrieved Oct. 2, 2022 from the Internet at: https://journals.sagepub.com/doi/pdf/10.1177/1932295815580159..

Bosch, et al., *Combining Global and Local Features for Food Identification in Dietary Assessment*, IEEE Trans Image Process. Author manuscript available in PMC Aug. 6, 2014; retrieved Oct. 2, 2022 from the Internet at https://www.ncbi/nlm.nib.gov/proc/articles/PMC4123454/pdf/nhms327443.pdf.

Fang, Shaobo, et al., *cTADA: The Design of a Crowdsourcing Tool for Online Food Image Identification and Segmentation*, 2018 IEEE Southwest Symposium on Image Analysis and Interpretation (SSIAI), 2018, pp. 25-28.

Kawano, Y., et al., *Automatic Expansion of a Feed Image Dataset Leveraging Existing Categories With Domain Adaptation*, European Conference on Computer Vision (ECCV) Workshops (2014), pp. 3-17.

Kawano, Y., et al., Real-time Food Recognition System on a Smartphone, retrieved Oct. 2, 2022 from the internet at http://img.cs.uec.ac.jp/e/doc/foodcam.pdf.

Liu, C., et al., *DeepFood: Deep Learning-based Food Image Recognition for Computer-aided Dietary Assessment*, The University of Massachusetts Lowell, One University Avenue, Lowell, MA 01854, retrieved on Oct. 2, 2022 from the internet at https://arxiv.org/ftp/arxiv/papers/1606/1506.05675.pdf.

Lu, Y., *Food Image Recognition by Using Convolutional Neural Networks* (*CNNs*), Retrieved on Oct. 2, 2022 from the Internet at https://arxiv.org/pdf/1612.00983.pdf.

Marin, J., et al., *Recipe 1M+: A Dataset for Learning Cross-Modal Embeddings for Cooking Recipes and Food Images*, IEEE Transactions on Pattern Analysis and Machine Intelligence, vol. X, No. X, Month Year; retrieved on Oct. 2, 2022 from the internet at https://arxiv.org/pdf/1810.08553.pdf.

Meyers, A., et al., *Im2Calories: towards an Automated Mobile Vision Food Diary*, Proceedings of the IEEE International Conference 2015; retrieved Oct. 2, 2022 from the internet at https://openaccess.thecvf.com/content_iccv_2015/papers/Meyers_Im2Calories_Towards_an_ICCV_2015_paper.pdf.

SNAQ Product advertisement, *Intelligent Food Recognition for your Business*, accessed Oct. 2, 2022 at https://www.snaq_io/#product.

Wang, Yu, et al., *Weakly Supervised Food Image Segmentation Using Class Activation Maps*, 2017 IEEE International Conference on Image Processing (ICIP), 2017, pp. 1277-1281.

Zhang, et al., "*Snap-n-Eat*": *Food Recognition and Nutrition Estimation on a Smartphone*, J. Diabetes Science and Technology, vol. 9(3), pp. 525-533, 2015, retrieved Oct. 2, 2022 from the internet at https://journals.sagepub.com/doi/pdf/10.1177/1932296815582222.

Patent Cooperation Treaty International Search Report pertaining to International Application No. PCT/US2021/029610; International Filing Date: Apr. 28, 2021; Date of Mailing: Jul. 21, 2021.

Patent Cooperation Treaty Written Opinion of the International Search Report pertaining to International Application No. PCT/US2021/029610; International Filing Date: Apr. 28, 2021; Date of Mailing: Jul. 21, 2021.

Zheng, et al, Hierarchical Learning of Multi-Task Sparse Metrics for Large-Scale Image Classification , United Kingdom, Jan. 3, 2002, vol. 67, p. 97 /109,http://dx.doi.org/10.1016/j.patcog.2017.01.029, ELSEVIER, 2017.

Udagwa, et al, Visualization Using Food Distance and Personal Food Intake Based on Log Data, Japan, Feb. 28, 2014, Institute of Electronics, Information and Communication Engineers Technical Report,vol. 113 No. 479.

English Machine Translation of Office Action issued in corresponding Japanese Patent Application No. 2023-198297 (filed Nov. 22, 2023 by Eli Lilly and Company), Office Action mailed on Dec. 25, 2024 by the Japanese Patent Office, 4 pages (this is a concise explanation of relevance for Udagwa reference).

Fan Jianping et al: "Hierarchical Learning of Tree Classifiers for Large-Scale Plant Species Identification", IEEE Transactions On Image Processing, IEE Service Center, Piscataway, NJ, US, vol. 24, No. 11, Nov. 2015 (Nov. 2015), pp. 4172-4184, XP011666115, ISSN: 1057-7149, DOI: 10.1109/TIP.2015.2457337 [retrieved on Aug. 11, 2015].

* cited by examiner 100
106
104
102

METHODS AND APPARATUS FOR VISUAL-AWARE HIERARCHY-BASED OBJECT RECOGNITION

BACKGROUND

Many chronic diseases, such as cancer, diabetes, and heart disease, can be linked to diet. However, an accurate assessment of dietary intake is an open and challenging problem. Assessment methods, such as food records, 24-hour dietary recall, and food frequency questionnaires (FFQ), are often prone to biased measurement and can be burdensome to use. There has been a growing popularity of using mobile or wearable computing devices to monitor diet-related behaviors and activities. Advances in computer vision and machine learning have enabled the development of image-based dietary assessment systems that can analyze food images that are captured by mobile and wearable devices to provide estimates of dietary intake. Accurate estimation of dietary intake typically relies on the system's ability to distinguish foods from the image background (e.g., segmentation), to identify (or label) food items (e.g., classification), to estimate food portion size, and/or to understand the context of the eating event. However, many challenges still remain in automating the assessment of dietary intake from images.

SUMMARY

The present disclosure relates to techniques for recognizing objects in images, such as recognizing foods. The techniques include food localization and hierarchical object classification stages that use Neural Networks (NNs), including Convolutional NNs (CNNs), as the backbone architecture. The object localization stage identifies object regions in the images. The object classification stage clusters together visually and/or nutritionally similar object categories to generate a visually-aware and/or a nutritionally-aware hierarchical structure that represents the semantic visual relations among the object categories. According to some embodiments, a multi-task CNN model is used to perform the classification task using the visually-aware hierarchical structure.

In one embodiment, the techniques provide a computerized method for grouping images of objects based on semantic and visual information associated with the objects. The method includes accessing a set of digital images, each digital image comprising an object associated with a semantic category of the object, wherein the semantic category is one of a plurality of semantic categories associated with the set of digital images, and wherein each digital image is labelled with data indicative of the semantic category to which the digital image is associated. The method includes determining, using a trained machine learning model, a visual feature vector for each digital image of the set of digital images, wherein the visual feature vector comprises a value for each of a plurality of visual features. The method includes, for each semantic category of the plurality of semantic categories, calculating, for each visual feature of the plurality of visual features, a probability distribution of the values of the visual feature in the visual feature vectors of each image in the set of digital images associated with the semantic category. The method includes determining, based on the probability distributions, data indicative of similarities between digital images associated with different semantic categories of the plurality of semantic categories. The method includes grouping, based on the data indicative of similarities between the digital images associated with different semantic categories, the plurality of semantic categories into clusters of semantic categories.

In one embodiment, the techniques provide a computerized method for training a machine learning model for object recognition. The method includes accessing a set of digital images, each digital image comprising an object and associated with predetermined label information comprising data indicative of: (a) a predetermined semantic category of the object, wherein the semantic category is one of a plurality of semantic categories associated with the set of digital images, and (b) a predetermined visual feature category of the object, wherein the visual feature category is one of a plurality of visual feature categories, and each of the plurality of visual feature categories are determined based on similarities among visual features of the set of digital images. The method includes classifying, using a machine learning model, the set of digital images to determine predicted label information for each digital image of the set of digital images, comprising: determining, using a first output layer of the machine learning model, a predicted semantic category of the plurality of the semantic categories, and determining, using a second output layer of the machine learning model, a predicted visual feature category of the plurality of the visual feature categories. The method includes training the machine learning model using a loss function, wherein the loss function incorporates data indicative of whether the predicted label information for each digital image is equal to the predetermined label information of the digital image.

In one embodiment, the techniques provide for a computerized method for grouping images of objects based on semantic, visual, and nutritional information associated with the objects. The method includes accessing a set of digital images, each digital image comprising an object associated with a semantic category, wherein the semantic category is one of a plurality of semantic categories associated with the set of digital images, and wherein each digital image is labelled with data indicative of the semantic category to which the digital image is associated. The method includes determining, for each semantic category of the plurality of semantic categories, one or more nutrient values wherein each of the one or more nutrient values is associated with a nutrient category of one or more nutrient categories. The method includes automatically determining, without human input, based on the one or more nutrient values for each semantic category of the plurality of semantic categories, data indicative of nutritional similarities between different semantic categories of the plurality of semantic categories. The method includes automatically grouping, without human input, based on the data indicative of nutritional similarities between the different semantic categories, the plurality of semantic categories into clusters of semantic categories.

In one embodiment, the techniques provide for a computerized method for training a machine learning model for object recognition. The method includes accessing a set of digital images, each digital image comprising an object and associated with predetermined label information comprising data indicative of: (a) a predetermined semantic category of the object, wherein the semantic category is one of a plurality of semantic categories associated with the set of digital images, and (b) a predetermined nutritional and visual feature category of the object, wherein the nutritional and visual feature category is one of a plurality of nutritional and visual feature categories associated with the set of digital images, and each of the plurality of nutritional and visual feature categories are determined based on similarities among nutritional and visual features of the set of digital images. The method includes classifying, using a machine learning model, the set of digital images to determine predicted label information for each digital image of the set of digital images, comprising: determining, using a first output layer of the machine learning model, a predicted semantic category of the plurality of the semantic categories, and determining, using a second output layer of the machine learning model, a predicted nutritional and visual feature category of the plurality of the nutritional and visual feature categories. The method includes training the machine learning model using a loss function, wherein the loss function incorporates data indicative of whether the predicted label information for each digital image is equal to the predetermined label information of the digital image.

BRIEF DESCRIPTION OF THE DRAWINGS

Additional embodiments of the disclosure, as well as features and advantages thereof, will become more apparent by reference to the description herein taken in conjunction with the accompanying drawings. The components in the figures are not necessarily to scale. Moreover, in the figures, like-referenced numerals designate corresponding parts throughout the different views.

DETAILED DESCRIPTION

Figure 1:
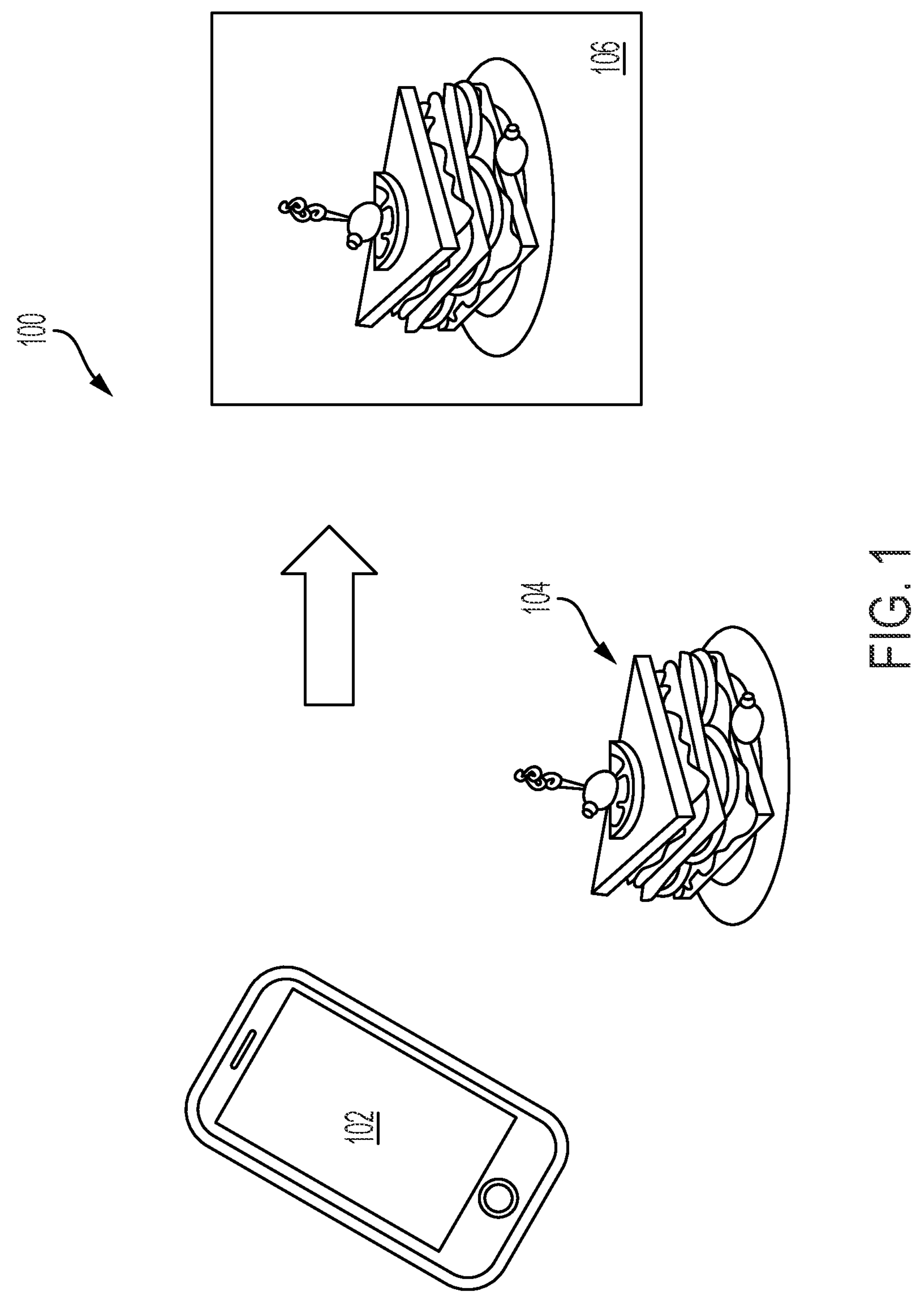
FIG. 1 is a diagram of a device capturing an image for analysis, according to some embodiments.

For the purposes of promoting an understanding of the principles of the present disclosure, reference will now be made to the embodiments illustrated in the drawings, and specific language will be used to describe the same. It will nevertheless be understood that no limitation of the scope of the invention is thereby intended.

The present disclosure relates to techniques for recognizing objects in images, including recognizing food in images. Examples and embodiments described herein are provided in the context of food recognition, which is done for exemplary purposes and is not intended to limit the techniques described herein, which can be used for other types of object recognition.

According to some embodiments, the food recognition techniques can localize and label food(s) present in an image. According to some embodiments, the techniques provide for a two-stage food recognition system, including a food localization stage and a food classification stage, which can localize and label multiple foods in images, respectively. The food localization stage can identify one or more areas in an image that contain food. The inventors have appreciated that, since many food images also contain non-food objects such as human hands, menus, tables, and/or the like, the food localization stage can be configured to remove background clutter. Since the food localization results are processed by the food classification stage, removing background clutter can improve the performance of the food classification stage.

The inventors have further appreciated that labelling food categories through the classification stage (e.g., for each region selected/identified by the food localization stage) can be approached as a classification task. However, while conventional techniques can be used to classify general objects, such techniques are often inadequate at classifying foods. For example, conventional techniques typically treat food classification as a flat, fine-grained classification problem, which can miss unknown or hidden relationships among different food categories. Additionally, or alternatively, while conventional techniques categorize images based on semantics (e.g., a pancake and a waffle are semantically similar), using semantics can be problematic because food categories with high semantic relation do not always share similar visual features. Further, manually recording food terms and calculating semantic relation can be expensive and infeasible with large datasets.

The inventors have further appreciated that classifying foods based on visual information alone may result in noticeable classification errors. Such classification errors can be due to the high complexity of foods, the inter-class similarity of foods, or both. This may be problematic when classifying foods for a dietary assessment (e.g., to determine how much energy and nutrients are consumed). For example, two different foods may have a high visual similarity, but little nutritional similarity (e.g., a donut and a bagel are visually similar, but nutritionally quite different). Misclassification may therefore result in a poor dietary prediction result for the misclassified food (e.g., in terms of energy and/or macronutrient values), which could significantly affect dietary assessment. Additionally, each food is associated with a panel of nutrients and corresponding nutritional values (e.g., 12 grams of carbohydrates). Sometimes, one nutrient may have a similar value for two different foods, while another nutrient may have a significantly different value for those same foods. Therefore, the inventors have appreciated that determining nutritional similarity between two foods may be challenging due to the variety and complexity of nutrients, and their relative importance in the context of dietary assessment.

To address these and other issues with conventional classification techniques, the techniques described herein generate visual feature information for foods in images. According to some embodiments, the techniques use a machine learning model to generate a visual feature vector for each image. The techniques can cluster foods based on the generated visual feature information. According to some embodiments, the techniques can automatically cluster visually similar foods to build the hierarchical structure. The techniques can use visual features to generate a hierarchical structure of food labels with multiple levels of visual and/or semantic categories. Using such a multi-level hierarchical structure can improve the performance of the classification stage. The techniques can build such hierarchical structures in a fully automatic manner from training images. Therefore, a hierarchical structure with both semantically-based level(s) and visually-based level(s) can allow a machine learning model to leverage both semantic and visual similarities among objects instead of just relying on semantic similarities (e.g., since while a pancake and a pork chop look similar, they are semantically dissimilar).

In some embodiments, the techniques classify multi-food images by leveraging the hierarchical structure in a multi-task manner. While conventional machine learning models can classify images into categories, such models tend to optimize only whether images are classified into the appropriate semantic, single-level categories. Therefore, the inventors have appreciated that it is desirable to classify images into the multi-level hierarchical structure (into a semantic or visual category at each level), based on both semantic information and visual information determined in the image. Using such a multi-level hierarchical structure to process objects in a multi-task manner can, for example, help improve classifications such that even if one level is incorrect (e.g., the top-most and finest level categorization is wrong), the classification can still potentially be in the right neighborhood through other correct classifications for other (lower or coarser) levels. For example, since fried chicken and fried pork may have similar visual appearances, if one is accidentally classified as the other, it may be an acceptable mistake since the nutritional information may be similar. In addition, using a multi-level hierarchical structure can also help improve classifications at the highest (e.g., finest) level categorization relative to conventional, single-level classification. According to some embodiments, when training a multi-task image classifier to use a multi-level hierarchy, the techniques use a cross-entropy loss function that not only takes into account whether images are sorted into the correct semantic categories (e.g., which can be at the top-most and finest level of the tree hierarchy), but also takes into account whether images are sorted into the correct visual feature cluster(s) (e.g., which are at lower and coarser levels of the tree).

The techniques described herein can be used for various image processing applications. For example, the techniques can be used for applications in the medical or healthcare context, such as image-based dietary assessment, monitoring, and/or guidance, as well as related medical dosing (e.g., insulin dosing). Food recognition results, for example, can be used in various ways, such as to provide information to a user and/or to feed further image analysis (e.g., to estimate food volume, portion size, and/or the like).

The techniques described herein provide for computer-implemented techniques (e.g., computer applications, such as mobile phone applications or cloud-based applications) that provide for grouping images of objects based on semantic and visual information associated with the objects. A set of digital images is accessed, each digital image comprising an object associated with a semantic category of the object, wherein the semantic category is one of a plurality of semantic categories associated with the set of digital images, and wherein each digital image is labelled with data indicative of the semantic category to which the digital image is associated. A visual feature vector for each digital image of the set of digital images is determined using a trained machine learning model, wherein the visual feature vector comprises a value for each of a plurality of visual features. For each semantic category of the plurality of semantic categories, for each visual feature of the plurality of visual features, a probability distribution is calculated of the values of the visual feature in the visual feature vectors of each image in the set of digital images associated with the semantic category. Data indicative of similarities between digital images associated with different semantic categories of the plurality of semantic categories is determined based on the probability distributions. The plurality of semantic categories are grouped into clusters of semantic categories based on the data indicative of similarities between the digital images associated with different semantic categories.

The techniques described herein provide for computer-implemented techniques that provide for training a machine learning model for object recognition. A set of digital images is accessed, each digital image comprising an object and associated with predetermined label information comprising data indicative of: (a) a predetermined semantic category of the object, wherein the semantic category is one of a plurality of semantic categories associated with the set of digital images, and (b) a predetermined visual feature category of the object, wherein the visual feature category is one of a plurality of visual feature categories, and each of the plurality of visual feature categories are determined based on similarities among visual features of digital images associated with the visual feature category. The set of digital images are classified using a machine learning model to determine predicted label information for each digital image of the set of digital images, comprising: determining, using a first output layer of the machine learning model, a predicted semantic category of the plurality of the semantic categories, and determining, using a second output layer of the machine learning model, a predicted visual feature category of the plurality of the visual feature categories. The machine learning model is trained using a loss function, wherein the loss function incorporates data indicative of whether the predicted label information for each digital image is equal to the predetermined label information of the digital image.

To further address issues with conventional classification approaches, the techniques described herein can additionally or alternatively use nutritional information for food classification tasks. According to some embodiments, the techniques can determine both nutritional and visual feature information for food in images to perform food classification tasks. In some embodiments, the techniques (a) determine one or more nutrient values for each semantic category of food in a set of digital images, and also (b) determine a visual feature vector for each semantic category (e.g., using a trained machine learning model). The techniques can cluster foods based on the nutritional and visual feature information.

According to some embodiments, the techniques can automatically cluster visually and nutritionally similar foods to build a hierarchical structure of foods. The techniques can use visual features and nutritional information to generate a hierarchical structure of food labels, with multiple levels of visual and nutritional categories and/or semantic categories. Using such a multi-level hierarchical structure can improve the performance of, for example, the food classification stage. The techniques can build such hierarchical structures in a fully automatic manner from training images. Therefore, a hierarchical structure with one or more semantically-based levels and one or more visually and nutritionally-based levels can allow a machine learning model to leverage semantic, visual, and nutritional similarities among objects instead of just relying on semantic and visual similarities (e.g., since while a bagel and donut look similar, they are semantically and nutritionally dissimilar).

In some embodiments, the techniques classify food images by leveraging the hierarchical structure in a multi-task manner. The techniques can classify food images into the multi-level hierarchical structure (into a semantic or visual and nutritional category at each level), based on semantic information, visual information, and nutritional information determined for the image. As described above, using such a multi-level hierarchical structure to process objects in a multi-task manner can help improve classifications (e.g., compared to conventional techniques). Continuing with the fried chicken and fried pork example, since fried chicken and fried pork may have similar visual appearances and may also have similar nutrients, if one is accidentally classified as the other, it may be an acceptable mistake since the nutritional information may be similar. According to some embodiments, when training a multi-task image classifier to use a multi-level hierarchy, the techniques use a cross-entropy loss function that not only takes into account whether images are sorted into the correct semantic categories (e.g., which can be at the top-most and finest level of the tree hierarchy), but also takes into account whether images are sorted into the correct nutritional and visual feature cluster(s) (e.g., which are at lower and coarser levels of the tree).

The techniques described herein provide for computer-implemented techniques (e.g., computer applications, such as mobile phone applications or cloud-based applications) that provide for grouping images of objects based on semantic, visual, and nutritional information associated with the objects. A set of digital images is accessed, each digital image comprising an object associated with a semantic category of the object, wherein the semantic category is one of a plurality of semantic categories associated with the set of digital images, and wherein each digital image is labelled with data indicative of the semantic category to which the digital image is associated. One or more nutrient values are determined for each semantic category of the plurality of semantic categories, wherein each of the one or more nutrient values is associated with a nutrient category of one or more nutrient categories. For each semantic category of the plurality of semantic categories, data indicative of nutritional similarities between different semantic categories of the plurality of semantic categories is automatically determined, without human input, based on the one or more nutrient values for each semantic category of the plurality of semantic categories. The plurality of semantic categories are automatically grouped into clusters of semantic categories, without human input, based on the data indicative of nutritional similarities between the different semantic categories. In some embodiments, data indicative of visual similarities between digital images of different semantic categories of the plurality of semantic categories is accessed, wherein grouping the plurality of semantic categories into clusters of semantic categories comprises grouping the plurality of semantic categories into clusters of semantic categories based on the data indicative of nutritional similarities and the data indicative of visual similarities.

The techniques described herein provide for computer-implemented techniques that provide for training a machine learning model for object recognition. A set of digital images is accessed, each digital image comprising an object and associated with predetermined label information comprising data indicative of: (a) a predetermined semantic category of the object, wherein the semantic category is one of a plurality of semantic categories associated with the set of digital images, and (b) a predetermined nutritional and visual feature category of the object, wherein the nutritional and visual feature category is one of a plurality of nutritional and visual feature categories, and each of the plurality of nutritional and visual feature categories are determined based on similarities among nutritional and visual features of the set of digital images. The set of digital images are classified using a machine learning model to determine predicted label information for each digital image of the set of digital images, comprising: determining, using a first output layer of the machine learning model, a predicted semantic category of the plurality of the semantic categories, and determining, using a second output layer of the machine learning model, a predicted nutritional and visual feature category of the plurality of the visual feature categories. The machine learning model is trained using a loss function, wherein the loss function incorporates data indicative of whether the predicted label information for each digital image is equal to the predetermined label information of the digital image.

While various embodiments have been described, it will be apparent to those of ordinary skill in the art that many more embodiments and implementations are possible. Accordingly, the embodiments described herein are examples, not the only possible embodiments and implementations. Furthermore, the advantages described above are not necessarily the only advantages, and it is not necessarily expected that all of the described advantages will be achieved with every embodiment.

Food classification can generally refer to labelling food items in an image. In some examples, if the input images only contain a single item, conventional techniques may not output the pixel location of the foods in an image, which can be problematic when it is desirable to identify the location of the food within the image. Food detection can generally refer to determining whether an image contains food or not. However, it is common for food images to contain multiple foods, and therefore food detection techniques may not provide sufficient information if multiple foods are present in an image. And even if there is only one food item in the food images, conventional food detection techniques typically cannot provide pixel location(s) of the food items.

Food localization aims to detect the location of food in an image, which can be indicated by bounding boxes or pixel-level segmentation masks. While food localization techniques can extract spatial information about the foods in the image, localization techniques typically do not return food categories associated with the spatial information. Food localization requires more information than conventional techniques designed for food detection, since food localization seeks to locate regions in a food image that corresponds to food.

Food recognition can play an important role in image-based dietary assessment, monitoring and/or guidance. Such techniques aim to automatically detect pixels in an image corresponding to foods and label the type of foods. Conceptually, food image recognition is similar to object detection. However, food image recognition can be much more challenging than object detection for various reasons. For example, food recognition may require fine-grain recognition of different foods, typically not required for object detection. As another example, many foods have similar visual appearances, and foods are generally not rigid (e.g., and therefore the same food does not always have the same physical properties), which can compound the difficulty of food recognition.

Food recognition techniques can include single-food recognition and multiple-food recognition techniques. As described herein, food recognition often assumes that only one food is present in the image, and can therefore be viewed as food image classification. However, unlike general image classification, food classification is typically much more challenging due to, for example, intra-class variation and/or inter-class confusion. As another example, the same food may have very different visual appearances, such as depending on personal preferences, the recipes used, the availability of ingredients, and/or the like. As a further example, using the same cooking method to cook different foods may cause those different foods to have a similar appearance (e.g., a fried chicken breast and a fried pork chop will look similar). While multiple food recognition techniques may be better adapted to handle real-life scenarios of analyzing images with multiple foods, multiple food recognition can be even more complicated because such techniques need to both identify food regions and classify those food regions.

The techniques described herein provide systems and methods for automated image-based food recognition. As described above, dietary assessment often requires collecting what an individual eats during the course of a day, which can be time-consuming, tedious and error-prone when relying on human memories and/or recordings. The automated image-based food recognition techniques described herein can therefore, for example, improve the efficiency and accuracy of dietary assessment. As shown in the diagram 100 of FIG. 1, a user can capture an image 106 of food 104 using a smartphone 102 and/or other device capable of capturing an image, which can be processed using the techniques described herein. Therefore, the techniques can be implemented by leveraging common and easily accessible devices, which can help make the techniques available to end-users.

Figure 2:
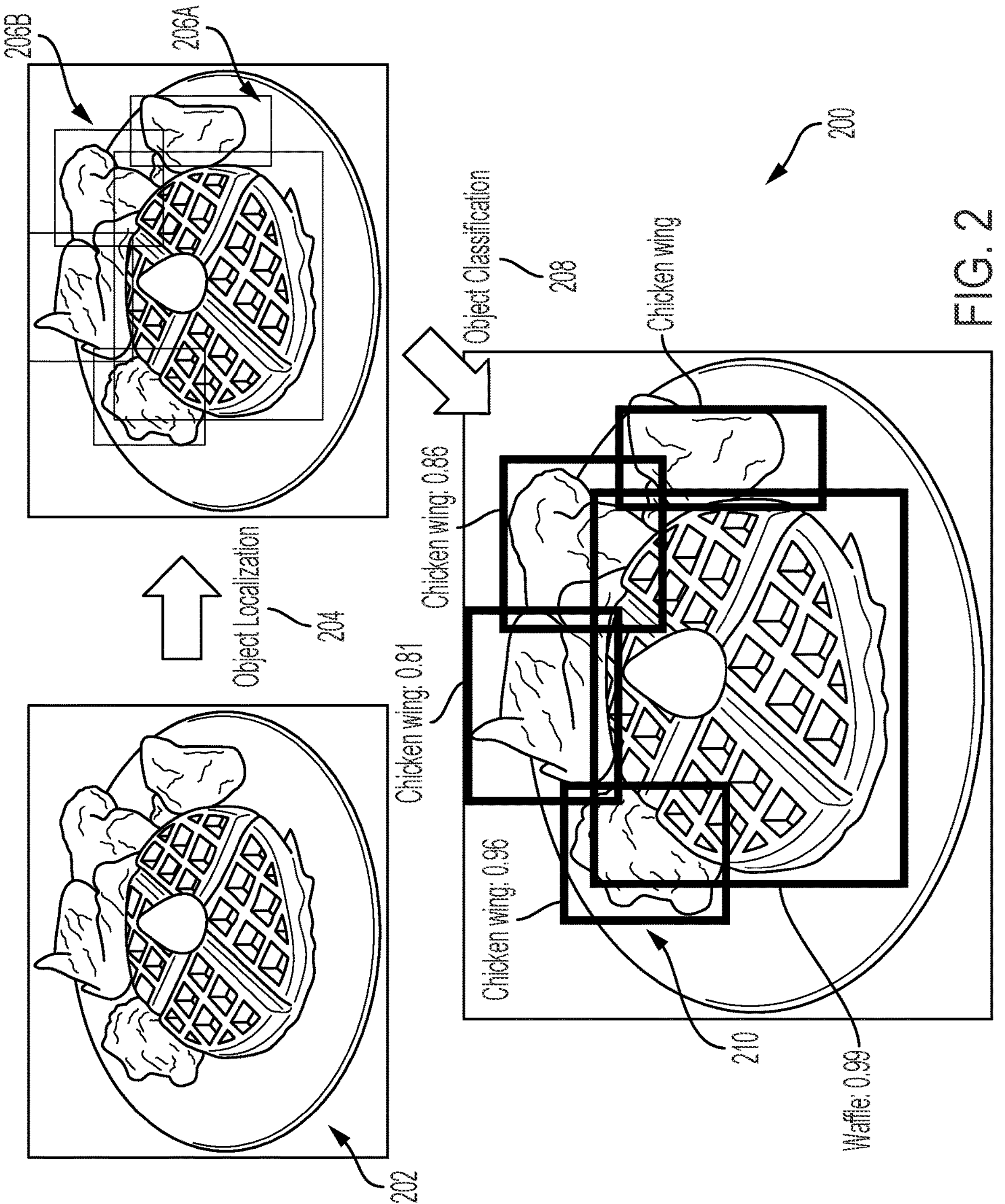
FIG. 2 shows an exemplary diagram of an image being processed through a two-stage image processing flow, according to some embodiments.

FIG. 2 shows an exemplary diagram 200 of an image 202 being processed through a two-stage image processing flow, according to some embodiments. In this example, the image 202 is processed by an object (e.g., food) localization stage, which is represented by arrow 204. The object localization stage 204 determines regions, including regions 206A and 206B (collectively referred to as regions 206) in the input image 202 that likely contain objects of interest. In some embodiments, as described further herein, the object localization stage 204 can be performed using a trained machine learning model. The output of the object localization stage is fed into the object classification stage, which is represented by arrow 208. In some embodiments, the regions 206 identified by the object localization stage 204 can be resized prior to being processed by the object classification stage 208 (e.g., resized to 128×128, 224×224, 256×256, etc.). As described further herein, the object classification stage 208 can be performed using a visually-aware hierarchical structure that is built based on features extracted from machine learning model (e.g., a CNN model). The object classification stage 208 can generate various information for each of the identified regions 206, including a food label, a cluster label, associated confidence scores, and/or the like. The final output can include an annotated image 210, which includes the bounding box and food label for each food in the input image.

As described herein, the object localization process is configured to find regions of interest in an image. In the food context, for example, the food localization process searches for regions in a food image that contain foods. The techniques can be configured such that each identified region should contain just one food. Various architectures can be used to implement the food localization process. For example, deep learning based methods, such as Faster R-CNN (e.g., described in Shaoqing Ren, Kaiming He, Ross Girshick, and Jian Sun, "Faster R-CNN: Towards real-time object detection with region proposal networks," Proceedings of Advances in Neural Information Processing Systems (December 2015), pp. 91-99, which is hereby incorporated by reference in its entirety), YOLO (e.g., described in Joseph Redmon, Santosh Divvala, Ross Girshick, and Ali Farhadi, "You only look once: Unified, real-time object detection," Proceedings of the IEEE conference on computer vision and pattern recognition (2016), pp. 779-788, which is hereby incorporated by reference herein in its entirety), and/or the like can be used, e.g., since such techniques can work well for computer vision applications. Most CNN architectures, such as the VGG family (e.g., described in Karen Simonyan and Andrew Zisserman, "Very Deep Convolutional Networks for Large-Scale Image Recognition," arXiv preprint, pp. 1409-1556 (2014), which is hereby incorporated by reference herein in its entirety), ResNet (e.g., described in K. He, X. Zhang, S. Ren, and J. Sun, "Deep Residual Learning for Image Recognition," Proceedisng of the IEEE Conference on Computer Vision and Pattern Recognition (June 2016), pp. 770-778. Las Vegas, NV, which is hereby incorporated by reference herein in its entirety), and/or the like can be used as the backbone structure for the object localization process.

According to some embodiments, Faster R-CNN can be used with VGG (e.g., with VGG-16) as the backbone for a food localization process. Faster R-CNN can propose potential regions that may contain an object with bounding boxes. Faster R-CNN can assign a confidence score to each bounding box. For ease of reference herein but without intending to be limiting, in the context of food, such a confidence score is referred to as a "foodness" score since it can represent the confidence score of food regions in the image (e.g., where a high "foodness" score can indicate a high likelihood that the region contains food). The "foodness" score can be used to determine which regions are passed to the object classification stage. For example, a threshold can be used such that regions with a "foodness" score above 0.5 are fed into the food classification stage. As described in the Examples Section that follows, an exemplary implementation of a Faster R-CNN model was trained using a training dataset was constructed from the UEC-256 dataset (e.g., described in Y. Kawano and K. Yanai, "Automatic expansion of a food image dataset leveraging existing categories with domain adaptation," Proceedings of European Conference on Computer Vision Workshops (September 2014), p. 3-17, Zurich, Switzerland, which is hereby incorporated by reference herein in its entirety), which contains food images with bounding box information. All 256 food categories in this dataset were treated as one category—food. Approximately 70% of the images were selected as training data, approximately 15% was used for validation (e.g., to ensure the model does not over-fit the data), and approximately 15% for testing the performance of food localization.

According to some embodiments, the Faster R-CNN method consists of a Region Proposal Network (RPN) and a Classifier. The RPN is used to suggest foreground object regions in the image. Before the RPN, a feature map is generated based on the last convolution layer. The RPN generates a predetermined number of (e.g., 9) different sized anchor boxes by sliding a small network over the feature map. Each anchor can return information such as the foreground object confidence score, a set of bounding box coordinates, or both. In some embodiments, if the confidence score is greater than a threshold (e.g., 0.5), the classifier uses the features inside the anchor boxes to determine whether it contains food or not.

Regarding the classifier, since different anchor boxes can have different dimensions, a fixed size feature map can be created (e.g., using the Region of Interest (RoI) pooling, such as described in Ross Girshick, "Fast r-cnn," Proceedings of the IEEE International Conference on Computer Vision (December 2015), pp. 1440-1448, which is incorporated by reference herein in its entirety). The classifier, which can be the fully-connected layer, can predict the generic labels (e.g., "food" or "not food") and assign the confidence score for each selected regions. The confidence score can range from 0 to 1, which can reflect the probability of the predicted label for each region. For example, if the model assigns 0.65 to a region of the input image, the system indicates that this region has a 65% probability of containing food. As described above, this confidence score can be referred to as the "foodness" score when analysing images of food(s).

Figure 3:
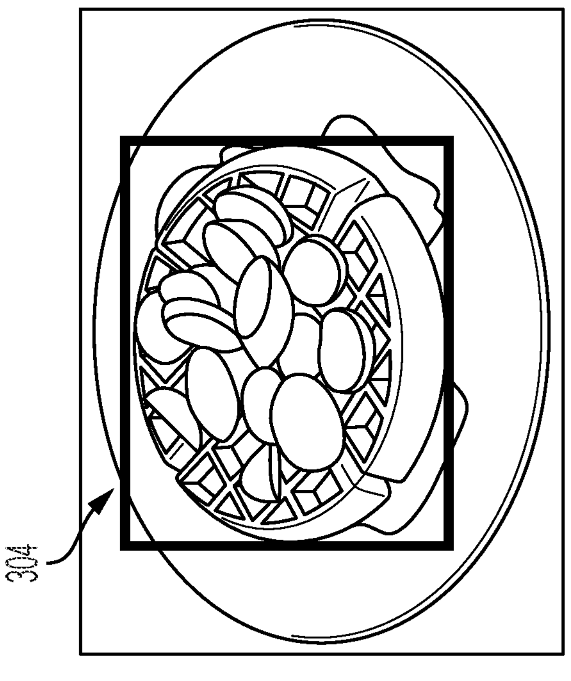
FIG. 3 shows an example of an image with three identified regions that all have a high degree of overlap, according to some embodiments.
Figure 3:
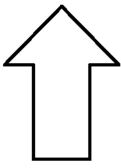
Figure 3:
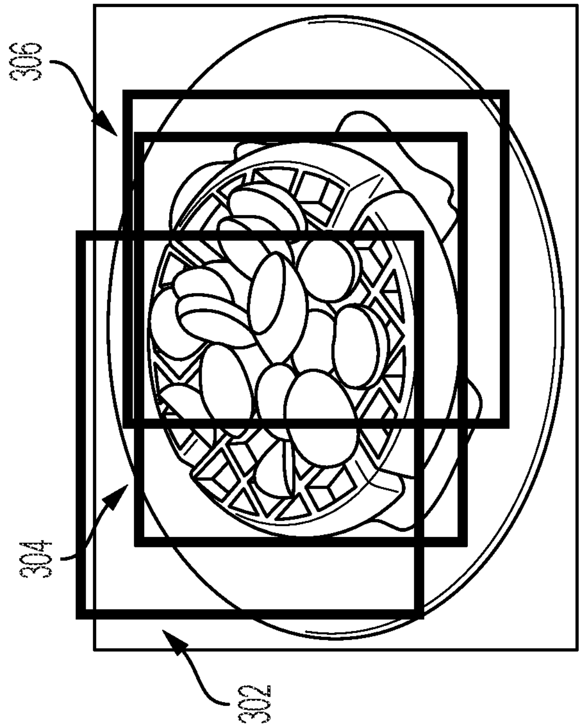

According to some embodiments, redundant regions can be removed from images (e.g., to avoid multiple regions for a single food). For example, during the training phase and/or during the inference phase, a Non-Maximum Suppression (NMS) threshold can also be selected to remove redundant regions. In some embodiments, the RPN may identify or propose regions that have a high degree of spatial overlap in the image. FIG. 3 shows an example of an image with three identified regions 302, 304 and 306 that all have a high degree of overlap, according to some embodiments. According to some embodiments, Non-Maximum Suppression (NMS) can be used to select a bounding box with the best (e.g., highest) "foodness" score, such that other bounding boxes that have significant overlap with the selected bounding box can be removed. According to some embodiments, Intersection Over Union (IoU) can be used to measure how significant the overlap is among the regions. As shown in Equation 1, for example, B1 and B2 correspond to two bounding boxes.

$$IoU = \frac{B_1 \cap B_2}{B_1 \cup B_2} \qquad \text{Equation 1}$$

Various thresholds can be set, such as an IoU threshold of 0.5, 0.7, 0.9, and/or the like. For example, referring to FIG. 3, all three regions 302, 304 and 306 have high confidence scores and the IoU is larger than 0.7. If there are several bounding boxes with IoU values larger than 0.7, the system can retain the bounding box with the largest "foodness" score. Referring again to FIG. 3, as shown in the right image, NMS selects the region 304 with the highest confidence score.

Some embodiments of the techniques described herein relate to food classification. As described herein, conventional techniques may train machine learning models using a flat (e.g., non-hierarchical) set of semantically labelled food images. As also described herein, conventional machine learning techniques can be used to cluster similar food categories based on semantic information or categories. However, techniques that leverage semantic categories can suffer from various deficiencies. For example, food categories with high semantic relation do not always share similar visual features (e.g., grilled chicken and ground chicken may have a high semantic relation in that they are both types of chicken, but do not share similar visual features because they look quite different in appearance). As another example, semantic food categories can vary in different regions of the world (e.g., the same food may have different names in different regions). As a further example, manually recording each food category and computing semantic relations can be expensive and/or not feasible for large datasets. Therefore, the inventors appreciated that it can be hard to build training sets with semantic information, and semantic correlations may mislead visual feature based training processes (e.g., if semantic similar categories have distinctive visual appearances).

Some conventional techniques may use a pre-specified semantic hierarchical tree that contains food clusters with semantically similar food categories. For example, Hui Wu, Michele Merler, Rosario Uceda-Sosa, and John R Smith, "Learning to make better mistakes: Semantics-aware visual food recognition," Proceedings of the 24th ACM international conference on Multimedia (2016), 172-176, which is hereby incorporated by reference herein in its entirety, uses a semantic hierarchical tree. However, the hierarchy must typically be manually specified, and are also typically made for specific data sets. For example, the tree described in Wu et al. is customized for the ETHZ-101 (see, e.g., L. Bossard, M. Guillaumin, and L. Van Gool, "Food-101—Mining Discriminative Components with Random Forests," Proceedings of European Conference on Computer Vision 8694 (September 2014), pp. 446-461. Zurich, Switzerland, which is hereby incorporated by reference herein in its entirety) and the 5-Chain datasets as described in the Wu et al. article. Most existing food image datasets contain different food categories. As a result, the semantic-aware hierarchical structure needs to be rebuilt for different datasets. Further, different naming conventions may be used. For example, the same food may be named differently in different data sets (e.g., courgette and zucchini), the same word may refer to different foods (e.g., the meaning of the term muffin is different in England and in America), and/or the like. It would therefore be very tedious and time-consuming to specify a specific semantic-aware hierarchical structure for each dataset. Further, such semantic hierarchical structures may include semantic categorizations that do not have similar visual features.

The techniques described herein improve conventional machine learning technology by automatically organizing a set of training images into a hierarchical structure, without requiring manual operator input to specify specific hierarchical structures. The hierarchical structure has multiple levels that include both level(s) of semantic categories and level(s) of visual feature categories. According to some embodiments, the top (e.g., finest) layer of the hierarchical structure is grouped based on semantic categories, while one or more lower (e.g., progressively coarser) layers are grouped based on visual features. The techniques can cluster visually similar food categories to automatically generate (e.g., without manual operator input) the hierarchical structure. According to some embodiments, machine learning techniques, such as CNNs, are used to extract visual features of the images. The techniques include using the extracted visual features to identify correlations between different food categories.

According to some embodiments, a feature map of the convolutional layer of a CNN can be used to compute the visual similarity between food categories and cluster visually-similar categories automatically. According to some embodiments, the feature map densely connects to a top layer of a machine learning model, where the top layer has a length that is equal to the number of categories (e.g., semantic categories). Each ground-truth label of the training images (e.g., including the semantic and/or visual labels) can be one-hot encoded to convert the categorical data to a numerical representation, which can allow the labels to be used to compute cross-entropy loss. According to some embodiments, one-hot representation of N classes can have N binary bits with one high (1) bit and the remaining bits low (0). One-hot encoding can, for example, make the Lp distances between different category labels equal. For example, the difference between hamburger and sandwich can be the same as the difference between hamburger and soup in the encoding space.

Figure 4:
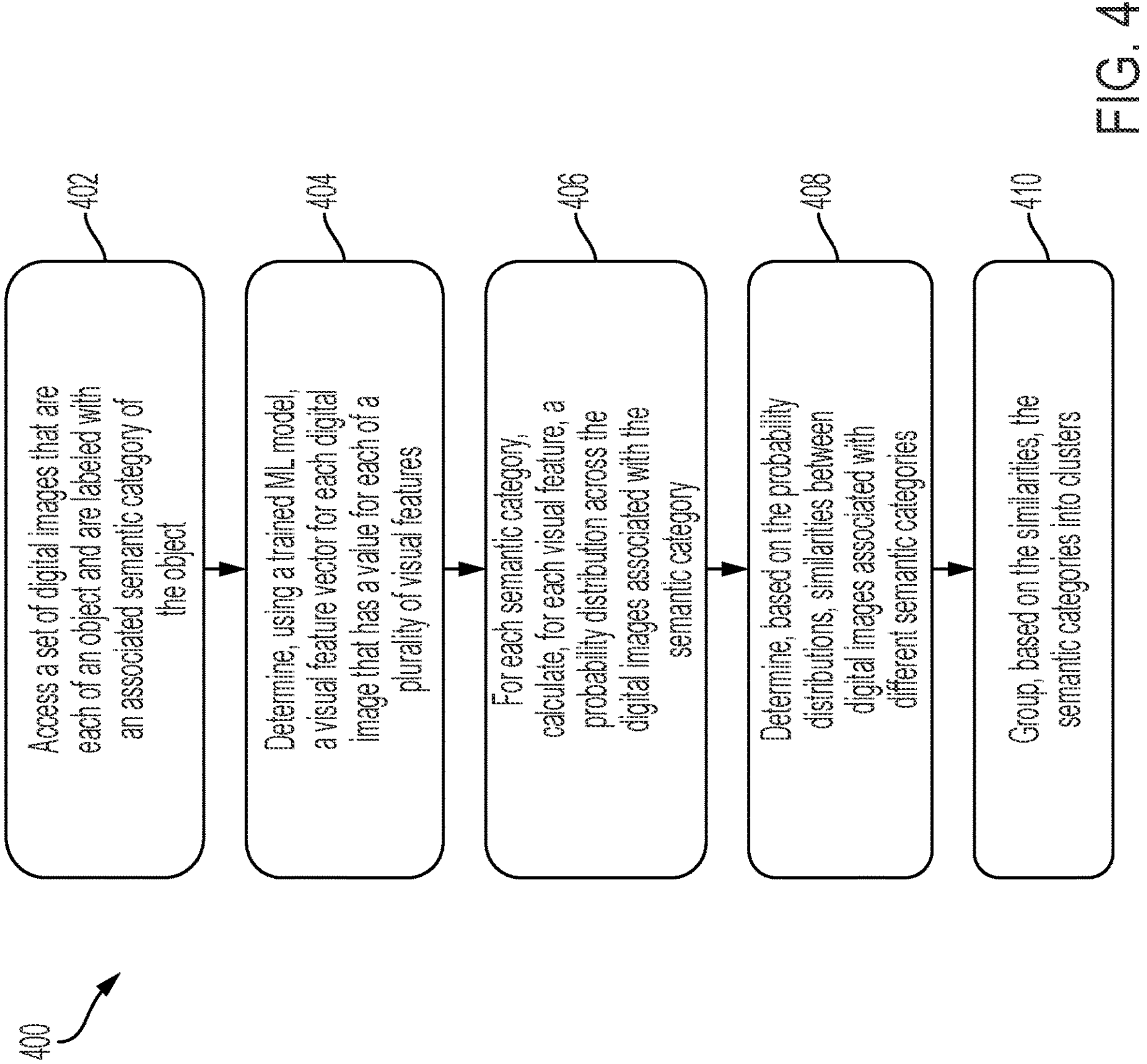
FIG. 4 is a flow chart showing an exemplary computerized method for grouping images of objects (e.g., food) based on semantic and visual information associated with the objects, according to some embodiments.

According to some embodiments, the techniques provide for building a hierarchy of food categories according to visual similarities, where the hierarchy includes level(s) with semantic groups and level(s) with visually-determined clusters. FIG. 4 is a flow chart showing an exemplary computerized method 400 for grouping images of objects (e.g., food) based on semantic and visual information associated with the objects, according to some embodiments. At step 402, the computing device (e.g., the computing device 1700 described in conjunction with FIG. 17) accesses a set of digital images. Each digital image is of at least one object (e.g., one or more foods) that is associated with a semantic category of the object. The semantic category is one of a plurality of semantic categories associated with the set of digital images, and each digital image is labelled with data indicative of the semantic category of the food(s) in the image.

At step 404, the computing device determines, using a trained machine learning model (e.g., a trained CNN model), a visual feature vector for each digital image of the set of digital images. According to some embodiments, the techniques use a DenseNet-121 model to extract the visual feature values. DenseNet-121 is described in, for example, Gao Huang, Zhuang Liu, Laurens Van Der Maaten, and Kilian Q Weinberger, "Densely connected convolutional networks," Proceedings of the IEEE conference on computer vision and pattern recognition (2017), pp. 4700-4708, which is hereby incorporated by reference herein in its entirety. The DenseNet-121 model can include a combination of both convolutional layers and fully-connected layers. The convolutional layers can be used to extract features from the input images. The fully-connected layers can be used to classify images based on the features generated by the convolutional layers. The output of the last convolution layer can be treated as the feature map for each food image, and includes a visual feature vector with a value for each visual feature. According to some embodiments, the feature map for each input image can be a 1×1024 space vector that represents one data point in the 1,024 dimensional feature space. Each dimension of the visual feature vector corresponds to a different visual feature (e.g., such that there are 1,024 visual features for a 1×1024 visual feature vector).

Various loss functions with different learning rates can be used, such as a cross-entropy loss function. For example, as discussed in the Examples section that follows, an exemplary implementation used a pre-trained model that was trained on the ImageNet dataset and used a small learning rate of 0.0001 to fine-tune the pre-trained model to reduce training time. The model can be trained using the cross entropy loss function shown in Equation 2.

$$\text{Cross Entropy Loss} = \sum_{i=1}^{N} y_i \log(p_i) \quad \text{Equation 2}$$

Where:

N is the total number of classes;

y is the ground truth label, which can be one hot encoded;

p is the confidence score of each predicted category; and $y_i$ and $p_i$ correspond to the i-th element in y and p, whose length are N.

The ImageNet dataset is described in, for example, O. Russakovsky, J. Deng, H. Su, J. Krause, S. Satheesh, S. Ma, Z. Huang, A. Karpathy, A. Khosla, M. Bernstein, A. Berg, and F. Li, "ImageNet Large Scale Visual Recognition Challenge. International Journal of Computer Vision 115, 3 (2015), pp. 211-252, which is hereby incorporated by reference herein in its entirety.

Figure 5:
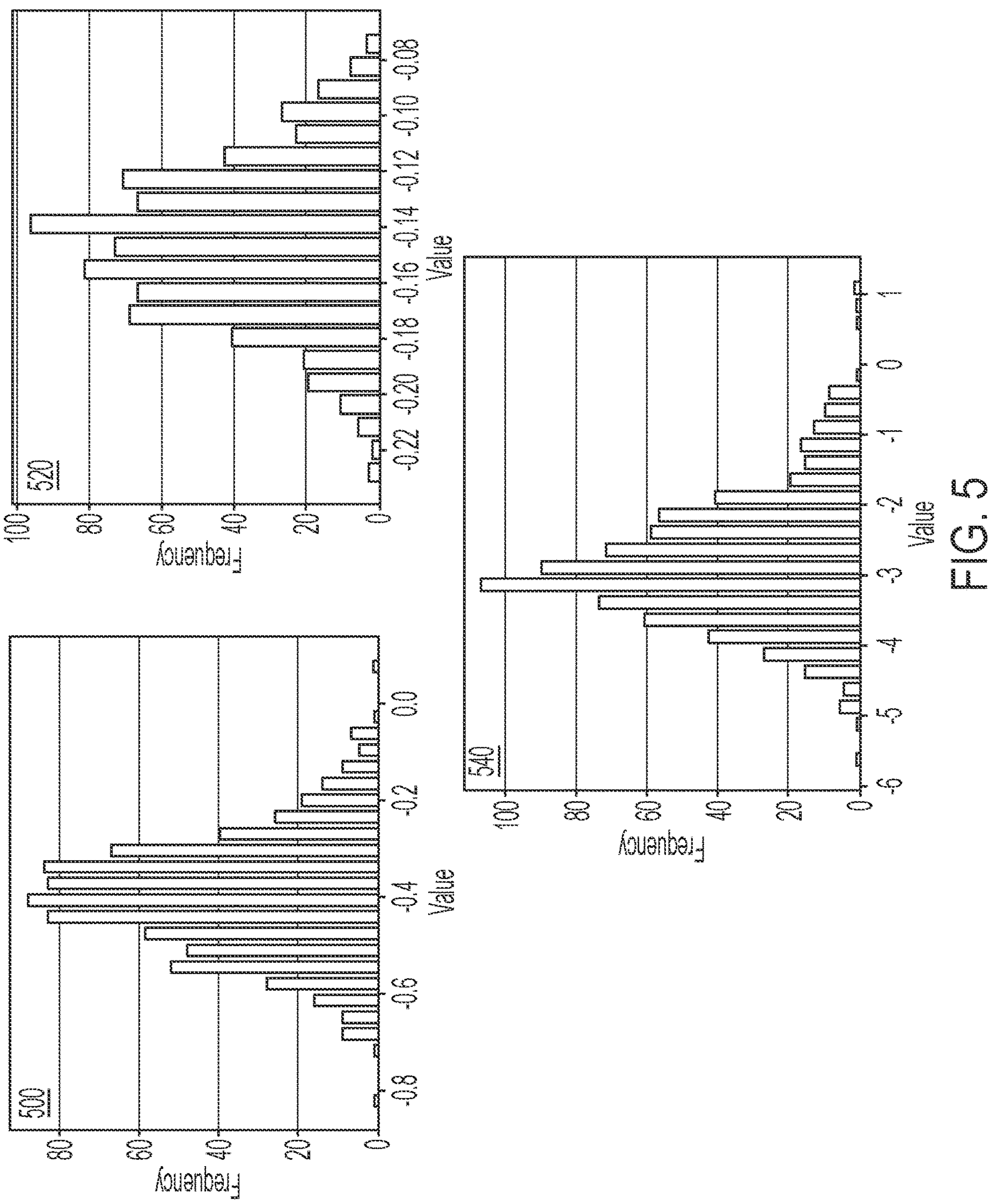
FIG. 5 is a diagram showing three exemplary histograms of associated features of an exemplary feature space, according to some embodiments.

Once the loss converges, the trained model can extract meaningful visual feature information that can be used for food classification. At step 406, for each semantic category of the plurality of semantic categories, the computing device calculates, for each visual feature of the plurality of visual features, a probability distribution of the values of the visual feature in the visual feature vectors of each image in the set of digital images associated with the semantic category. The feature map dimensions for a particular semantic category can thus be estimated using probability distribution functions. These probability distribution functions can be used to compare visual features among different semantic categories. According to some embodiments (e.g., for a well-trained model), some or all of the feature map dimensions of each food category can have various probability distributions, such as Gaussian-like distributions. FIG. 5 is a diagram showing three exemplary histograms 500, 520 and 540, of three associated features of a 1024 feature space for the training images of an exemplary semantic category of apple pie, according to some embodiments. As shown, the histograms 500, 520 and 540 exhibit Gaussian-like distributions. According to some embodiments, the techniques can generate density functions (e.g., 1D Gaussian probability density functions) to fit the distributions.

At step 408, the computing device determines, based on the probability distributions, data indicative of similarities between digital images associated with different semantic categories of the plurality of semantic categories. According to some embodiments, the similarity information is determined by generating a similarity matrix. The similarity matrix can be a two-dimensional matrix generated based on the number of semantic categories. For example, the number of rows and columns of the similarity matrix can both be equal to the total number of semantic categories, such that each row and each column is associated with a semantic category of the plurality of semantic categories.

The system can determine, for each matrix entry in the similarity matrix, data indicative of a similarity between the visual feature vectors of (a) a first set of digital images of the set of digital images associated with the semantic category of the row of the matrix entry and (b) a second set of digital images of the set of digital images associated with the semantic category of the column the matrix entry. In some embodiments, the system can use the density functions described in conjunction with step 406, for example, to compute overlap information, such as overlap coefficients (OVLs), which are used to populate each entry of the similarity matrix. For example, the system can, for each visual feature of the visual feature matrix, generate an overlap coefficient indicative of an overlap between the Gaussian distributions for the visual feature of (a) the first set of digital images and (b) the second set of digital images. The system can generate an averaged overlap coefficient by averaging the overlap coefficients, and populate the averaged overlap coefficient into the similarity matrix.

Figure 6:
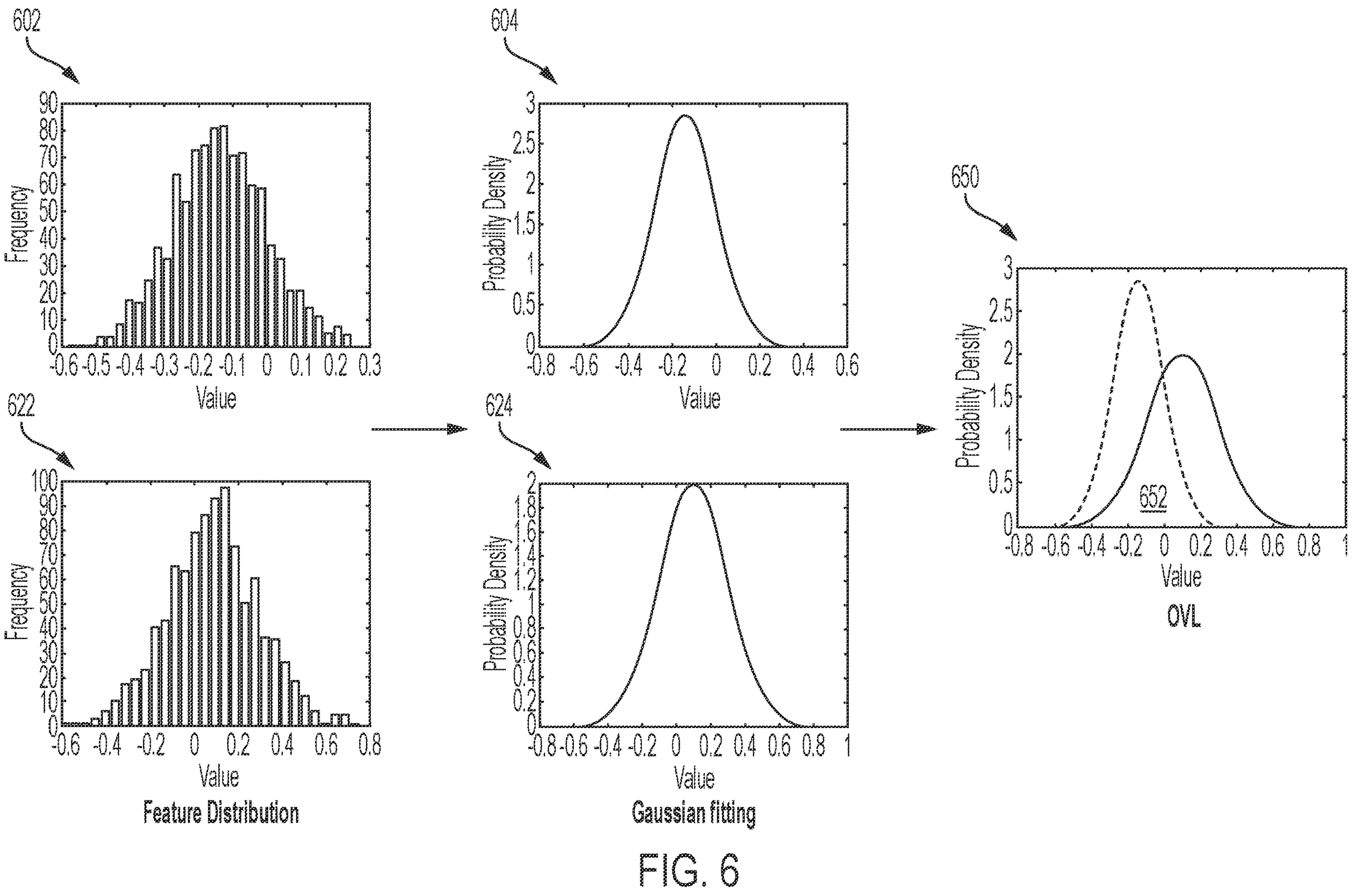
FIG. 6 is a diagram showing an example of determining an overlap coefficient, according to some embodiments.

FIG. 6 is a diagram showing an example of determining an overlap coefficient, according to some embodiments. FIG. 6 shows two histograms 602 and 622, which illustrate two exemplary feature distributions of two different food categories for one specific visual feature, along with corresponding Gaussian-fit Probability Density Functions 604 and 624. The graph 650 shows the OVL 652 between the two density functions 604, which refers to the overlapping area under the two probability density functions. The OVL 650 can be a measure of the agreement between two distributions. For example, if two food categories have high OVL in one dimension of the feature map, both food categories are similar with respect to this feature dimension.

Figure 7A:
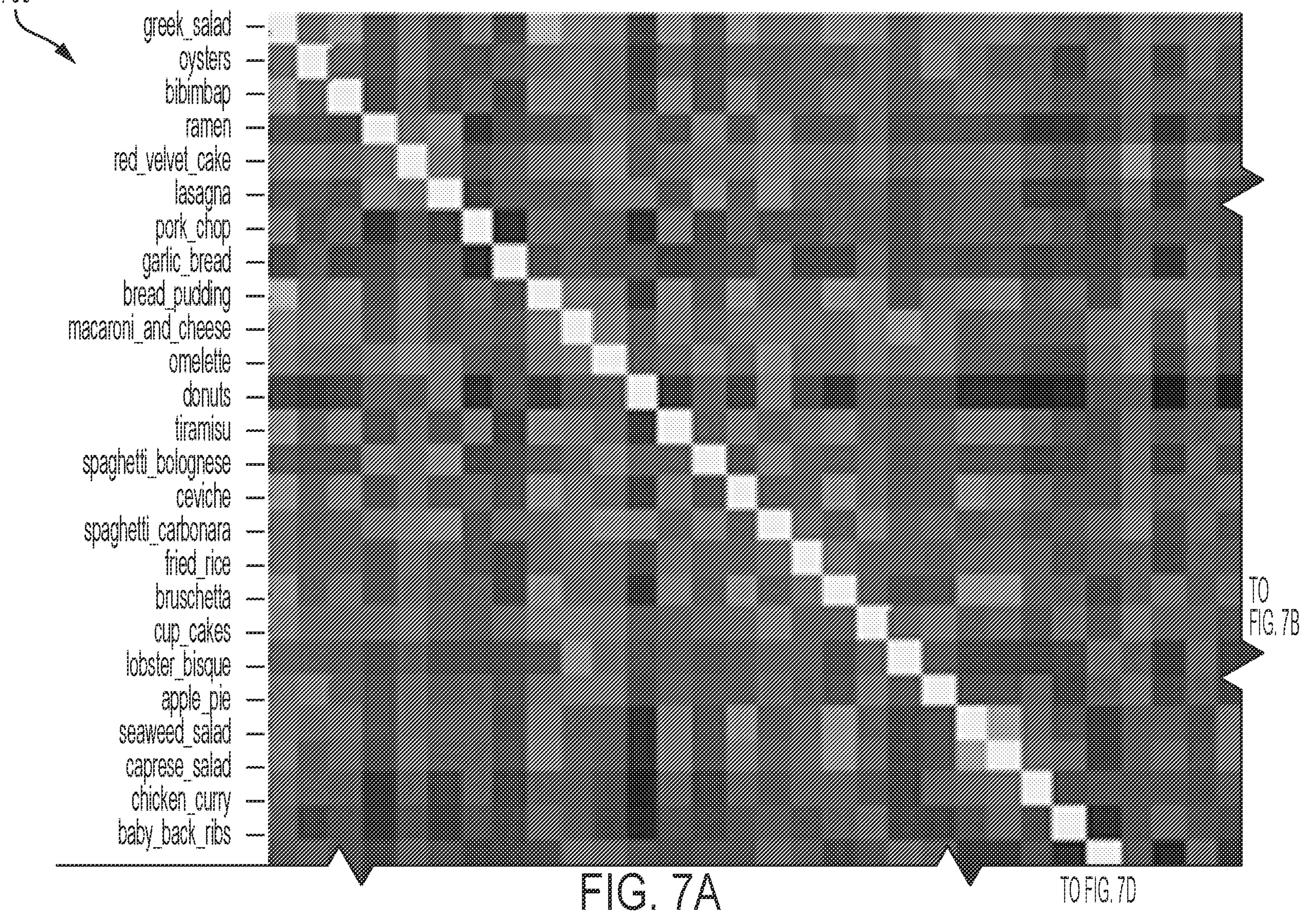
FIGS. 7A-7M show an exemplary similarity matrix, according to some embodiments.
Figure 7B:
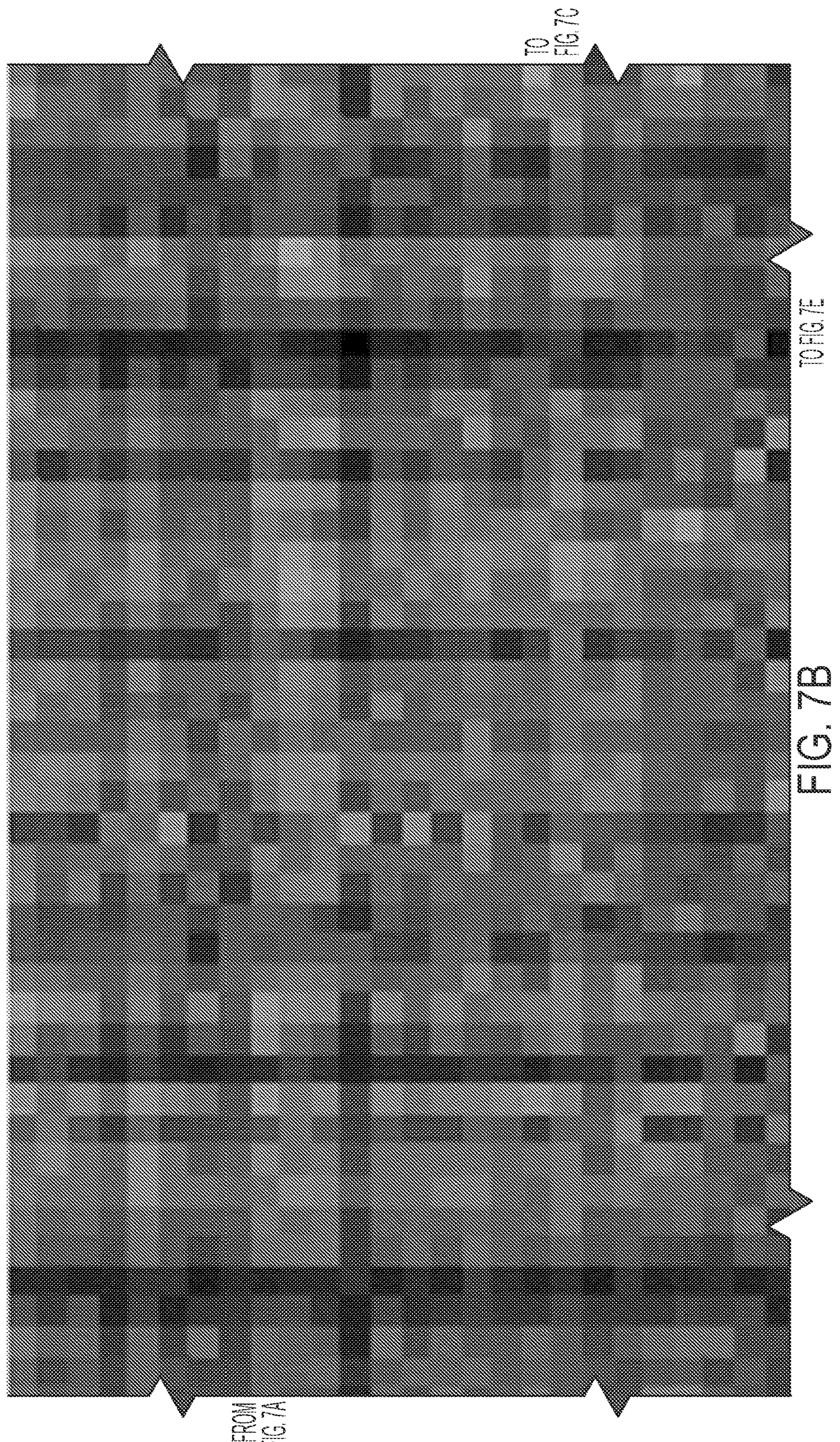
Figure 7C:
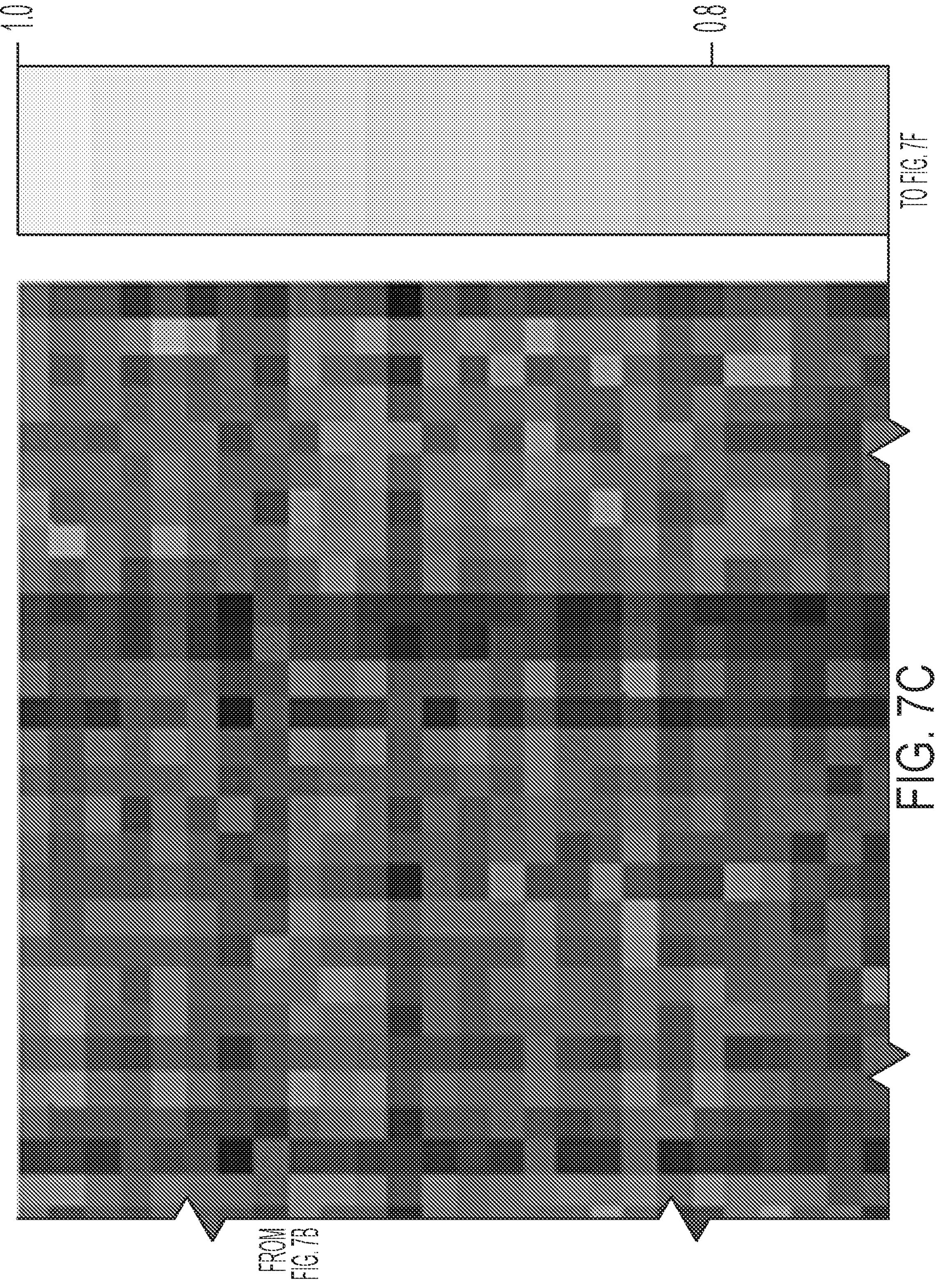
Figure 7D:
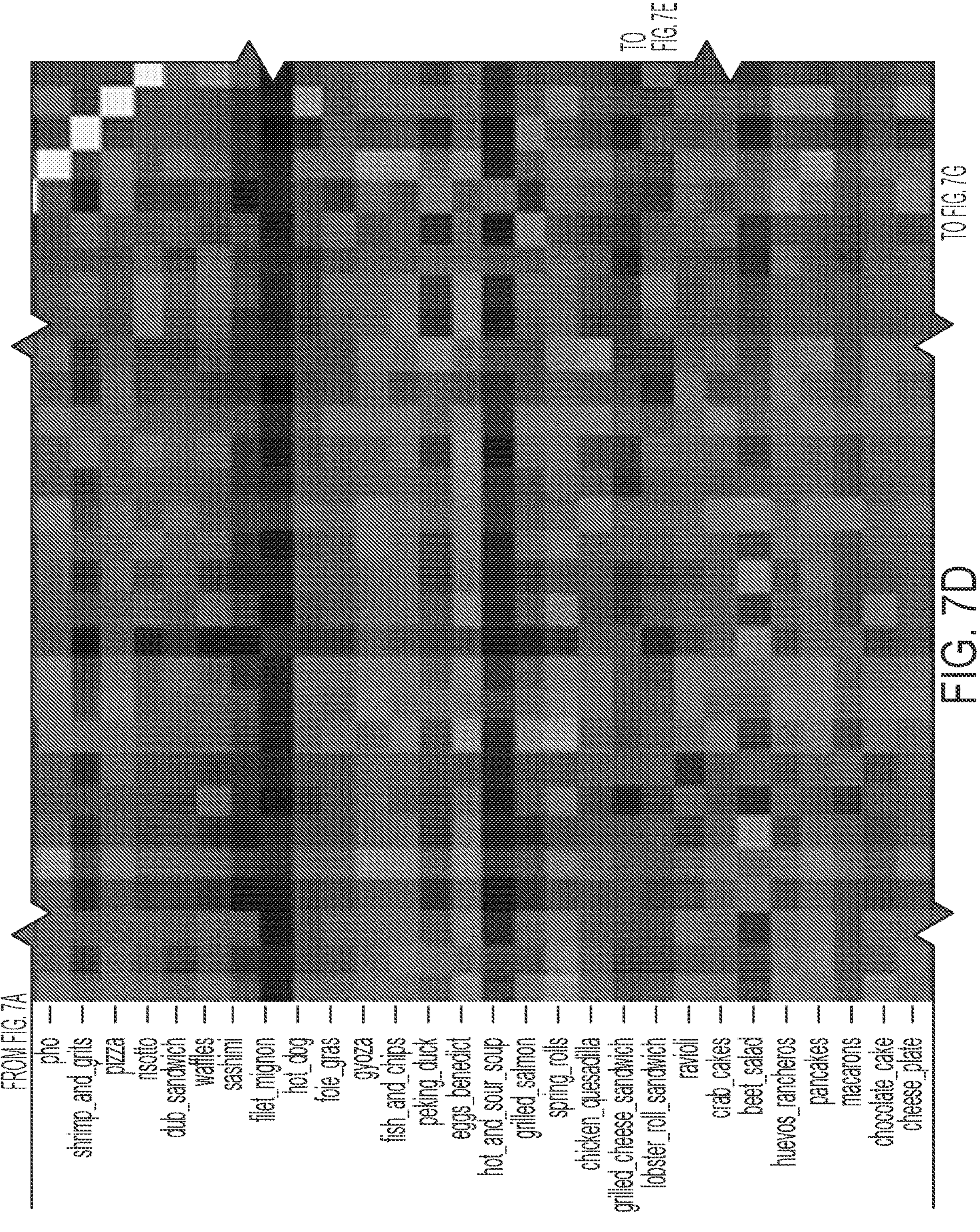
Figure 7E:
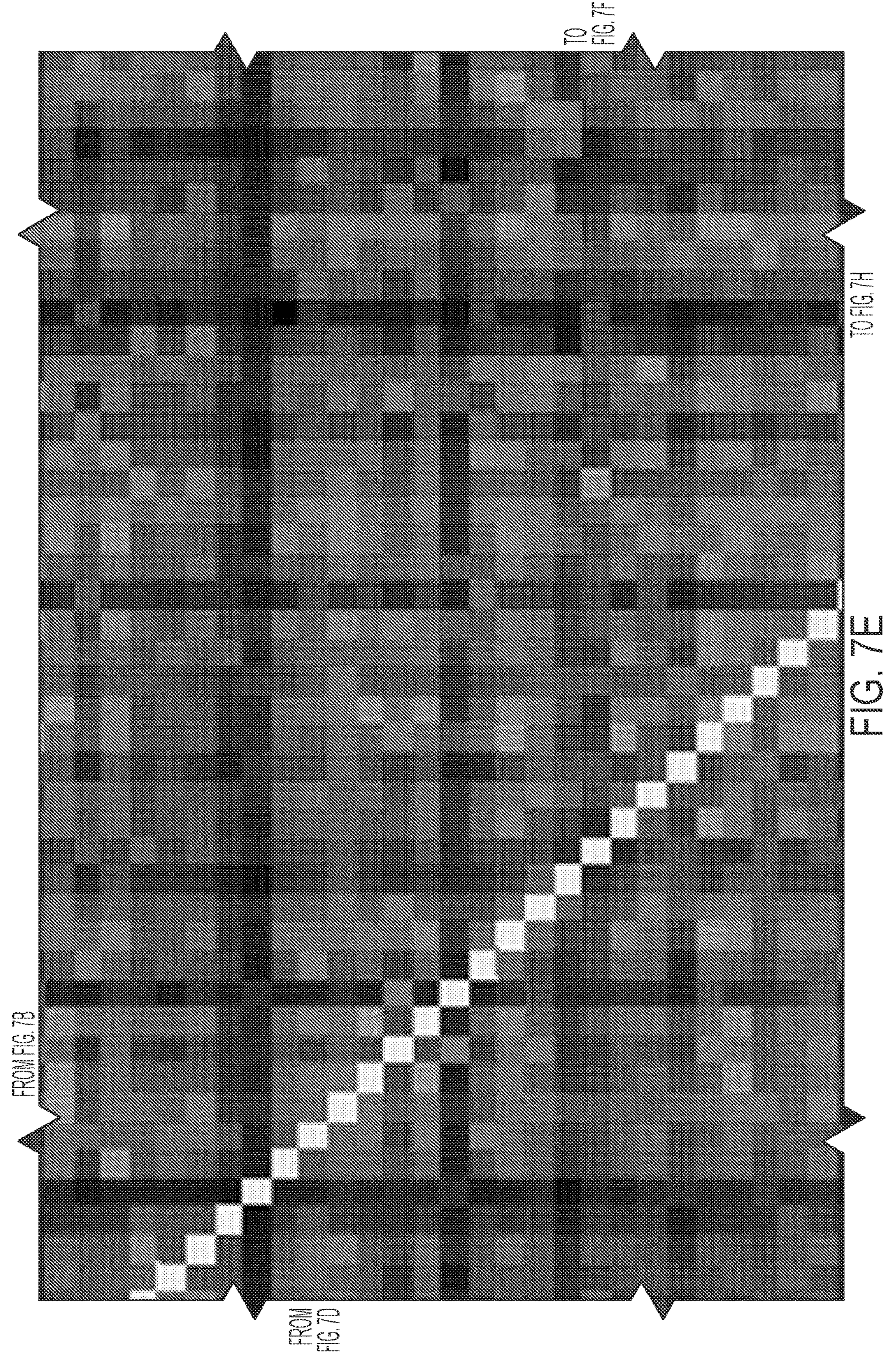
Figure 7F:
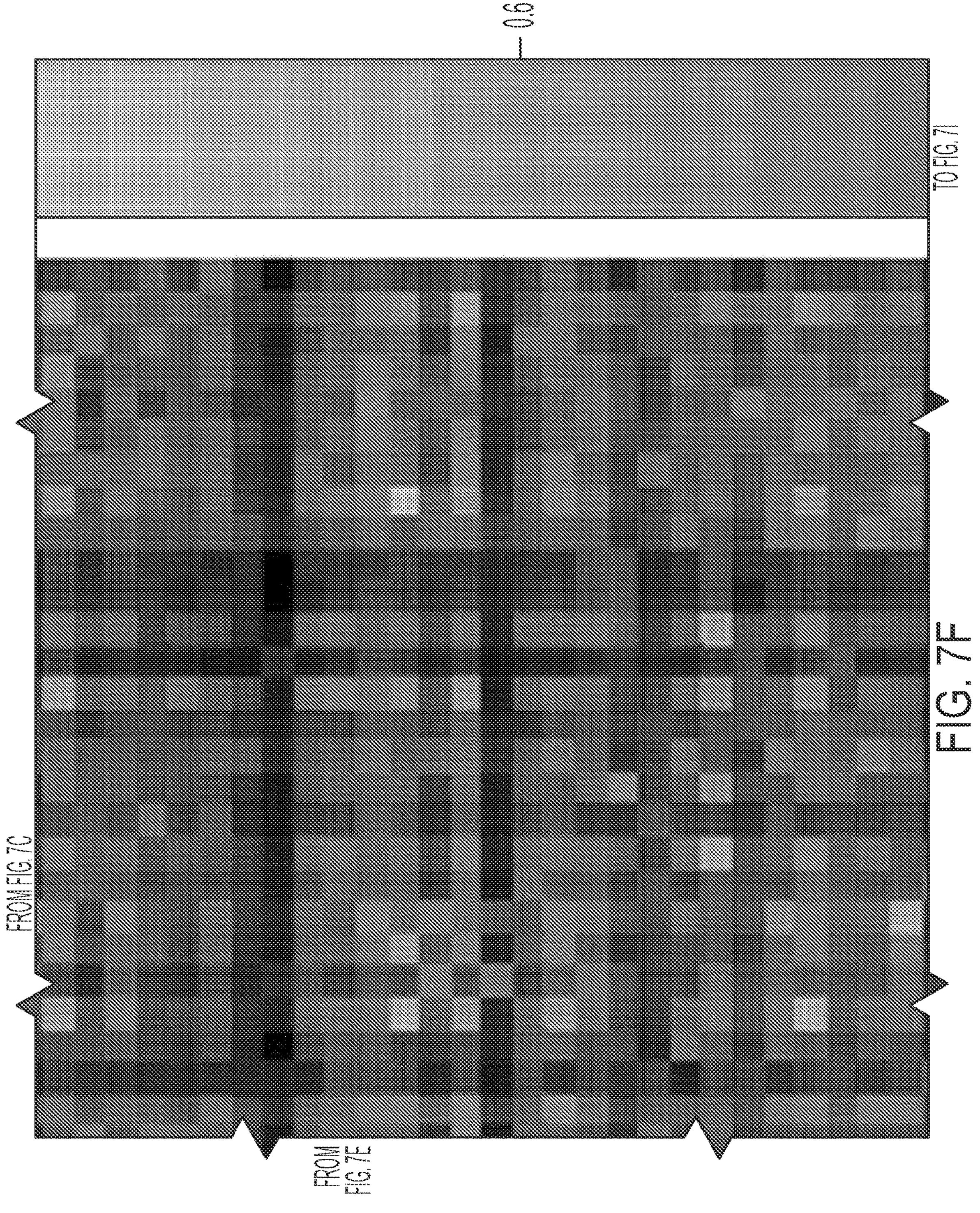
Figure 7G:
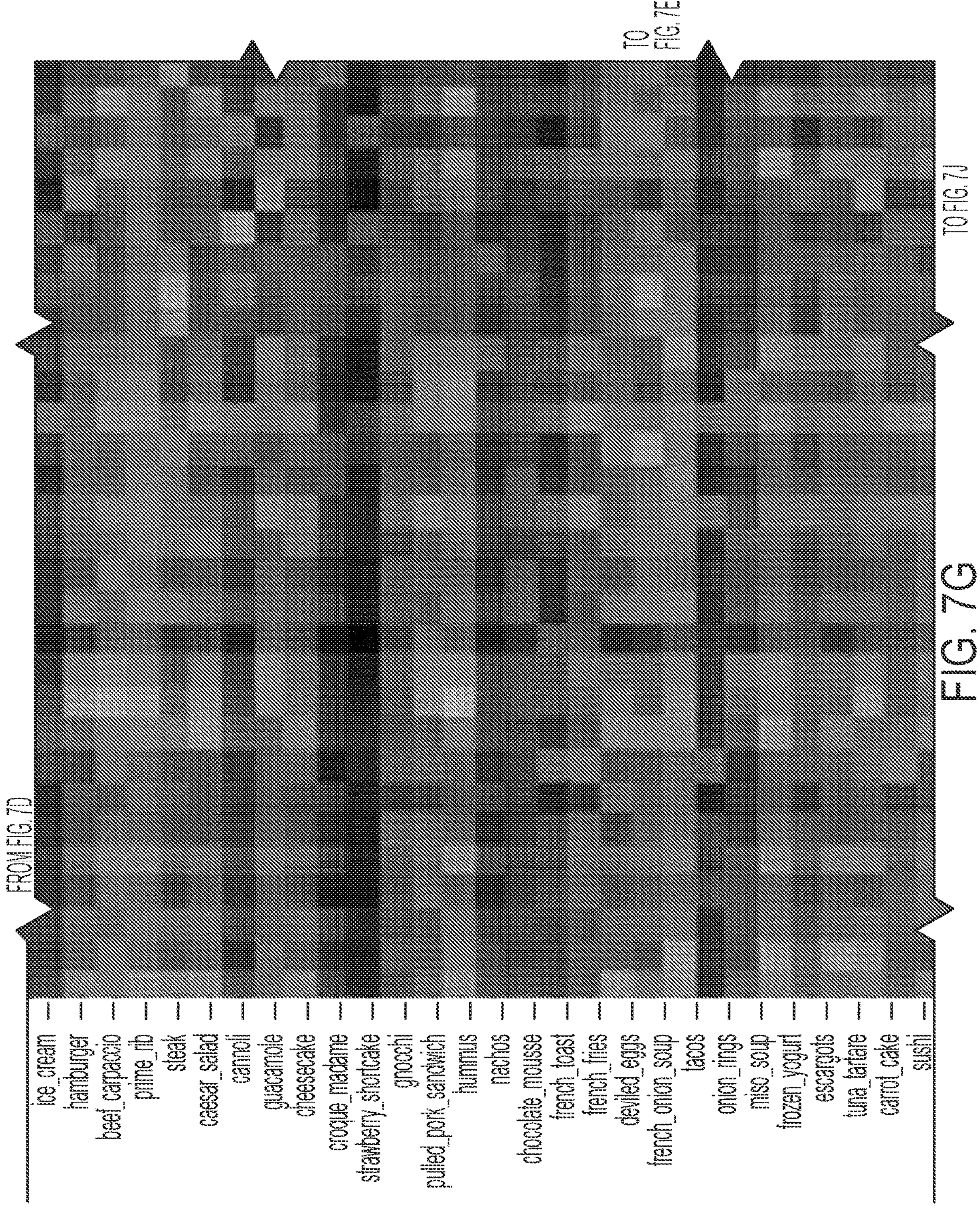
Figure 7H:
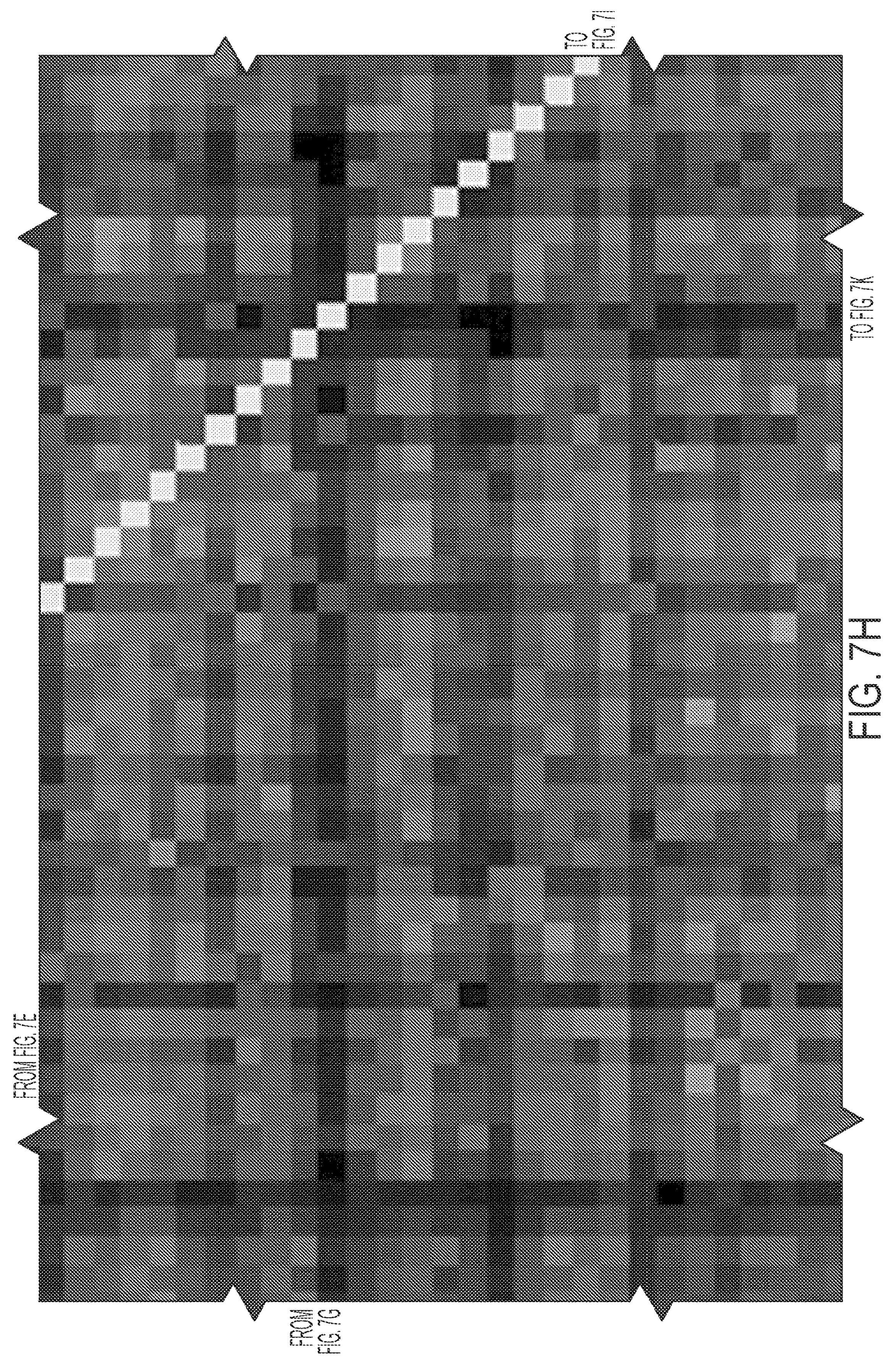
Figure 7I:
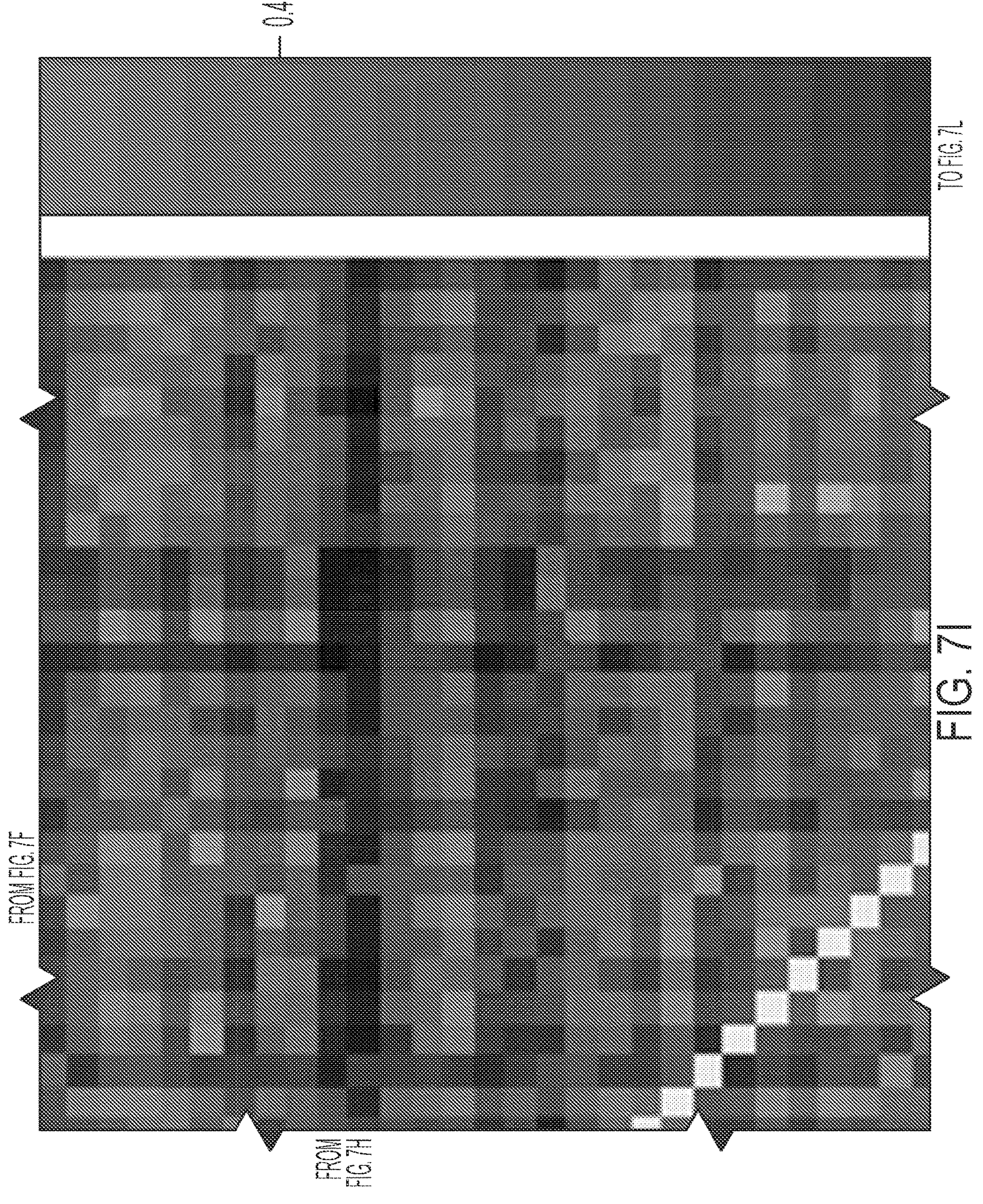
Figure 7J:
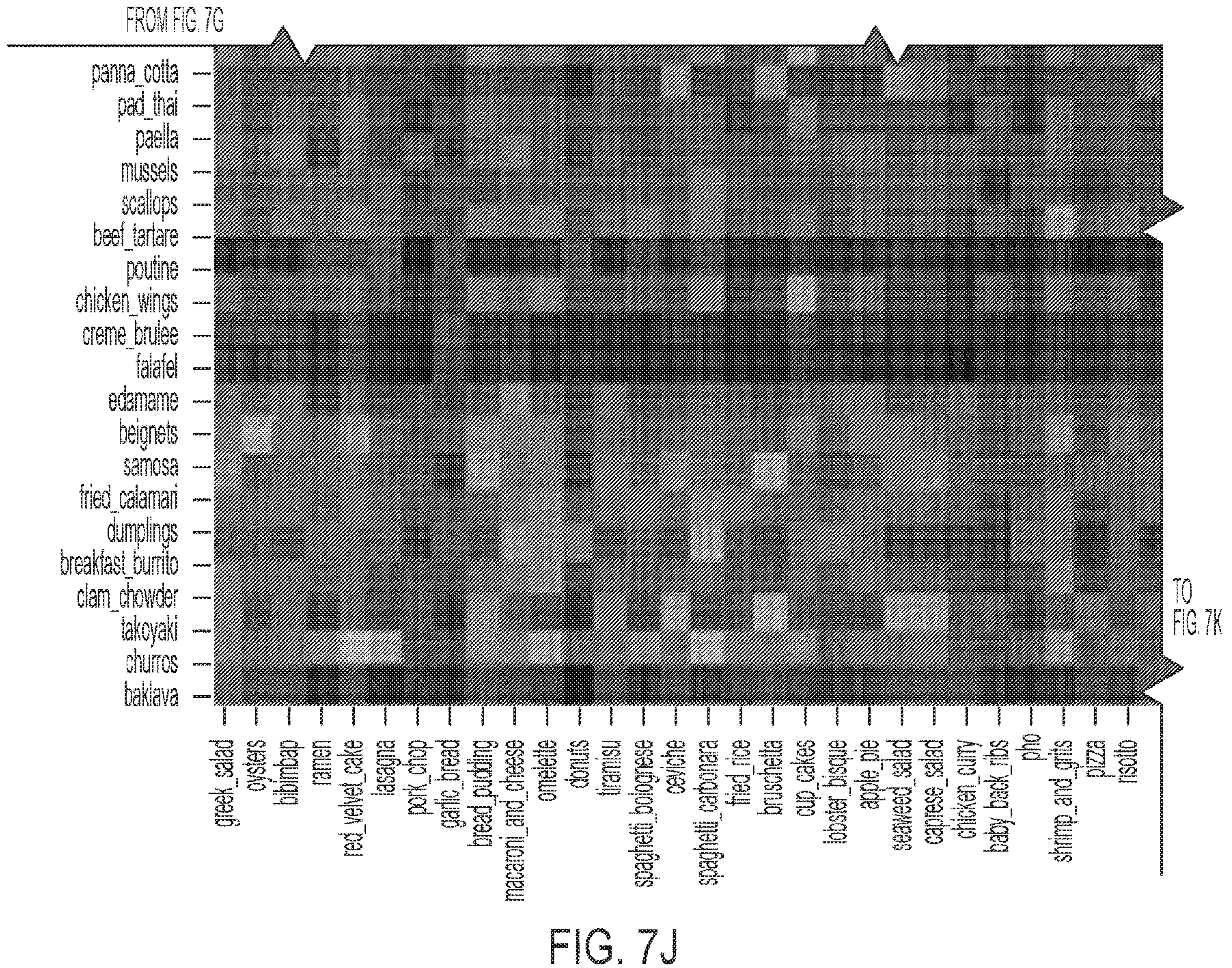
Figure 7K:
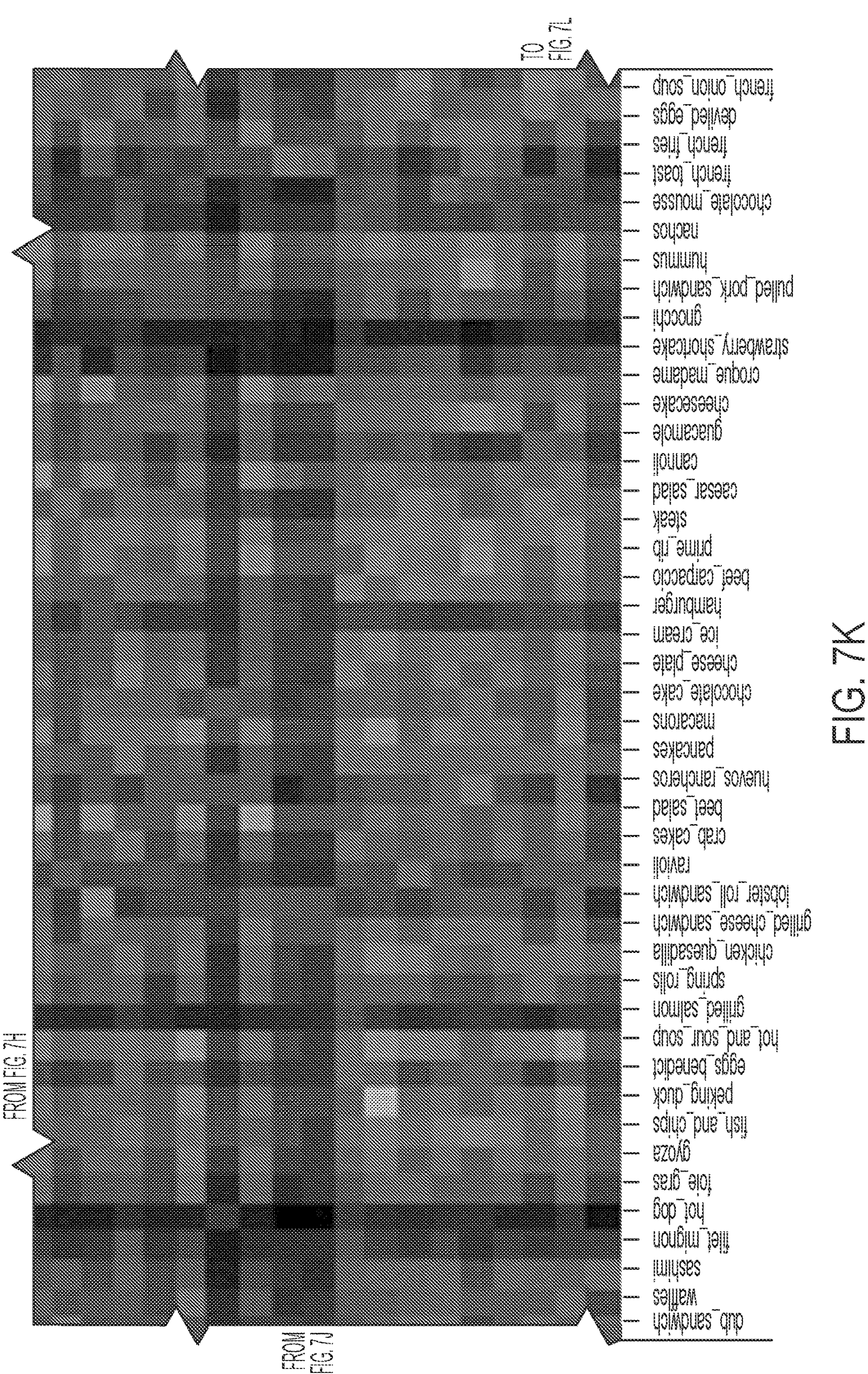
Figure 7L:
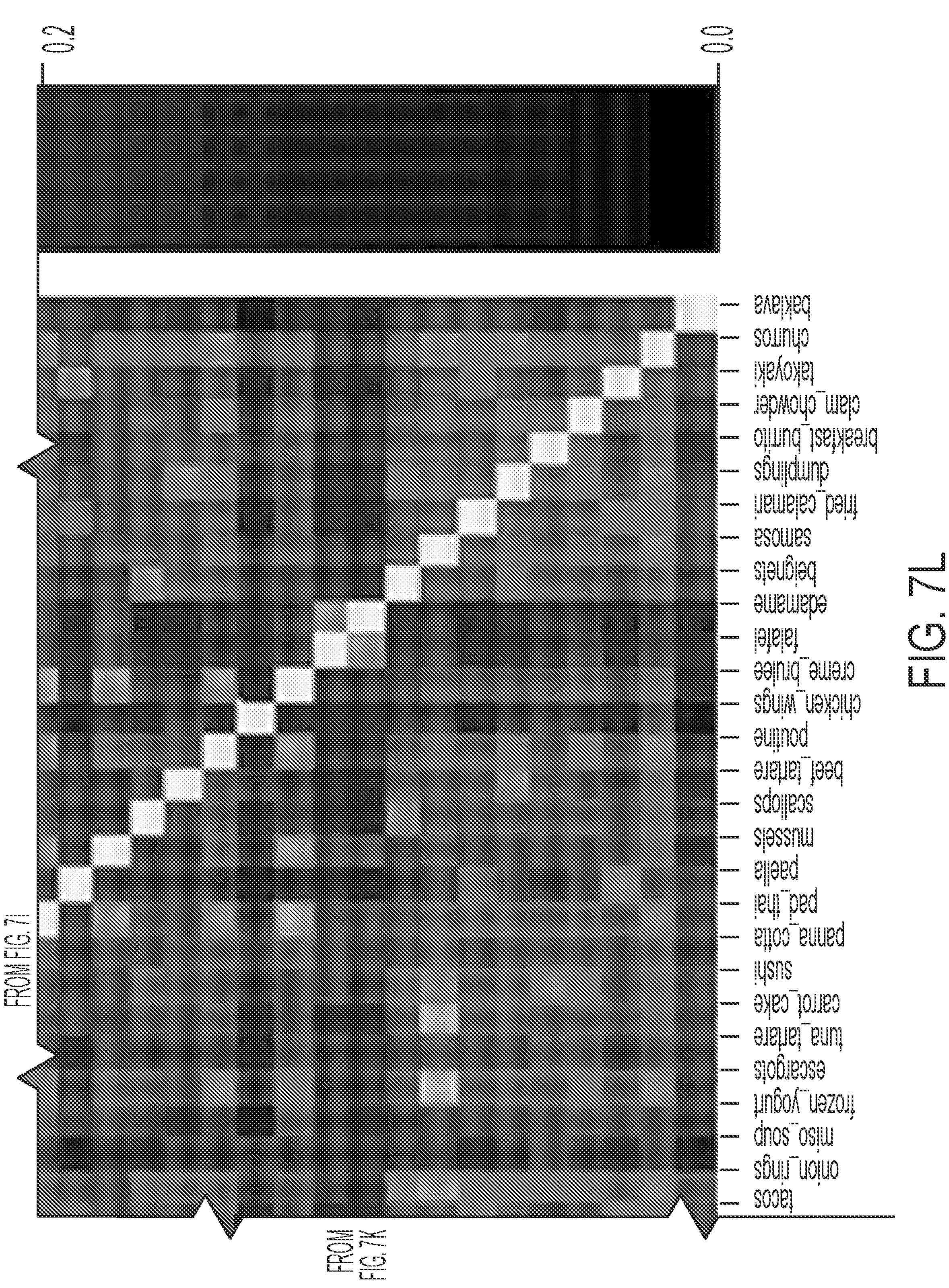
Figure 7M:
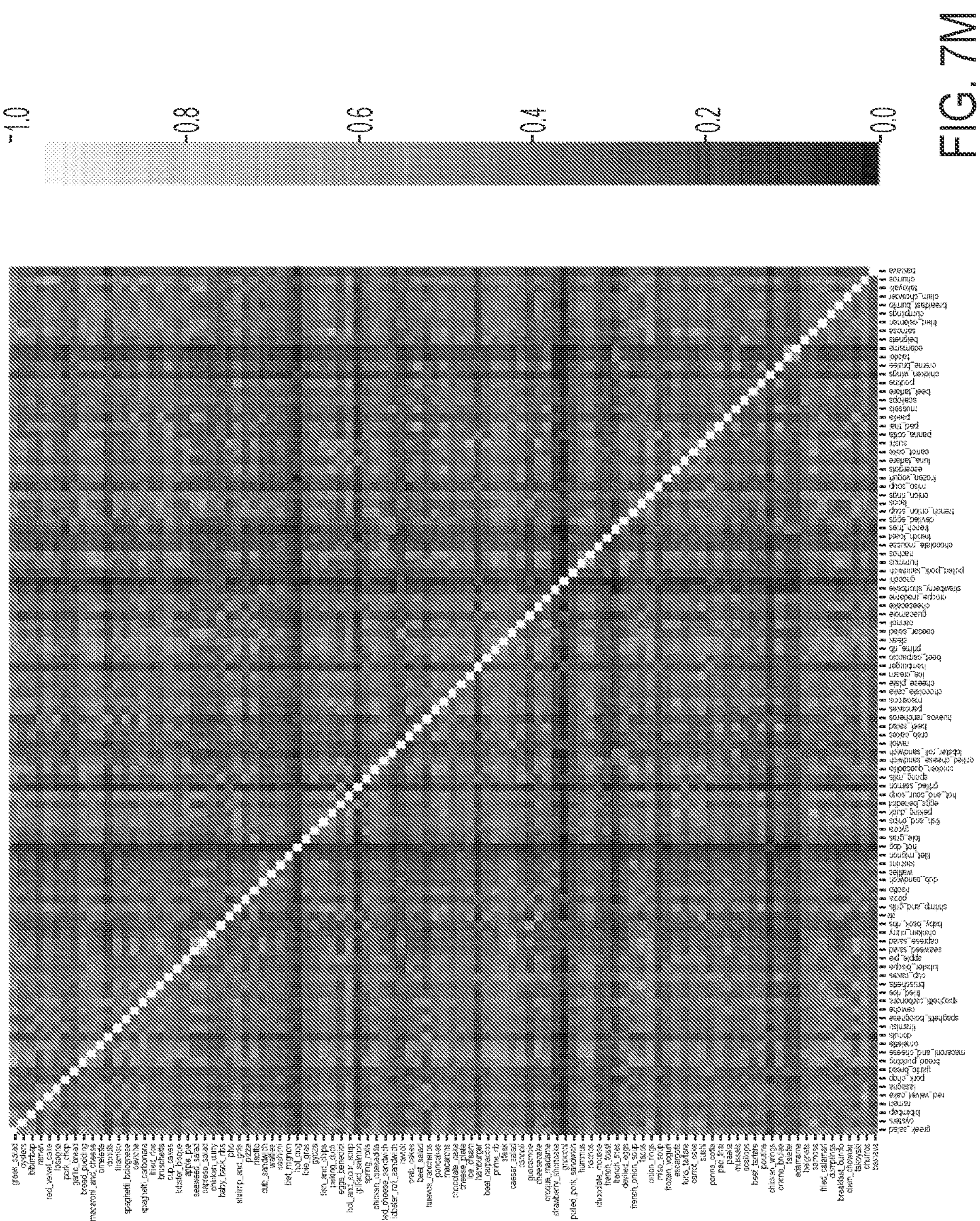
Figure 8:
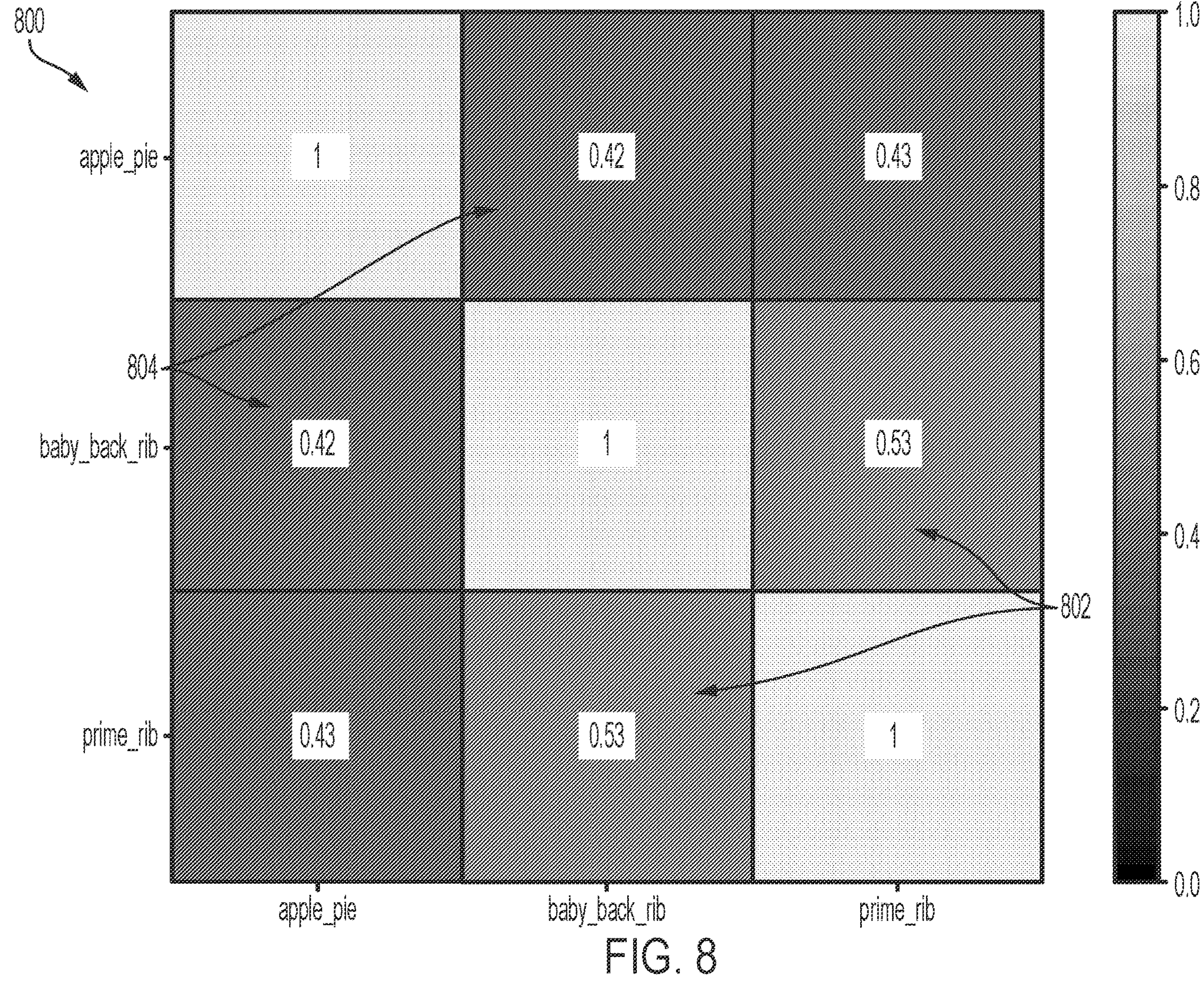
FIG. 8 shows a portion of the similarity matrix in FIGS. 7A-7M, according to some embodiments.

According to some embodiments, the system computes the OVLs in each dimension (e.g., in all 1024 dimensions) and normalizes the OVLs (e.g., by calculating a mean average of the OVLs) to generate the similarity matrix. FIGS. 7A-7M show an exemplary similarity matrix 700 generated for the ETHZ-101 dataset food categories, according to some embodiments. In particular, FIGS. 7A-7L show portions of the entire similarity matrix 700 shown in FIG. 7M. FIG. 8 shows a portion 800 of the similarity matrix 700 in FIGS. 7A-7M. FIG. 8 shows OVLs for three categories, namely apple pie, baby back rib, and prime rib. As shown, the OVLs provide an example of the similarity measure between the three different food categories. For example, baby back rib and prime rib show higher similarity 802 (0.53) compared to the similarity 804 for baby back rib and apple pie (0.42). Thus, apple pie is quite different from the other two categories. Prime rib and Baby back rib are visually similar, which indicated by higher similarity scores.

At step 410, the computing device groups, based on the data indicative of similarities between the digital images associated with different semantic categories, the plurality of semantic categories into clusters of semantic categories. According to some embodiments, the techniques use affinity propagation (AP) to group the semantic categories into groups of semantic categories based on the averaged overlap coefficients of the similarity matrix discussed above in conjunction with step 408. AP is described in, for example, Brendan J Frey and Delbert Dueck, "Clustering by passing messages between data points," Science 315, 5814 (2007), pp. 972-976, which is hereby incorporated by reference herein in its entirety.

As described in conjunction with Equation 2, the cross-entropy loss function can one-hot encode the ground truth label. Due to the nature of one-hot encoding, each pair of labels has the same $L^p$ distance. Therefore, for example, while a hamburger may be much more visually similar to a sandwich than to a banana, cross-entropy loss can ignore visual relationships and treat their similarity equivalently. It can therefore be desirable to make the distances between different categories closer (e.g., such that visually similar categories are closer), which cannot be supported by one-hot encoding alone. The techniques described herein, including using the hierarchy of food categories and multi-task machine learning techniques, can address such deficiencies of one-hot encoding. For example, according to some embodiments a network can be trained for retrieving the visual feature of each image using one-hot encoding, and visually similar categories can have a high similarity score (e.g., as discussed in conjunction with FIGS. 7A-M and 8). As shown in FIG. 8, the similarity score between Baby back rib and Prime rib, for example, is only 0.53 since the model was trained using cross-entropy loss. Therefore, the network can learn an implicit visual relation between categories, which can be made explicit by building the hierarchy of food categories. According to some embodiments, once the training loss for a CNN converges, the model has separated all categories as far as possible in feature space. However, since CNNs are visual-based models, the similar categories are still relatively close and can be used for learning visual relationships between categories.

Figure 9:
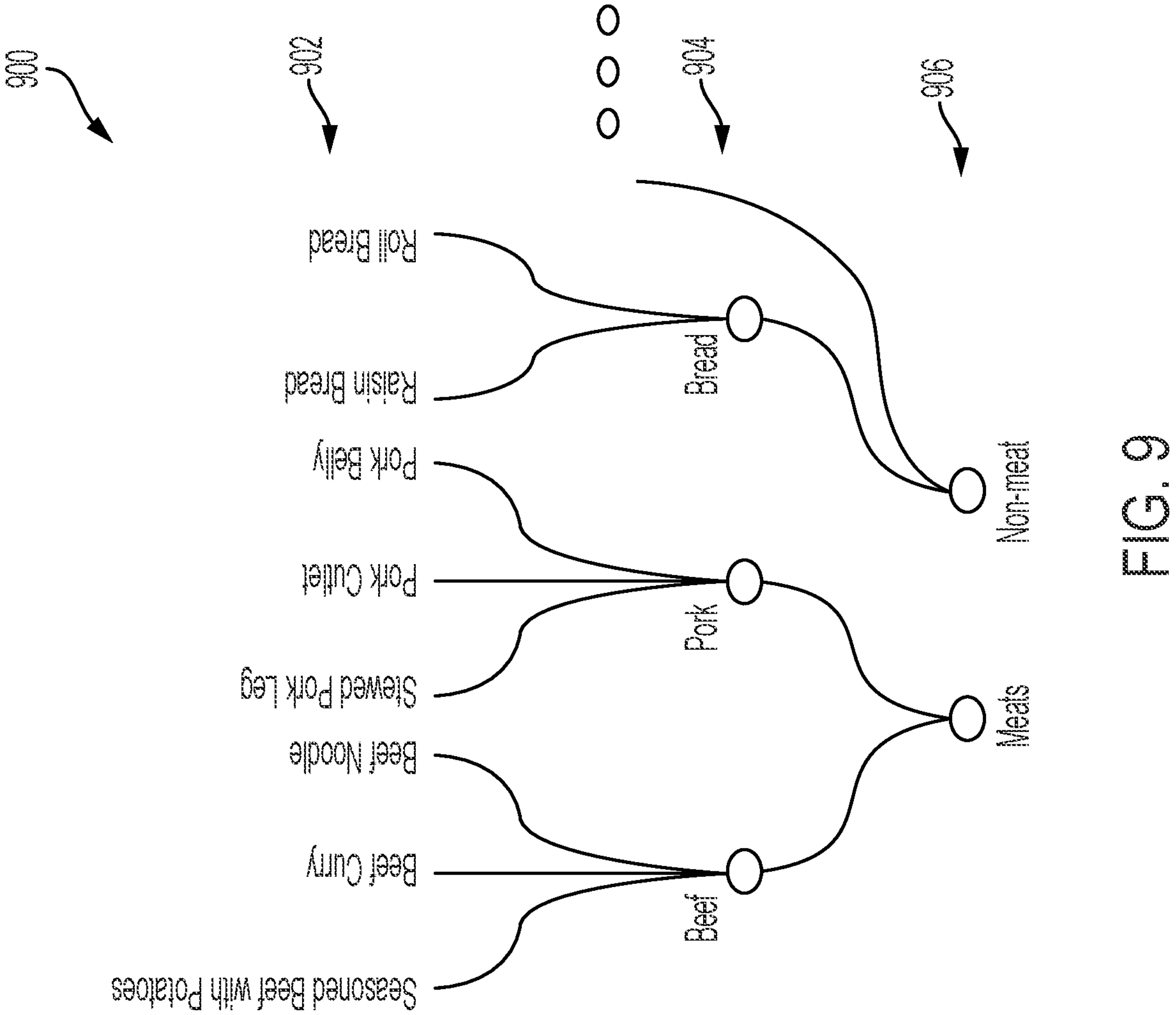
FIG. 9 shows an example of a portion of a hierarchical structure, according to some embodiments.

According to some embodiments, a hierarchical structure can represent the semantic and visual relations among food categories. FIG. 9 shows an example of a portion of a hierarchical structure 900, according to some embodiments. The hierarchical structure 900 includes three levels, 902, 904 and 906 for illustrative purposes, but it should be appreciated that other numbers of levels can be used in the hierarchy. The first level 902 of the hierarchy includes semantic labels. The second and third levels 904 and 906 of the hierarchy are clusters formed by grouping visually similar semantic categories (level 904) and clusters (level 906). For illustrative purposes, each category and cluster includes a label. For example, the first level 902 includes the labels "Seasoned Beef with Potatoes," "Beef Curry," and so on. The second level 904 includes the labels "Beef," "Pork," and so on. The third level 906 includes the labels "Meats" and "Non-Meats." It should be appreciated that while exemplary labels are shown for the clusters for illustrative purposes, the labels are generated as described herein and are therefore not typically meaningful to humans.

According to some embodiments, the system can cluster visually-similar food categories to generate a hierarchical structure. For example, the system can apply various types of clustering techniques to a similarity matrix to generate a set of clusters. For example, K-means can be used to efficiently partition a dataset into K clusters (e.g., and find the centroids of the K clusters). However, K-means may require a pre-defined number of clusters. Therefore, it may be desirable to use other techniques when the number of clusters is not known. AP is an exemplary technique that does not require the number of clusters to be known a priori since AP can determine the optimal cluster number. Therefore, some embodiments use AP to cluster the similar food categories and generate a multi-level hierarchical structure. According to some examples, AP can treat all food categories as candidates, and select m candidates as exemplars to represent m clusters separately. AP can iteratively refine the selection until it reaches an optimal solution.

According to some embodiments, the similarity matrices described herein (e.g., the s matrix) can be used as the input to AP. In some examples, the techniques can use two matrices, which are referred to herein as the "responsibility" matrix (r) and the "availability" matrix (a). Initially, both matrices are set to zero and then updated alternately as shown in Equation 3 and Equation 4:

$$r(i,k) \leftarrow s(i,k) - \max_{k' \neq k}(a(i,k') + s(i,k')) \quad \text{Equation 3}$$

$$a(i,k) \leftarrow \min(0, r(k,k) + \Sigma_{\notin(i,k)} \max(o, r(i',k))) \text{ for } i \neq k \; a(k,k) \leftarrow \Sigma_{i' \neq k} \max(0, r(i',k)) \quad \text{Equation 4}$$

The three matrices s, a, and r are N×N matrices, where N refers the total number of categories. In Equation 3, r(i,k) quantifies how well-suited the $k^{th}$ category is to be the exemplar for $i^{th}$ category, relative to other candidate exemplars. In Equation 4, a(i,k) quantifies how appropriate it is for the $i^{th}$ category to pick the $k^{th}$ category as its exemplar. If r(i, i)+a(i, i)>0, $x_i$ is selected as the exemplar. Each following iteration will update the selected exemplars. If the selection does not change for more than a predetermined number of iterations (e.g., 10 iterations, 15 iterations, etc.), the result can be considered optimal. Once the stable clusters are formed, the techniques can build the hierarchical structure based on the cluster results.

According to some embodiments described herein, multi-task learning can be used to train a machine learning model to classify an image into the multi-level hierarchy to recognize objects. For example, a multitask convolutional neural network can be employed that includes joint feature learning for each level.

Figure 10:
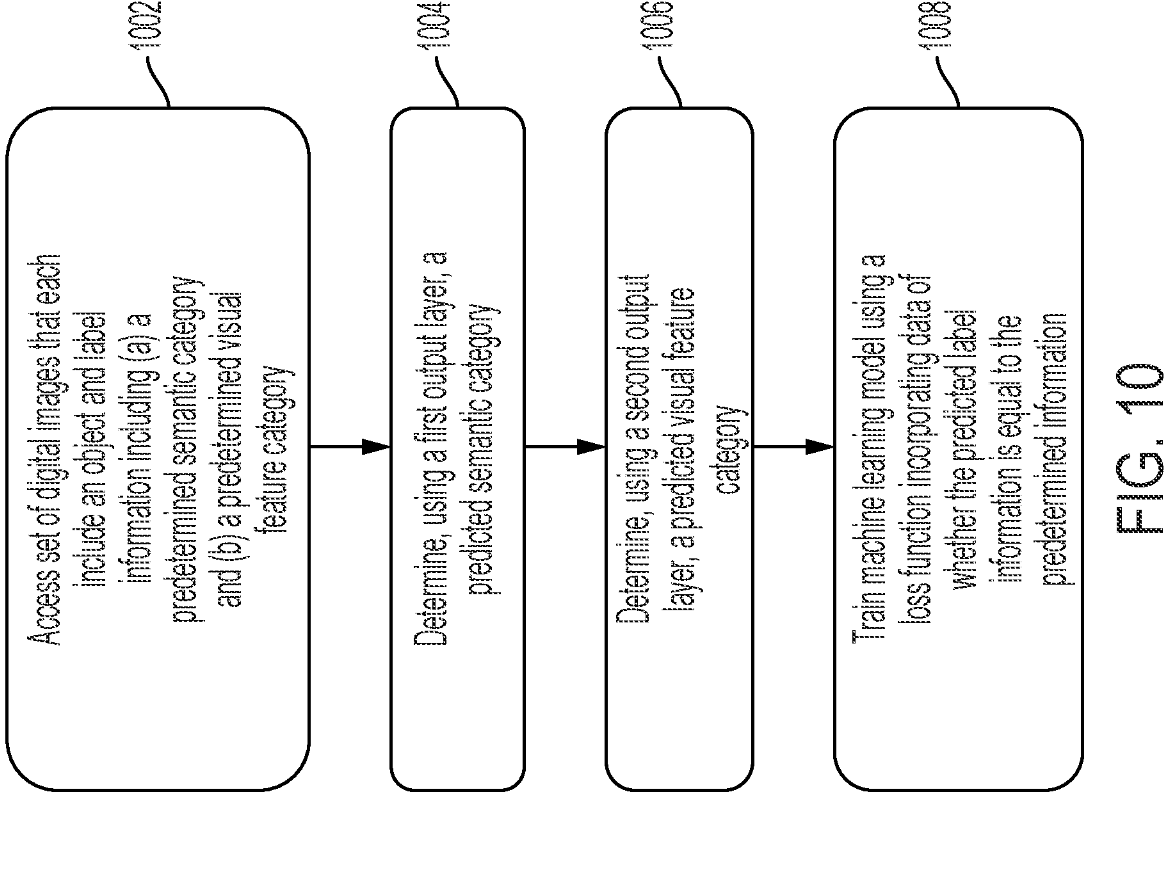
FIG. 10 is a diagram showing an exemplary computerized method for training a multi-task machine learning model for object recognition, according to some embodiments.

FIG. 10 is a diagram showing an exemplary computerized method 1000 for training a multi-task machine learning model for object recognition, according to some embodiments. At step 1002, the computing device accesses a set of digital images. Each digital image is of an object (e.g., food) and is associated with predetermined label information. The predetermined label information includes a predetermined semantic category of the object, as well as at least one predetermined visual feature category (e.g., a cluster label).

The predetermined label information can include labels for each level in a hierarchical tree structure. As described herein (e.g., in conjunction with FIG. 9), each digital image can be labelled according to a hierarchical structure. The first level of the hierarchical structure can include a plurality of semantic categories, and the second (and subsequent) levels of the hierarchical structure below the first level can include associated sets of visual feature categories. Since the labels in the hierarchical structure as arranged in a tree structure, each category of each level is linked to categories of the neighboring level(s). For example, each semantic category of the first level is associated with a visual feature category of the second level.

Figure 11:
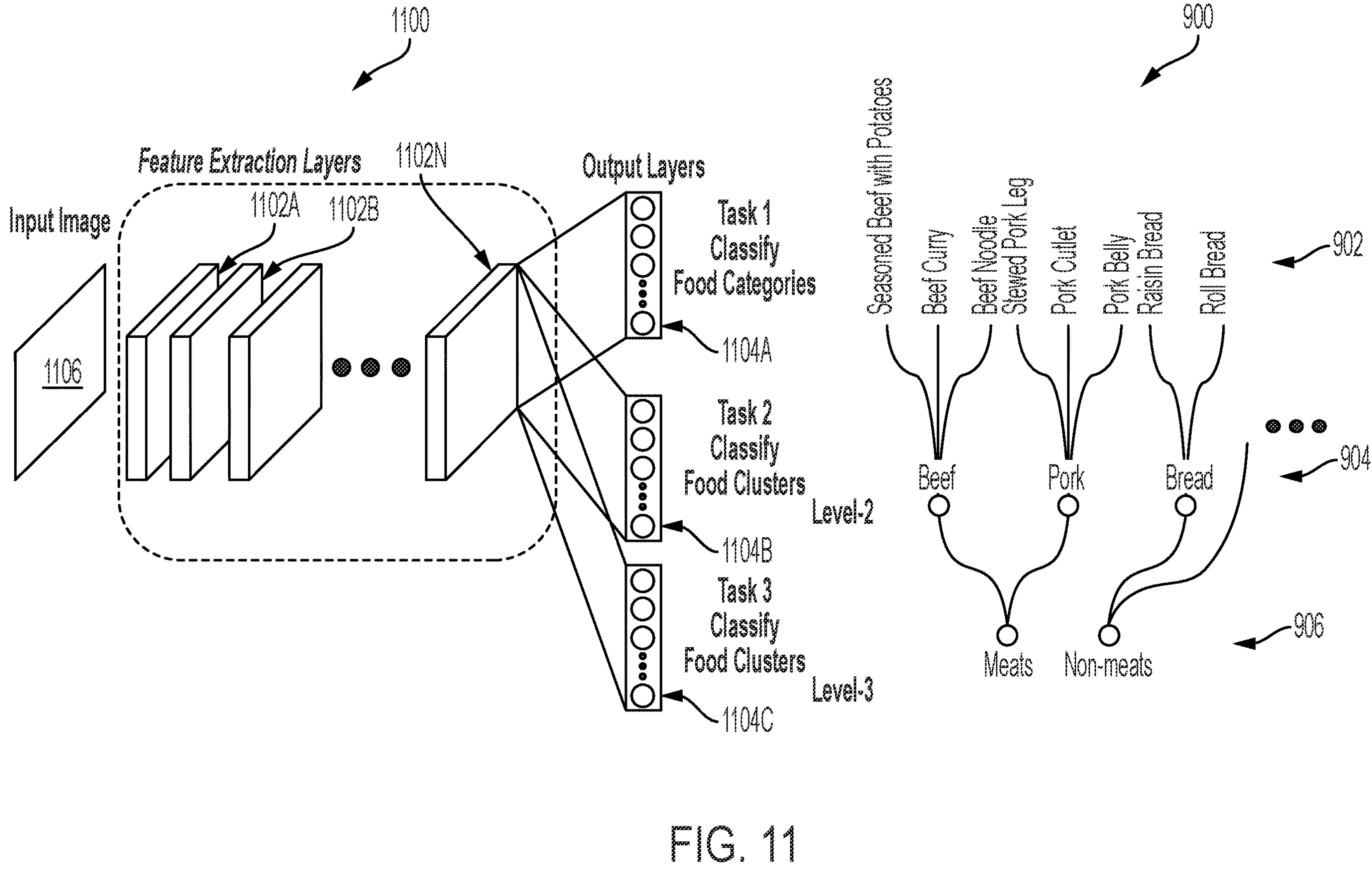
FIG. 11 is a diagram showing an exemplary multitask convolutional neural network and the portion of the hierarchical structure discussed in conjunction with FIG. 9, according to some embodiments.

FIG. 11 is a diagram showing an exemplary multitask convolutional neural network 1100 and the portion of the hierarchical structure 900 discussed in conjunction with FIG. 9, according to some embodiments. As discussed in conjunction with FIG. 9, the first level 902 of the hierarchy 900 includes semantic categories, and each remaining level of the hierarchy 904 and 906 (and further levels, if present) include visual feature categories. The predetermined label information of each image can include a semantic category for the first level of the hierarchy 902, and a visual feature category for each of the other levels of the hierarchy (levels 904 and 906).

Referring to steps 1004 and 1006, the computing device uses a multitask machine learning model to classify the set of digital images to determine predicted label information for each digital image. Like the predetermined label information, the predicted label information includes at least a predicted semantic category and a predicted visual feature category. At step 1004, the computing device determines, using a first output layer of the machine learning model, a predicted semantic category. At step 1006, the computing device determines, using a second output layer of the machine learning model, a predicted visual feature category.

Referring further to FIG. 11, the neural network 1100 includes a plurality of feature extraction layers 1102A, 1102B through 1102N, collectively referred to as feature extraction layers 1102. The feature extraction layers can include various types and arrangements of layers. For example, one or more convolutional layers, one or more pooling layers, an activation layer, a batch layer, and/or the like can be used for feature extraction layers.

According to some embodiments, classifying the set of digital images (e.g., steps 1004 and/or 1006) can include using the machine learning model to determine a visual feature vector for each image that has an associated set of visual features. For example, a multi-dimension space vector, such as a 1024-dimension space vector as described herein, can be used, with each dimension of the visual feature vector corresponding to a different visual feature. Referring to FIG. 11, the last feature extraction layer 1102N can generate the visual feature vector for each of the input images 1106.

The computing device can determine labels for each level of the hierarchical structure using an associated output layer of the neural network for each level. For example, referring to step 1004, the computing device can determine the predicted semantic category using a first output layer of the neural network model and the visual feature vector generated by the output layer of the feature extraction layers of the NN model. Referring to step 1006, the computing device can determine the predicted visual feature category using a second output layer of the neural network model and the visual feature vector. Each output layer can include a different number of nodes, where the number of nodes is related to and/or corresponds to the number of labels of the associated level in the hierarchical structure. Each output layer can be fully-connected to the high-level features generated by the feature extraction layers of the neural network. For example, each output layer can be fully connected to the visual feature vector generated by the output layer of the feature extraction layers.

Referring to FIG. 11, the neural network 1100 includes a plurality of output layers, including three output layers 1104A, 1104B and 1104C in this example, collectively referred to as output layers 1104. As shown in this example, the neural network 1100 has an output layer 1104 for each level of the hierarchical structure 900. In this example, the first output layer 1104A is used to classify the output of the feature extraction layers (e.g., the visual feature vector) into one of the food categories of the semantic level 902 of the hierarchical structure 900. The second output layer 1104B is used to classify the output of the feature extraction layers into one of the food clusters of the cluster level 904. The third output layer 1104C is used to classify the output of the feature extraction layers into one of the food clusters of the cluster level 906. If further levels of hierarchical structure 900 are present, the neural network 1100 may include further output layers 1104 for each additional layer.

At step 1008, the computing device trains the machine learning model using a loss function. The loss function incorporates data indicative of whether the predicted label information for each digital image is equal to the predetermined label information of the digital image. For example, the loss function incorporates data indicative of whether the predicted semantic category and predicted visual cluster(s) are equal to the corresponding values in the predetermined label information. The training process therefore trains based on the result of each output layer classification into an associated set of (semantic or visual) categories. The training process can include simultaneously training on each output layer/level classification. By learning based on each hierarchical level in parallel, the machine learning model can be more robust than other types of models.

Given N training images, $$\{x_i, y_i\}_{i=1}^{N},$$

where $x_i$ is the vectorized image and $y_i \in Y$ is the corresponding label, a cross-entropy loss function for a conventional (non-multitask) CNN can be formulated as shown below in Equation 5:

$$L(w) = \sum_{i=1}^{N} -\log p(y_i \mid x_i, w) \qquad \text{Equation 5}$$

where:

w represents parameters of the network; and $p(y_i|x_i,w)$ is the output of the network for the $i^{th}$ node in the last fully connected layer. A model can be trained using Equation 5 to minimize the loss to maximize the output value of the $i^{th}$ node for input images with label $y^i$.

Instead of a conventional, non-multitask CNN, the techniques disclosed herein use a multi-task CNN to predict, for training images, a label for each level in a multi-level hierarchical structure. As an example, suppose there is a hierarchical structure $\psi=$ $$\{Y^{(t)}\}_{t=1}^{T}$$

with T levels, where $\{Y^{(t)}\}$ represent the $t^{th}$ level's label set of the given T-level hierarchical structure. Each node in each level will be assigned a label, e.g.

$$\{y_i^{(1)}\}_{i=1}^{N_1}$$

represent the semantic category set and $$\{y_i^{(2)}\}_{i=1}^{N_2}$$

represent the label set for the cluster in the second level. Thus a multi-task loss function can be formulated as L(w)=

$$\sum_{t=1}^{T} \lambda_t \sum_{i=1}^{N_t} -\log p\left(y_i^{(t)} \mid x_i, w_0, w^{(t)}\right) \qquad \text{Equation 6}$$

Where:

$$y_i^{(t)} \in Y^{(t)}$$

is the corresponding class/cluster label for the $t^{th}$ hierarchical level;

$w^{(t)}$ represents the network parameters for the $t^{th}$ output layer;

$w_0$ composes the parameters of the feature extraction layers; and $\lambda_t$ is the hyperparameter that controls the weight of the $t^{th}$ level contribution in the given hierarchical structure.

Various techniques can be used to configure the network parameters, including weights and/or other parameters of Equation 6. For example, the weights can be initialized using corresponding weight values of a pre-trained network. As another example, the parameter $w^{(t)}$ for various layers (e.g., for $t^{th}$ added fully connected layers) can be learned from scratch. For example, as described in the Examples section that follows, during the training process the weights of the shared feature extraction layers can be initialized using the values of the corresponding network pre-trained on the ImageNet dataset, while the parameter $w^{(t)}$ for the $t^{th}$ added fully connected layers are learnt from scratch. The ImageNet dataset is described in, for example, Alex Krizhevsky, Ilya Sutskever, and Geoffrey E Hinton, "Imagenet classification with deep convolutional neural networks," Proceedings of Advances in Neural Information Processing Systems (December 2012), 1097-1105, which is incorporated by reference herein in its entirety.

According to some embodiments, the techniques described herein relate to building a data set for training food recognition techniques, including determining the food category labels to use for the images in the data set. According to some embodiments, the techniques provide for semi-automatic food image collection and annotation to build image data sets. As described herein, collecting food images with proper annotations in a systematic way can be very time-consuming and tedious using conventional tools (e.g. Amazon Mechanical Turk). The techniques described herein provide for a semi-automatic data collection system to efficiently collect large sets of relevant online food images. The techniques can be configured for online food image collection and annotation to build a large image dataset.

According to some embodiments, conventional data set(s) can be used to build part of the data set. The What We Eat In America (WWEIA) dataset provides two days of 24-hour dietary recall data, as well as the intake frequency of each food category for the two days of 24-hour recall. The WWEIA dataset is described in/available from, for example, "What We Eat in America," NHANES 2015-2016, U.S. Department of Agriculture, Agricultural Research Service, Beltsville Human Nutrition Research Center, Food Surveys Research Group (Beltsville, MD) and U.S. Department of Health and Human Services, Centers for Disease Control and Prevention, National Center for Health Statistics (Hyattsville, MD), which is incorporated by reference herein in its entirety.

According to some embodiments, food categories can be selected based on WWEIA and/or other similar data sets, including selecting food categories with high intake frequency to create a food image dataset that represents frequently consumed foods in the United States. The food categories can include associated food codes created by the United States Department of Agriculture (USDA), which can be used to retrieve nutrient information through standard food nutrition databases (e.g., such as the FNDDS, which is described in/available from the USDA Food and Nutrient Database for Dietary Studies 2015-2016, Agricultural Research Service, Food Surveys Research Group, 2018, which is incorporated by reference herein in its entirety). According to some embodiments, approximately 50-100 food categories can be selected (e.g., from the WWEIA database) for the training data set, and more specifically approximately 70-90 food categories, and even more specifically approximately 80 food categories (e.g., 78, 79, 80, 81, 82 and/or more or less food categories). According to some embodiments, more or less food categories can be used, as desired (e.g., for training purposes, validation purposes, etc.).

According to some embodiments, the techniques leverage food images that are shared online to build an image data set since hundreds of thousands of food images are uploaded (e.g., by smartphone users), and the food images can provide valuable contextual information, such as the users' dietary patterns, food combinations, and/or other information. Some embodiments provide a web crawler that can quickly collect a large number of online food images. According to some embodiments, the techniques automatically search online collections of images (e.g., on the Google Image website) based on selected food labels. In some embodiments, the resulting images can be selected based on one or more criteria (e.g., according to the relevant ranking of the image).

Some embodiments provide for removing images from the data set. For example, some of the automatically retrieved images may be noisy images (e.g., which do not contain relevant foods of determined semantic categories, include too much background noise, and/or the like). Some embodiments use a trained Faster R-CNN for food region detection to remove non-food images. The techniques can include providing a foodness score to represent the objectness of the detected food region, and a threshold value can be set (e.g., based on experiments).

According to some embodiments, the collected food images (e.g., the set of food images that pass the noise removal step) can be further confirmed, labeled and/or processed (e.g., localizing food items), such as by using an online crowdsourcing tool. In some examples, the crowdsourcing tool facilitates users to draw bounding boxes around each food item in the image, and to select the food category associated with each bounding box. The tool was used to create the VIPER-FoodNet (VFN) dataset, discussed further in the experimental results section that follows.

As described herein, classifying foods based on visual information alone can be challenging due to the high complexity and inter-class similarity of foods. For example, different foods may be similar in shape, texture, color, and various other visual features (e.g., a cucumber and a zucchini squash are similar in appearance). In such instances, it may be reasonable to expect some level of classification error. However, foods that are visually similar may not be nutritionally similar. For example, visually similar foods may contain different nutrients and energy (e.g., a bagel and a donut). For this reason, the inventors have appreciated that using only visual information for food classification may produce unreliable results for dietary assessment and/or other tasks that involve food classification.

The techniques described herein improve conventional machine learning by automatically organizing a set of training images into a hierarchical structure based on both visual and nutritional information, without requiring manual operator input to specify specific hierarchical structure. The hierarchical structure has multiple levels that include both level(s) of semantic categories and level(s) of nutritional and visual feature categories. According to some embodiments, the top (e.g., finest) layer of the hierarchical structure is grouped based on semantic categories, while one or more lower (e.g., progressively coarser) layers are grouped based on nutritional and visual features. The techniques can cluster visually and nutritionally similar food categories to automatically generate (e.g., without manual operator input) the hierarchical structure. According to some embodiments, nutrient values associated with nutrient categories (e.g., energy, carbohydrates, fat, protein, etc.) are determined for different food categories. According to some embodiments, visual features of the images are extracted, such as by using machine learning techniques as described herein (e.g., including with respect to FIG. 4). The techniques include using the nutrient values and the extracted visual features to identify correlations between different food categories.

According to some embodiments, nutrient values determined for each food category can be used to compute the nutritional similarity between food categories. As also described herein (e.g., including with respect to FIG. 4), a feature map of the convolutional layer of a CNN can be used to compute the visual similarity between food categories. According to some embodiments, the nutritional and visual similarities between food categories can be used to compute an overall inter-class similarity between food categories and cluster visually and nutritionally-similar food categories automatically.

Figure 12:
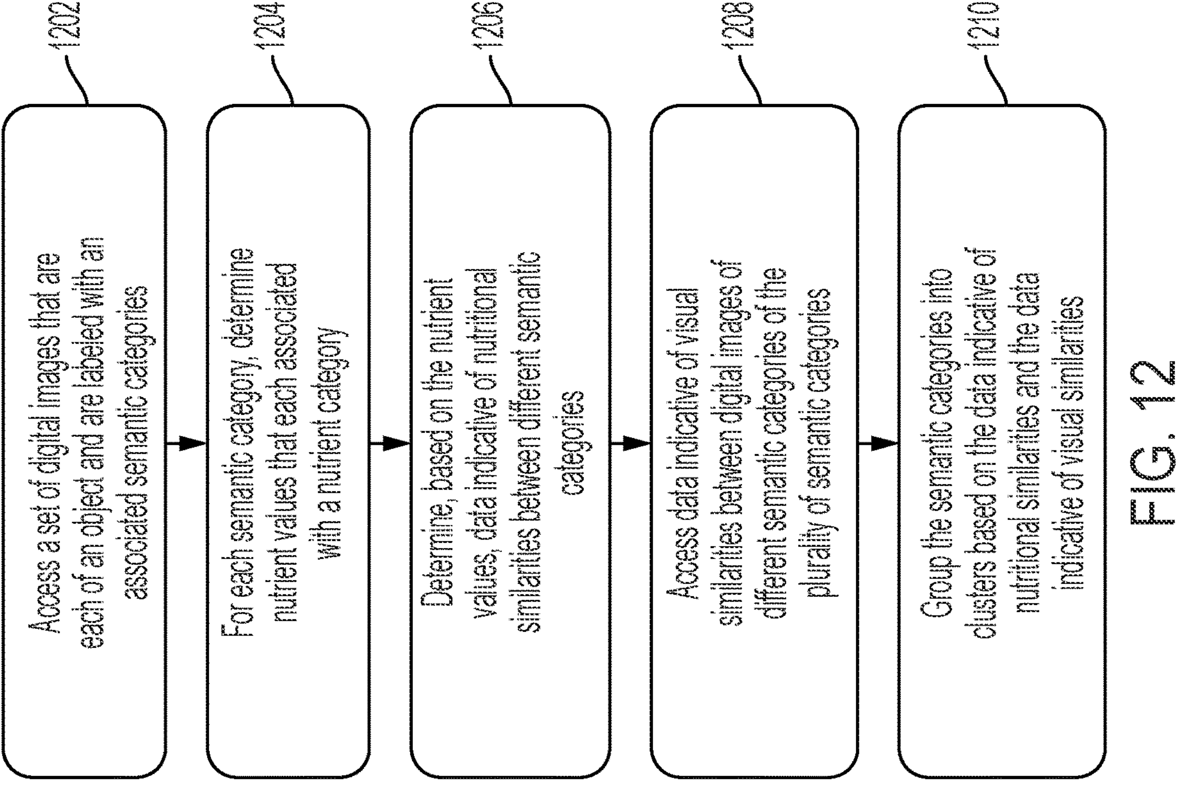
FIG. 12 is a flowchart showing an exemplary computerized method for grouping images of objects (e.g., food) based on semantic, visual, and nutritional information associated with the objects, according to some embodiments.

According to some embodiments, the techniques provide for building a hierarchy of food categories according to visual and nutritional similarities, where the hierarchy includes level(s) with semantic groups and level(s) with visually and nutritionally-determined clusters. FIG. 12 is a flowchart showing an exemplary computerized method 1200 for grouping images of objects (e.g., food) based on semantic and nutritional information associated with the objects, according to some embodiments. At step 1202, the computing device (e.g., the computing device 1700 described in conjunction with FIG. 17) accesses a set of digital images. Each digital image is of at least one object (e.g., one or more foods) that is associated with a semantic category. The semantic category is one of a plurality of semantic categories associated with a set of digital images, and each digital image is labelled with data indicative of the semantic category of food(s) in the image.

At step 1204, the computing device determines, for each semantic category, one or more nutrient values that are each associated with a nutrient category. According to some embodiments, a nutrient category may represent a nutrient, such as fat, protein, carbohydrates, energy, calcium, and/or any other suitable nutrient. A nutrient value may be indicative of an amount of each nutrient in a particular food item (e.g., grams of carbohydrates in a banana).

According to some embodiments, the techniques include accessing one or more database(s) storing nutrient values associated with nutrient categories for different food items to determine nutritional values for the semantic category. For example, in some embodiments the techniques can access nutrition information stored in the USDA Food and Nutrient Database for Dietary Studies (FNDDS). According to some embodiments, one or more food items may belong to a single semantic category. In some embodiments, if a single food item belongs to a semantic category, the food item can be associated with individual nutritional values. In some embodiments, multiple food items can belong to a semantic category. For example, both cake and cupcake (and potentially other foods) may belong to a same semantic category. As a result, a semantic category that includes multiple food items may have a distribution of nutrient values associated with each nutrient category. As a result, in some embodiments, a single nutrient value can be determined for each nutrient category by computing an average and/or other combined value (e.g., median, mean, etc.) based on the corresponding distribution. For example, for a semantic category that includes both cupcakes and cake, the techniques can include determining a nutrient value associated with carbohydrates by averaging the amount of carbohydrates in cupcakes and the amount of carbohydrates in cake.

At step 1206, the computing device determines, based on the nutrient values determined at step 1204, data indicative of nutritional similarities between different semantic categories. According to some embodiments, the techniques can compare one or more of the nutrient values determined at step 1204 to determine the data indicative of nutritional similarities. In some embodiments, nutrient values for one nutrient are compared to make the determination. In some embodiments, nutrient values for two or more nutrients are compared to make the determination. In some embodiments, when comparing multiple nutrients, the multiple nutrients can be evenly weighted so that each nutrient contributes the same to the nutritional similarity data. In some embodiments, different weights can be used in order to factor one or more nutrients into the similarity data more than one or more other nutrients used for the comparison. It should be appreciated that various different sets of nutrients can be used to determine the data indicative of the nutritional similarities, and therefore while examples are provided herein, they are not intended to be limiting.

According to some embodiments, similarities among food items can be determined based on a diet. For example, food items can be compared based on the nutrients that they comprise (e.g., based on the nutrient values determined in step 1204) in accordance with a diet. In some embodiments, the same nutrient may have significantly different distributions for different foods. For example, a donut and an apple may have significantly different fat distributions. Further, in some embodiments, different foods may be nutritionally similar with respect to a first set of nutrients, while nutritionally different with respect to a second set of one or more nutrients. For example, pizza and cottage cheese may be nutritionally similar with respect to sodium, while nutritionally different with respect to fat.

In some embodiments, since different diets may be based on different nutrients, the techniques can emphasize different nutrients as necessary when determining nutritional similarities among foods (e.g., depending on the diet). For example, a dietary assessment may focus on the consumption of particular nutrients to evaluate a nutritional status of a certain population. As a result, the foods can be compared based on such nutrients of interest. In some embodiments, the particular nutrients under consideration may depend on the application of the dietary assessment. For example, energy, carbohydrates, protein, and fat, which are nutrients important to glycaemic control, may be used for applications related to monitoring the nutrition status of diabetic individuals. Similarly, calcium, vitamin D, and protein, which are nutrients important to bone health, may be used for applications related to improving bone health for older women who are at an increased risk of developing osteoporosis. As another example, a low sodium diet and a fat-restricted diet may weight the importance of sodium and fat differently when comparing foods. Continuing with the pizza and cottage cheese example (where the foods may share a similar sodium content but a different fat content), the techniques may combine the sodium and carbohydrate nutrient information, among other nutrient information, to determine a measure of similarity. When applied to a dietary assessment for monitoring sodium intake, a weighting parameter may be used to emphasize sodium in the measure of similarity between the two foods (e.g., to weight sodium more than fat). As a further example, when applied to a dietary assessment for promoting overall health and disease prevention, a weighting parameter may be used to emphasize nutrients that are inadequately consumed in the target population (e.g., calcium, potassium, fiber, vitamin D, and protein are nutrients that are considered to be under-consumed in the U.S.). It should be appreciated that there are a variety of nutrients and combinations of nutrients that could be emphasized for a range of applications and therefore, while examples are provided herein, they are not intended to be limiting.

According to some embodiments, the nutritional similarity information is determined by generating a nutritional similarity matrix. The similarity matrix can be a two-dimensional matrix generated based on the number of semantic categories. For example, the number of rows and columns of the matrix can both be equal to the total number of semantic categories, such that each row and each column is associated with one of the plurality of semantic categories.

The system can determine, for each matrix entry in the similarity matrix, data indicative of a similarity between one or more nutrient values determined for (a) the semantic category of the row of the matrix entry and (b) the semantic category of the column of the matrix entry. In some embodiments, the system can use the one or more nutrient values determined at step 1204 to compute nutritional similarity scores for pairs of semantic categories, which may be used to populate each entry of the similarity matrix.

According to some embodiments, computing nutritional similarity scores between a pair of semantic categories can include (a) determining a similarity score $s_i$ for each nutrient category and (b) combining the similarity scores $s_i$ determined for each nutrient category for the pair of semantic categories. In some embodiments, any metric, such as a Euclidian metric and/or a weighted metric, can be used to determine the similarity scores $s_i$ for each nutrient category. In some embodiments, the similarity scores $s_i$ can be combined in any suitable way, such as by computing the average, weighted average, median, and/or any other suitable metric. For example, it can be desirable to use one value to represent similarities across the various nutritional classes, so different similarity scores can be combined into one metric $S_N$.

In some embodiments, the techniques can include computing (a) individual similarity scores for each nutrient category and (b) combining those similarity scores for each nutrient category into one metric. The similarity scores for each nutrient category can be computed using a Radial Basis Function (RBF) kernel as shown in Equation 7. The similarity scores for each nutrient category can be combined using a harmonic mean using Equation 8.

$$s_i(x_1, x_2) = \exp\left(-\frac{\|x_1 - x_2\|^2}{2\sigma^2}\right) \quad \text{Equation 7}$$

$$S_N = \frac{\sum_{i=1}^{n} w_i}{\sum_{i=1}^{n} w_i s_i^{-1}} \quad \text{Equation 8}$$

Equation 7 shows an example RBF kernel for computing a similarity score $s_i$ between two semantic categories for the $i^{th}$ nutrient category, where: $x_1$ is the nutrient value for a first semantic category, $x_2$ is the nutrient value for a second semantic category, and $\sigma_i$ is the inter-class standard deviation for the $i^{th}$ nutrient category (e.g., such that each nutrient category can have a different inter-class standard deviation). According to some embodiments, the inter-class standard deviation for the $i^{th}$ nutrient category may be determined based on the range of nutrient values associated with the $i^{th}$ nutrient category for all of the semantic categories under consideration. Table 1 shows example inter-class standard deviations σ and ranges {minimum value, maximum value} for four example nutrient categories energy, carbohydrate, fat and protein. Table 1 summarizes the inter-class standard deviations and ranges for a group of exemplary foods (for 100 grams of each food), such that the range represents the extreme low and high values for the class across the foods, and the inter-class standard deviation is the standard deviation of the plot of the class values for the foods in the group. While using an RBF kernel is one example for determining similarity scores $s_i$ for nutrient categories, other techniques can be used to determine the scores, and therefore Equation 7 is not intended to be limiting.

Equation 8 shows an example for computing a nutritional similarity score $S_N$ for a pair of semantic categories using similarity scores $s_i$ for n nutrient categories. For Equation 8, $s_i$ is a function of two inputs $x_1$ and $x_2$ for nutrient category i of a pair of foods under consideration (e.g., as shown in Equation 7), and the summations are performed from 1 to n, where n is the number of nutrient categories under consideration (e.g., such that if the nutrient categories are energy, carbs, fat and protein, then n is equal to four). In some embodiments, the parameter $w_i$ may be used to weight the similarity scores $s_i$ depending on different dietary purposes. In some embodiments, the weight value may be the same to weigh all nutrients the same as described herein. For example, in the context of glycaemic control, the same weight value may be used to weigh protein, fat, energy, and carbohydrates if they are all equally important to the diet. In some embodiments, it may be desirable to use different weights to favor one or more nutrients over other nutrients. For example, if the food classification techniques are used to determine an amount of calcium being consumed to monitor bone health, it may be desirable to weigh calcium consumption more over other nutrients. Therefore, weighting parameter $w_i$ may be adjusted to more heavily weight the similarity score $s_i$ for calcium to reflect its relative importance in the context of dietary assessment related to bone health. In some embodiments, the weighting parameter $w_i$ may also be reduced to zero to eliminate certain nutritional categories (e.g., category i) from consideration.

TABLE 1

Example Nutrient Inter-class Standard Deviations

| Nutrient Category | Energy | Carbohydrate | Fat | Protein |
|---|---|---|---|---|
| σ | 119.42 | 17.20 | 8.41 | 8.13 |
| Range | {34.0, 595} | {0.71, 68.1} | {0.15, 51.7} | {0.16, 30.5} |

At step 1208, the computing device accesses data indicative of visual similarities between digital images of different semantic categories of the plurality of categories. According to some embodiments, this may include accessing data determined according to the techniques described herein including with respect to FIG. 4. For example, the techniques may access a visual similarity matrix, such as the visual similarity matrix discussed above in conjunction with step 408 of exemplary computerized method 400.

Figures 13A, 13B:
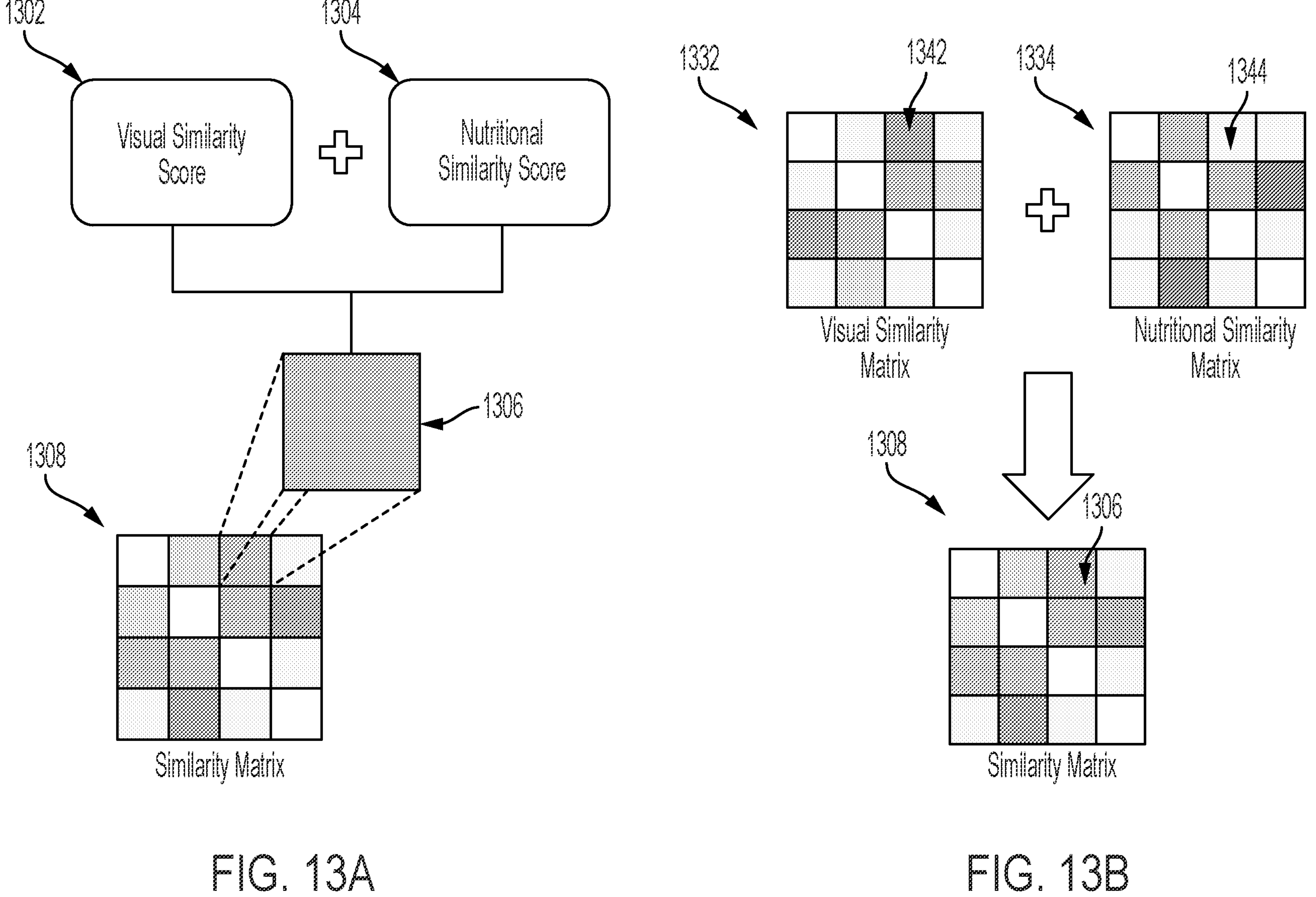
FIGS. 13A-B show exemplary diagrams of a process for generating a similarity matrix, according to some embodiments.

According to some embodiments, the data indicative of nutritional similarities between different semantic categories may be combined with data indicative of visual similarities between digital images associated with different semantic categories (e.g., determining visual similarities according to the techniques described herein, including with respect to FIG. 4). This may include, for example, generating separate nutritional and visual similarity matrices, and generating a combined visual and nutritional similarity matrix of those two matrices that represents both visual and nutritional similarities between pairs of semantic categories. Each entry in the visual and nutritional similarity matrix can be determined based on associated visual and nutritional similarity scores. For example, FIG. 13A shows a visual and nutritional similarity matrix 1308 with a set of rows and columns that are both equal to the total number of semantic categories (such that each row and each column is associated with one of the plurality of semantic categories, as described herein). Each entry in the visual and nutritional similarity matrix 1308 contains a similarity score that can be determined based on a visual similarity score and a nutritional similarity score for the semantic category corresponding to the row of the entry and the semantic category corresponding to the column of the entry. As shown in FIG. 13A, for example, a visual similarity score 1302 determined for a pair of semantic categories and a nutritional similarity score 1304 determined for the pair of semantic categories may be combined to determine a nutritional and visual similarity score for the pair of semantic categories. This score may be used to populate matrix entry 1306 of the visual and nutritional similarity matrix 1308 for those semantic categories corresponding to the row of matrix entry 1306 and column of matrix entry 1306. According to some embodiments, a visual and nutritional similarity score for a pair of semantic categories may be computed using Equation 9:

$$S = 2 \times \frac{S_V \times S_N}{S_V + S_N} \quad \text{Equation 9}$$

Where: $S_V$ represents the visual similarity score for the pair of semantic categories and $S_N$ represents the nutrition similarity score for the pair of semantic categories. While Equation 9 shows one example of how to integrate the visual and nutritional scores using a harmonic mean, other techniques can be used to combine the score, and therefore Equation 9 is not intended to be limiting.

FIG. 13B shows how a visual similarity matrix 1332 (e.g., generated according to the techniques described with respect to FIG. 4), can be combined with a nutritional similarity matrix 1334, to generate the combined nutritional and visual similarity matrix 1308. In this example, the visual similarity matrix 1332, the nutritional similarity matrix 1334, and the nutritional and visual similarity matrix 1308 have a same number of rows and columns that are equal to the total number of semantic categories (such that each row and each column of matrices 1332, 1334 and 1308 is associated with a same one of the plurality of semantic categories). The similarity scores in the visual similarity matrix 1332 can be combined with the similarity scores in the nutritional similarity matrix 1334 to populate the entries in the nutritional and visual similarity matrix 1308. For example, as shown, corresponding matrix entries 1342 and 1344 may be averaged to populate matrix entry 1306 for the corresponding pair of semantic categories. Alternatively, corresponding matrix entries 1342 and 1344 may be combined using Equation 9. In yet other embodiments, corresponding matrix entries 1324 and 1344 may be added or multiplied together to populate matrix entry 1306. As discussed previously, other techniques may also be used to combine the score.

At step 1210, the computing device automatically groups the semantic categories into clusters based on the data indicative of nutritional similarities and the data indicative of visual similarities. According to some embodiments, the techniques use AP to group the semantic categories into groups of semantic categories based on the nutritional similarity scores discussed in conjunction with step 1206. Additionally or alternatively, the system can cluster visually and nutritionally-similar food categories to generate a hierarchical structure. According to some embodiments, the techniques use AP to group the semantic categories into groups of semantic categories based on the combined visual and nutritional similarity scores, such as those that can be computed using Equation 9. Techniques for clustering are further described herein, including with respect to FIG. 4 and FIG. 9.

Figure 15:
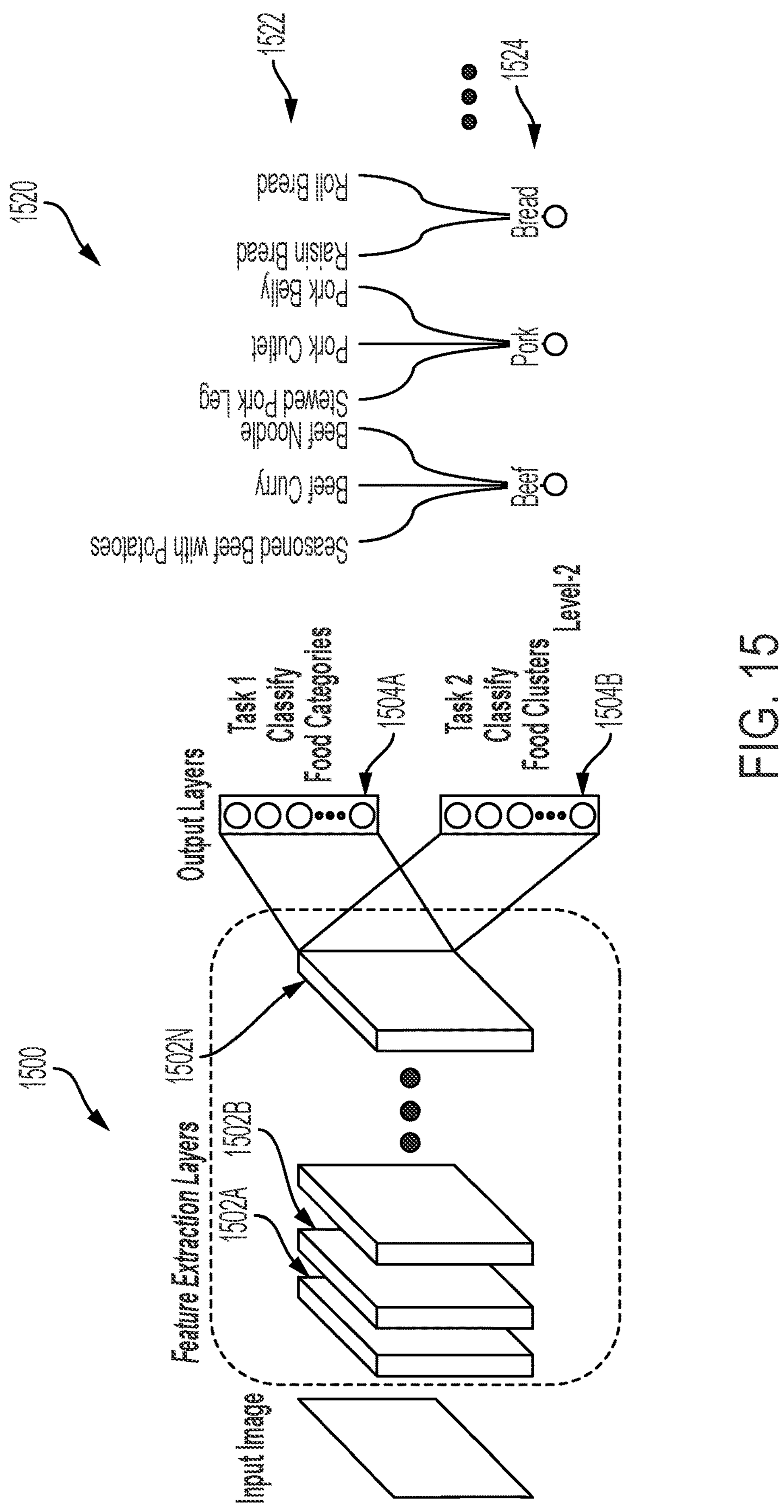
FIG. 15 shows an example of a portion of a hierarchical structure, according to some embodiments.
Figures 16A, 16B:
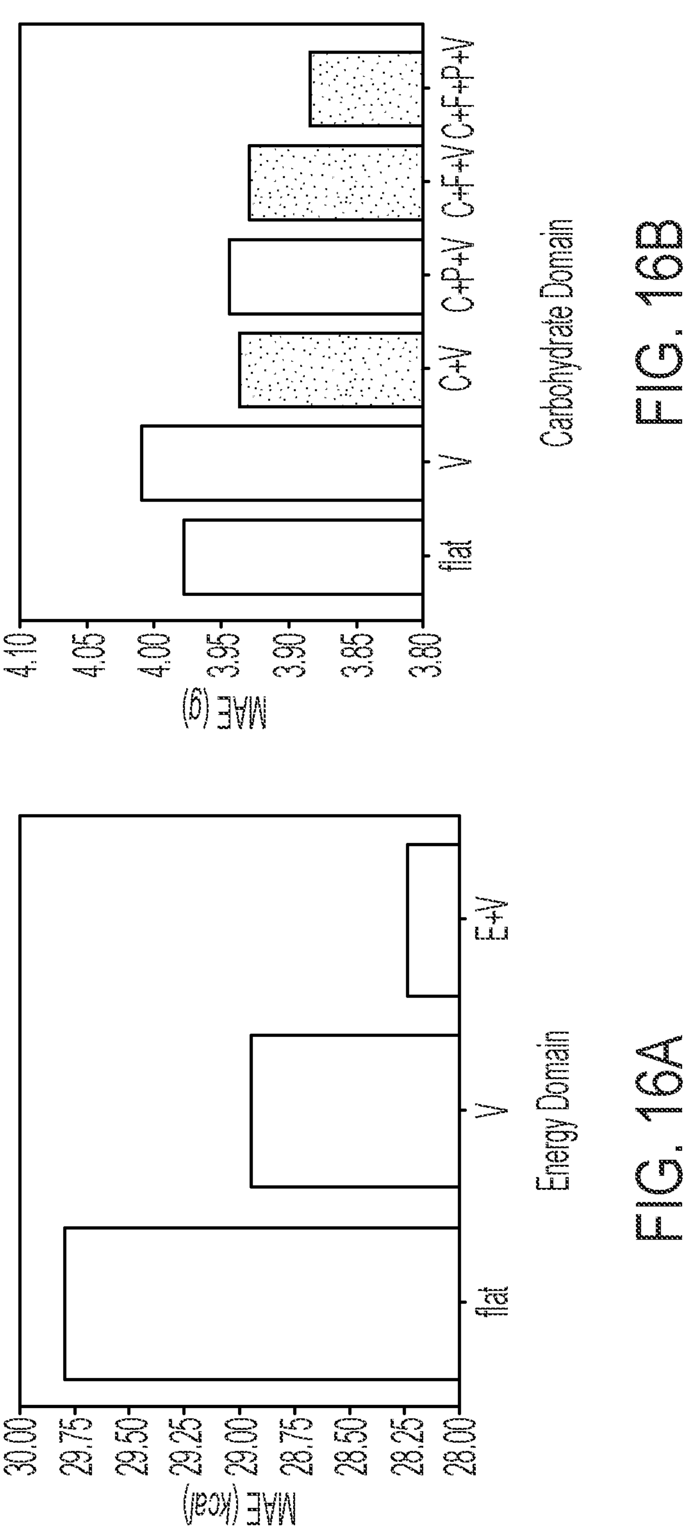
FIGS. 16A-D are charts that compare results of classifying images of objects (e.g., food) using hierarchical classification with results of classifying images of objects using flat training classification, according to some embodiments.
Figures 16C, 16D:
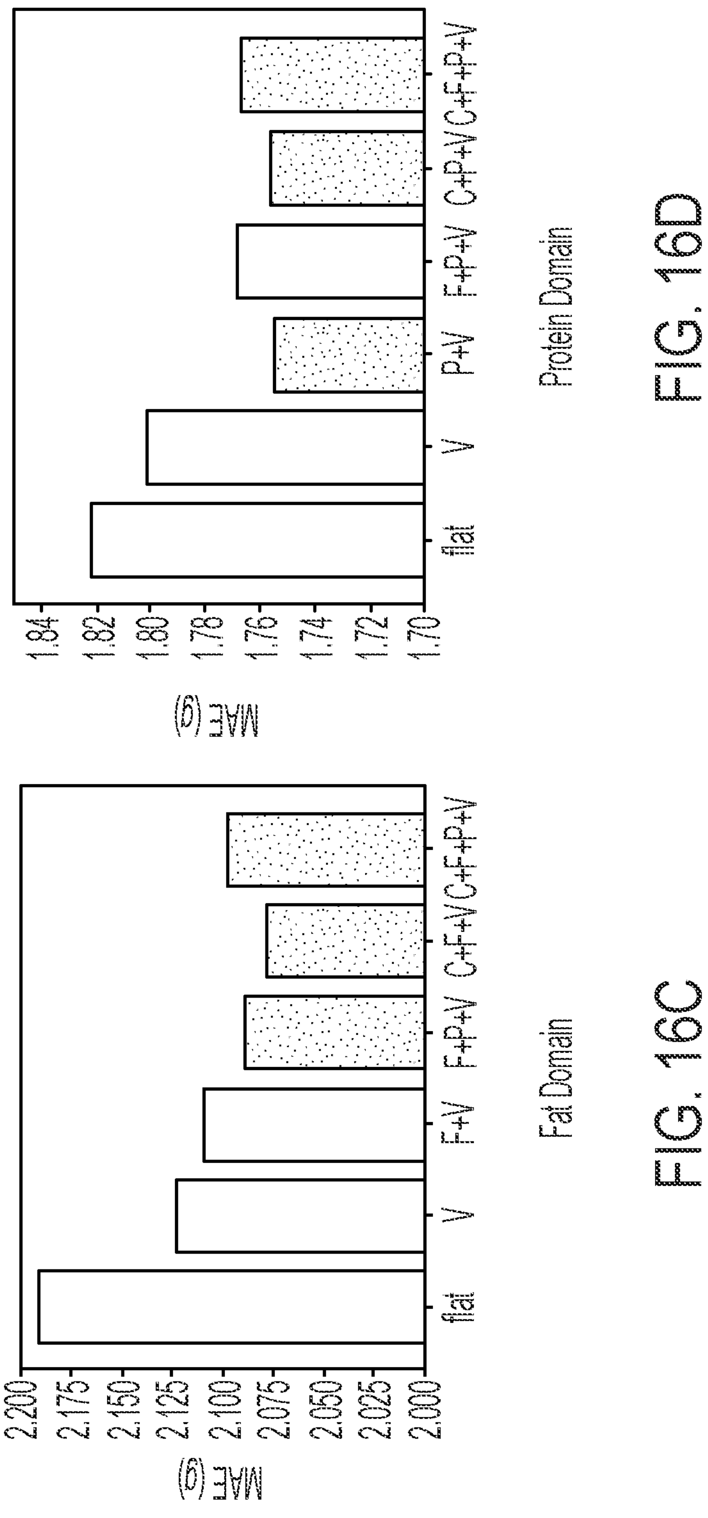

According to some embodiments, a hierarchical structure can represent the semantic, visual, and nutritional relations among food categories. FIG. 15 shows an example portion of a hierarchical structure 1520 representing semantic, visual and nutritional relations, according to some embodiments. The hierarchical structure 1520 includes two levels, levels 1522 and 1524 for illustrative purposes, but it should be appreciated that other numbers of levels can be used in the hierarchy. The first level 1522 of the hierarchy includes semantic labels. The second level 1524 of the hierarchy are clusters formed by grouping visually and nutritionally similar semantic categories. For illustrative purposes, each category and cluster includes a label. For example, the first level 1522 includes the labels "Seasoned Beef with Potatoes," "Beef Curry," and so on, following the example of FIG. 11. Similarly, the second level 1524 includes the labels "Beef," "Pork," and so on. However, as noted in conjunction with FIG. 11, it should be appreciated that while exemplary labels are shown for the clusters for illustrative purposes, the labels are generated as described herein and are therefore not typically meaningful labels to humans.

According to some embodiments described herein, multitask learning can be used to train a machine learning model to classify an image into a multi-level hierarchy that represents semantic, visual and nutritional relations to recognize objects. For example, a multitask convolutional neural network can be employed to perform classification that includes joint feature learning for each level. As a result, machine learning techniques can be developed that can leverage the semantic, visual and nutritional information contained in such a multi-level hierarchy.

Figure 14:
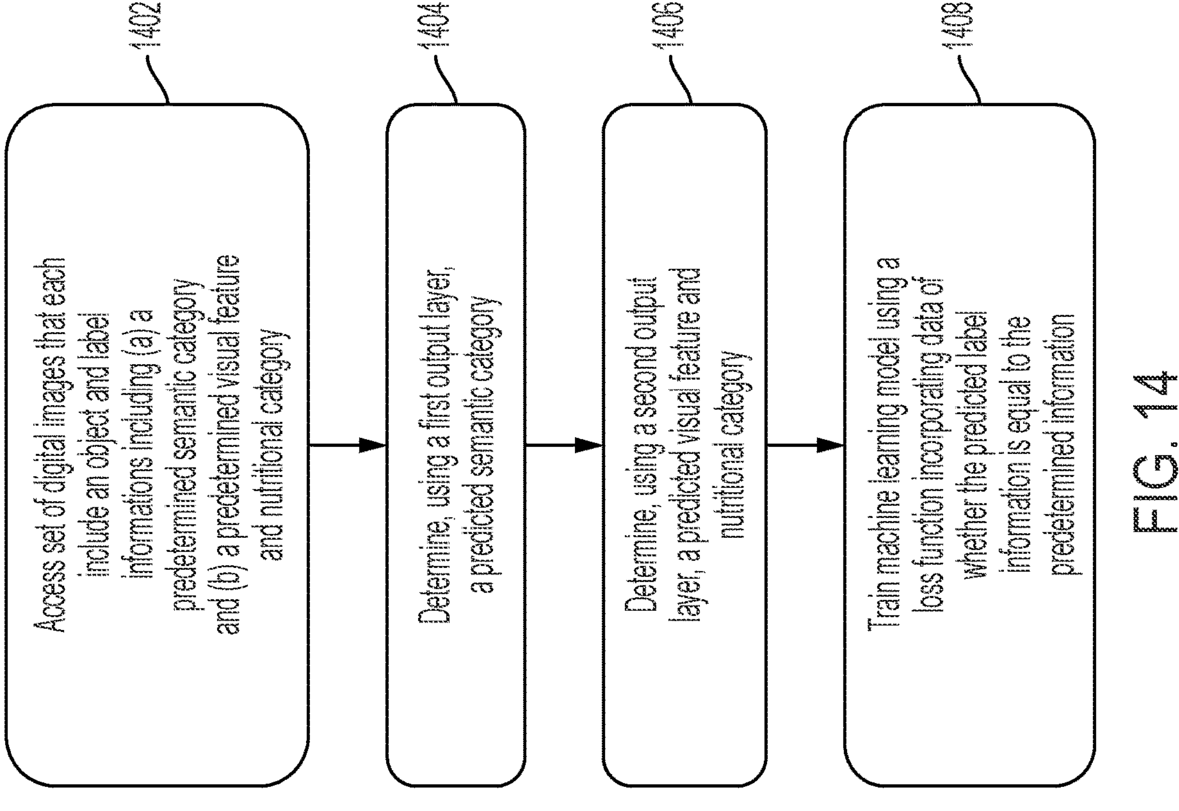
FIG. 14 is a diagram showing an exemplary computerized method for training a multi-task machine learning model for object recognition, according to some embodiments.

FIG. 14 is a diagram showing an exemplary computerized method 1400 for training a multi-task machine learning model for object recognition, according to some embodiments. At step 1402, the computing device access a set of digital images. Each digital image is of an object (e.g., food) and is associated with predetermined label information. The predetermined label information includes a predetermined semantic category of the object, as well as at least one predetermined visual feature and nutritional category (e.g., a cluster label).

The predetermined label information can include labels for each level in the hierarchical tree structure. As described herein (e.g., in conjunction with FIG. 15), each digital image can be labelled according to a hierarchical structure. The first level of the hierarchical structure can include a plurality of semantic categories, and the second (and subsequent) levels of the hierarchical structure below the first level can include associated sets of visual feature and nutritional categories. Since the labels of the hierarchical structure are arranged in a tree structure, each category level is linked to categories of neighboring level(s). For example, each semantic category of the first level is associated with a visual feature and nutritional category of the second level. Referring further to FIG. 15, for example, the predetermined label information of each image accessed at step 1402 can include a semantic category for the first level of the hierarchy 1522, and a visual feature and nutritional category for the second level of the hierarchy 1524.

Referring to steps 1404 and 1406, the computing device uses a multitask machine learning model to classify the set of digital images to determined predicted label information for each digital image. Like the predetermined label information, the predicted label information includes at least a predicted semantic category and a predicted visual feature and nutritional category. At step 1404, the computing device determines, using a first output layer of the machine learning model, a predicted semantic category. At step 1406, the computing device determines, using a second output later of the machine learning model, a predicted visual feature and nutritional category.

Referring further to FIG. 15, FIG. 15 also shows neural network 1500 that includes a plurality of feature extraction layers 1502A, 1502B through 1502N, collectively referred to as feature extraction layers 1502. The feature extraction layers can include various types and arrangements of layers. For example, the feature extraction layers 1502 can include one or more convolutional layers, one or more pooling layers, an activation layer, a batch layer, and/or the like.

According to some embodiments, classifying the set of digital images (e.g., steps 1404 and/or 1406) can include using the machine learning model to determine a visual feature vector for each image that has an associated set of visual features. For example, a multi-dimensional space vector such as a 1024-dimension space vector as described herein, can be used, with each dimension of the visual feature vector corresponding to a different visual feature. Referring to FIG. 15, the last feature extraction layer 1502N can generate the visual feature vector for each of the input images 1506.

The computing device can determine labels for each level of the hierarchical structure using an associated output layer of the neural network for each layer. For example, referring to step 1404, the computing device can determine the predicted semantic category (e.g., for a level of the hierarchy that represents semantic categories) using a first output layer of the neural network model and the visual feature vector generated by the output layer of the feature extraction layers of the NN model. Referring to step 1406, the computing device can determine the predicted visual feature and nutritional category (e.g., for a second level of the hierarchy that represents visual and nutritional categories) using a second output layer of the neural network model and the visual feature vector. Each output layer can include a different number of nodes, where the number of nodes is related to and/or corresponds to the number of labels of the associated level in the hierarchical structure. Each output layer can be fully-connected to the high-level features generated by the feature extraction layers of the neural network. For example, each output layer can be fully connected to the visual feature vector generated by the output layer of the feature extraction layers.

Referring further to FIG. 15, for example, the neural network 1500 includes a plurality of output layers, including two output layers 1504A and 1504B in this example, collectively referred to as output layers 1504. As shown in this example, the neural network 1500 has an output layer 1504 for each level of the hierarchical structure 1520. In this example, the first output layer 1504A is used to classify the output of the feature extraction layers (e.g., the visual feature vector) into one of the food categories of the semantic level 1522 of the hierarchical structure 1520. The second output layer 1504B is used to classify the output of the feature extraction layers into one of the food clusters of the cluster level 1524. If further levels of hierarchical structure 1520 are present, the neural network 1500 may include further output layers 1504 for each additional layer.

At step 1408, the computing device trains the machine learning model using a loss function. The loss function incorporates data indicative of whether the predicted label information for each digital image is equal to the predetermined label information of the digital image. For example, the loss function incorporates data indicative of whether the predicted semantic category and predicted visual and nutritional cluster(s) are equal to the corresponding values in the predetermined label information. The training process therefore trains based on the result of each output layer classification into an associated set of (semantic or visual and nutritional) categories. The training process can include simultaneously training on each output layer/level classification. By learning based on each hierarchical level in parallel, the machine learning model can be more robust than other types of models. A multi-task loss function is described herein, including with respect to Equation 6. In some embodiments, two tasks are assigned to the multi-task model (e.g., a first level category prediction and a second level category prediction, such that T in equation six is 2).

Experimental Results

Embodiments of the techniques described herein can be used to implement food recognition techniques that leverage both food localization and food classification techniques. The experimental results presented in this section evaluate the performance of food localization and food classification separately, and then evaluate the overall performance of the food recognition system. The datasets used for the experiments included ETHZ-101, UPMC-101 (e.g., described in/available from XinWang, D. Kumar, N. Thome, M. Cord, and F. Precioso, "Recipe recognition with large multimodal food dataset," 2015 IEEE International Conference on Multimedia Expo Workshops (ICMEW) (June 2015), 1-6. doi.org/10.1109/ICMEW.2015.7169757, which is incorporated by reference herein in its entirety), UEC-100 (e.g., described in/available from Yuji Matsuda, Hajime Hoashi, and Keiji Yanai, "Recognition of multiple-food images by detecting candidate regions," Proceedings of IEEE International Conference on Multimedia and Expo (July 2012), 25-30, Melbourne, Australia, which is incorporated by reference herein in its entirety), UEC-256, and the VFN dataset generated using the techniques described herein (the semi-automatic crowdsourcing tool), which contains 82 food categories, 14,991 online food images and 22,423 bounding boxes. For UEC-100, UEC-256, and VFN dataset, a random 70/15/15% split of images was applied for training/validation/testing on each food category. It is worth noting that UEC-100 is the predecessor of UEC-256 and, therefore, it is a subset of UEC-256. The split for these two datasets was done under the constraint that each of the training/validation/testing sets of UEC-100 are a strict subset of that of UEC-256. The authors of ETHZ-101 and UPMC-101 established the training and testing sets, and for purposes of experimentation the established split was used, and the original testing set was divided evenly for validation and testing purposes in the experiments. Since ETHZ-101 and UPMC-101 do not contain bounding box information, these two datasets were used for food classification evaluation only.

For food localization, the food localization model is trained on UEC-256's training set. The performance of the model was evaluated on the testing sets of UEC-100 and UEC-256. Since the images in VFN are therefore unseen data to the localization system, the images in the VFN dataset were used to evaluated the food location performance.

Precision and recall were used as performance metrics for the localization task. For these experiments, and without intending to limit the terms, True Positive (TP) refers to a correctly detected food region; False Positive (FP) refers to a non-food region that was incorrectly detected as a food region; True Negative (TN) refers to a correctly detected non-food region; and False Negative (FN) refers to a food region that was incorrectly detected as a non-food region. For these experiments, a region is correctly detected if the region IoU, which can be interpreted as explained in conjunction with Equation 1, is larger than 0.5. Given these experimental terms, Equation 10 can be used to calculate precision, and Equation 11 can be used to calculate recall:

$$\text{Precision} = \frac{TP}{TP + FP} \quad \text{Equation 10}$$

$$\text{Recall} = \frac{TP}{TP + FN} \quad \text{Equation 11}$$

As shown in the Table 2 below, Precision measures the proportion of positive detection that is actually correct, and Recall measures the proportion of actual positives that is detected correctly. Therefore, it is desirable to have high values for both Precision and Recall. As shown, the VFN datasets had higher Precision but relatively low Recall. It is worth noting that about 6.8% of images in UEC-256 dataset and 8.1% of UEC-100 contain more than 2 bounding boxes, while the VFN dataset has more than 26% of images with multiple bounding boxes, making food localization much more challenging (e.g., compared to images with just one). Due to those multiple food regions, False Negative tended to increase, which can help explain the relative low Recall.

TABLE 2

Performance of Food Localization on Different Food Image Datasets

| Dataset | UEC-100 | UEC-256 | VFN |
|---|---|---|---|
| Precision | 0.8164 | 0.9075 | 0.8323 |
| Recall | 0.8404 | 0.9084 | 0.5744 |

For these experiments, classification was performed on food regions identified by the food localization. Ideally, each food region should contain only one food item. ETHZ-100, UPMC-101, UEC-100, UEC-256 and VFN were used to evaluate the food classification performance. Among of these datasets, ETHZ-100 and UPMC-101 contain only single food images. Since UEC-100, UEC-256, and VFN datasets contain multiple foods, the ground-truth bounding box information was used to generate single food images to evaluated the food classification performance. The experiments followed the selection of training and testing data as provided by the ETHZ-101 and UPMC-101 datasets. For the other three datasets, the experiments used 70% for training, 15% for validation, and 15% for testing.

There are many deep learning models that could be used for food classification. It is worth noting that the use of more complicated Neural Network models, such as inception, ResNet and DenseNet, may achieve higher accuracy than less-complicated counterparts. However, in theory the proposed techniques should be somewhat agnostic as to the underlying CNN model, since the classification accuracy should be improved by using a hierarchical structure of the class labels. For these experiments, the term flat classification refers to tuning a CNN model for food classification without generating labels for each level in a hierarchical structure of class labels (e.g., using the approach of Equation 5), and hierarchical classification refers to using a hierarchical structure generated using visual semantics among class labels for food classification (e.g., using the approach of Equation 6).

For these experiments, DenseNet-121 was used as the model backbone CNN model. The classification task was compared using three experiments. The selected CNN model was trained for flat classification at the learning rate of 0.0001, the same CNN model was trained for hierarchical classification with the same learning rate of 0.0001, and the same CNN model was fine-tuned for hierarchical classification at a smaller learning rate of 0.00001. The CNN model was initialized with pre-trained weights on ImageNet, and used a batch size of 20.

To generate the hierarchical structure, DenseNet-121 was first trained for flat classification. Once the accuracy and loss converged, the feature maps were extracted from each training image and the similarity score (OVL) was computed between all categories to generate clusters using Affinity Propagation. As shown in Table 5, each dataset has a different number of clusters. A two-level hierarchical structure was designed based on these clusters, with the bottom level being food categories and the upper level being food clusters.

TABLE 3

Cluster Numbers in Data Sets

| | ETHZ-101 | UPMC-101 | UEC-100 | UEC-256 | VFN |
|---|---|---|---|---|---|
| Total number of Categories | 101 | 101 | 100 | 256 | 82 |
| Total Number of Clusters | 17 | 18 | 15 | 33 | 14 |

In these experiments, the flat classification used a conventional, non-multi-task model. In contrast, both hierarchical classifications used a multi-task model to perform two tasks: one to classify the food clusters, and the other to classify the food categories. As shown in Table 4, with a fixed learning rate and batch size, hierarchical classification achieves better performance for Top-1 accuracy. After fine-tuning the multi-task model with a smaller learning rate, the Top-1 accuracy can be further improved.

TABLE 4

Single Food Image Classification Top-1 Accuracy

| | ETHZ-101 | UPMC-101 | UEC-100 | UEC-256 | VFN |
|---|---|---|---|---|---|
| Flat Classification | 75.31% | 64.83% | 78.47% | 66.65% | 67.42% |
| Hierarchical Classification | 76.57% | 66.01% | 79.47% | 68.20% | 69.97% |
| Fine-Tuning Hierarchical Classification | 80.12% | 69.26% | 80.48% | 71.82% | 72.13% |

From a nutrient perspective, visually similar foods often contain similar nutrition content, e.g., fried chicken and fried pork. Therefore, in addition to improving Top-1 Accuracy, the proposed recognition system can minimize the impact of a mistake by clustering visually similar foods together. It is worth noting that while top-5 accuracy can be used as a performance metric, it cannot reflect how good or bad a mistake is. For these experiments, a new performance metric "Cluster Top-1" is used to measure whether the system made a good or bad mistake. The visual-aware hierarchical structure contains many clusters (e.g., at level 904 in FIGS. 9 and 11) that include several visually similar foods (e.g., at level 902 in FIGS. 9 and 11). Therefore, if the top-1 decision is a member of the cluster that the correct category belongs to, it is considered a correct "Cluster Top-1" decision. As shown in Table 5, the visually-aware hierarchical structure not only improves the top-1 accuracy, but can also improve the Cluster Top-1 accuracy. In other words, the system can make a "better" mistake than flat classification methods.

TABLE 5

Single Food Image Cluster Top-1 Accuracy

| | ETHZ-101 | UPMC-101 | UEC-100 | UEC-256 | VFN |
|---|---|---|---|---|---|
| Flat Classification | 85.06% | 74.26% | 85.69% | 78.21% | 79.42% |
| Hierarchical Classification | 85.33% | 76.07% | 89.26% | 80.29% | 81.83% |
| Fine-Tuning Hierarchical Classification | 87.90% | 78.73% | 89.33% | 83.17% | 84.00% |

As described herein, food localization can help remove the non-food background pixels to improve the classification performance. To show this benefit, the single food images from the UEC-100, UEC-256 and VFN datasets were selected and the original images were compared to the cropped images containing only foods. A DenseNet-121 model was trained for these datasets. As shown in Table 6, cropping the food regions in the image improves the classification accuracy, especially for more complex images such as those in the VFN dataset. The metrics presented in Table 6 were determined using a flat classification technique, and training was done separately using the original images and cropped images. The accuracy is the top-1 accuracy.

TABLE 6

Classification Accuracy of Original Food Images and Food Regions

| | UEC-100 | UEC-256 | VFN |
|---|---|---|---|
| Original Image | 76.21% | 63.54% | 55.42% |
| Cropped Image | 78.47% | 65.60% | 63.85% |

The overall system was evaluated by combining food localization and food recognition. For single food images, localization can help remove irrelevant background pixels. For multi-food images, localization assigns multiple labels to different food regions in an image. Since UEC-100, UEC-256, and VFN datasets have ground-truth bounding box information, their test images were used to evaluate the performance of the food recognition system.

Since it is unlikely for the predicted bounding boxes from food localization to match exactly to the ground-truth data, their recognition performance was measured on Precision (Equation 10) and Recall (Equation 11), for multiple category labels instead of simply food/non-food. For comparison, the metric Accuracy (Equation 9) was also calculated.

$$\text{Accuracy} = \frac{TP}{TP + FP + FN} \quad \text{Equation 9}$$

As shown in Table 7, the result of the techniques on UEC-256 are compared with that described in Marc Bolaños and Petia Radeva, "Simultaneous food localization and recognition. 2016 23rd International Conference on Pattern Recognition (ICPR) (2016), 3140-3145 ("the Bolaños benchmark"), which is incorporated by reference herein in its entirety, and also run on UEC-256. The systems' performance was also evaluated on all three datasets with these metrics, as shown in Table 8 for general performance assessment.

TABLE 7

Comparison between the Bolanos Benchmark and the Experimental Implementation

| | Precision | Recall | Accuracy |
|---|---|---|---|
| Overall Bolaños Benchmark | 54.33% | 50.86% | 36.84% |
| Experimental Implementation | 64.96% | 65.02% | 48.14% |

TABLE 8

Precision, Recall, and Accuracy of the Experimental Implementation for Three Datasets

| | Precision | Recall | Accuracy |
|---|---|---|---|
| UEC-100 | 63.90% | 65.78% | 47.96% |
| UEC-256 | 64.96% | 65.02% | 48.14% |
| VFN | 74.24% | 51.23% | 43.50% |

After food regions are localized and fed to the food classification stage, a food label and associated confidence score for each food region are returned. The classification system assigns a confidence score (or probability returned by classification algorithm) for each category based on the image information inside each bounding box. For example, if there were three categories to classify, the confidence score may be [0.13, 0.26, 0.61], and the classification stage assigns a label "category 3" and confidence score 0.61 to this bounding box. A threshold can be set for the confidence score that determines the lowest matching score that is acceptable to consider as a correct classification. The results in Table 8 show the Precision, Recall, and Accuracy. For those metrics, a confidence score was not considered. For example, if the confidence score of a bounding box is 0.23, which is not very high, but the label is correctly determined, it can still be treated as a true positive.

Mean Average Precision (mAP) is used for more precise evaluation. Changing the threshold of the confidence score will change the Precision and Recall. For example, for a bounding box with a confidence score of 0.3 but a correct label, if the threshold is set to 0.5, the bounding box is treated as a false negative; if the threshold is 0.2, this bounding box is treated as a true positive. Therefore, as the confidence score threshold changes, the Precision and Recall will also change accordingly. Average Precision (AP) for each category is the average Precision value for a Recall value over 0 to 1 for each food category. The mAP is the mean value of all APs of all categories. The experimental implementation is compared to Wataru Shimoda and Keiji Yanai, "CNN-Based Food Image Segmentation Without Pixel-Wise Annotation," New Trends in Image Analysis and Processing—ICIAP 2015 Workshops (2015), 449-457, which is hereby incorporated by reference herein in its entirety (the "Shimoda Benchmark"), which proposed a CNN-based model for food recognition and testing on the UEC-100 dataset. However, unlike the experimental implementation, the Bolaños Benchmark used selective search and bounding box clustering for food localization. Results are show in in Table 8.

TABLE 9

Experimental Implementation's mAP in Different Datasets

| | UEC-100 | UEC-256 | VFN |
|---|---|---|---|
| Overall Shimoda Benchmark | 50.70% | — | — |
| Experimental Implementation | 60.34% | 59.57% | 50.76% |

Reviewing the results above, Table 4 shows that building the two level hierarchical structure is applicable for different datasets. Table 4 and Table 5 shows that by using the same CNN model and the same learning rate, the techniques described herein can improve both Top-1 accuracy and Cluster Top-1 accuracy. The result can be further improved, such as by fine-tuning with a smaller learning rate. In addition, Table 6 illustrates that even for a single food image, food localization can remove non-food background pixels and improve classification accuracy. This can be particularly useful for complex images, such as those in the VFN dataset (as indicated by the larger improvement). It is worth noting that for the results in both Table 4 and Table 6, the performance on VFN is lower than other public datasets likely due to one or more reasons. For example, the VFN dataset contains many visually similar food categories, e.g. milk, ice cream, and yogurt. As another example, each category in this dataset contains around 100 images, which is far less than other public datasets (e.g. ETHZ-101 has around 1000 images per category). Therefore, the number of images per category can be increased so that more images can be included in the training set.

Since UEC-100, UEC-256, and VFN datasets contain bounding box information, these three datasets can be used to test the performance of the overall recognition system. The experimental implementation significantly outperforms previous proposed methods used as benchmarks (the Bolaños Benchmark and the Shimoda Benchmark). Results in Table 9 showed that the mAP of VFN is lower than that of the other two datasets. Since the mAP is highly dependent on the confidence score of the class label assigned by the classification, the lower classification result of VFN leads to the low mAP value, which is another indication that VFN is a challenging dataset. The low recall of the VFN can be due to food localization not proposing all the food regions in the images, and VFN contains more multiple food images than the other two datasets. In addition, both Table 8 and Table 9 showed that the experimental implementation performed best on the UEC-256 dataset, which is likely due to the fact that the food localization (which is based on Faster R-CNN) is trained on the UEC-256 dataset. However, the higher precision on the VFN dataset illustrates that Faster R-CNN trained on UEC-256 may be well-generalized to other food image datasets.

Further experiments were undertaken to evaluate the performance of food classification using the visual and nutritional clustering and hierarchical classification techniques described herein. In particular, four nutritional information (energy, fat, carbohydrates, and protein) were calculated using 100 g food samples, and one or more were embedded into the food classification system. In all experiments, the weighting parameter $w_i$ was fixed as 1 for nutritional similarity (Equation 8) and the hyperparameter $\lambda_t$ that controls the weight of the two cross-entropy losses (Equation 6) was set to 1. The VFN dataset, described herein above, was modified based on the Food and Nutrient Database for Dietary Studies (FNDDS) and used for the experiments. In particular, food items that shared the same nutrition information (e.g., according to the FNDDS) were combined and beverages were removed, resulting in 74 food categories in the VFN dataset. Food items (1,869) were collected from the FNDDS that belonged to the 74 food categories. Since a food category could include multiple food items, the average of the nutrient values and energy information of all food items in a food category was taken to represent the food category.

Clustering was evaluated based on the intra-cluster and inter-cluster relations from both nutrition and visual perspectives. The intra-cluster and inter-cluster variances were calculated for each nutrition information (energy, fat, carbohydrates, and protein), as shown in Equation 10 and Equation 11:

$$Var_{intra-cluster} = \frac{1}{N}\sum_i\sum_j (x_{ij} - \bar{X}_i)^2 \quad \text{Equation 10}$$

$$Var_{inter-cluster} = \frac{1}{N}\sum_i C_i(\bar{X}_i - \bar{X})^2 \quad \text{Equation 11}$$

where N is the total number of images in the dataset. $C_i$ is the total number of images in the cluster i. $x_{ij}$ is the nutrition information of food category j in cluster i. $\overline{X_i}$ is the mean value of cluster i, and $\overline{X}$ is the mean value of selected nutrient information on the entire dataset.

The intra-class and inter-class clustering results based on different nutrition information are shown in Table 10. As shown, clustering solely based on visual features does not give good clustering results from a nutritional perspective since the intra-cluster variance is very large and some are quite close to the inter-cluster variance. For other clustering results, the variances correspond to selected nutritional information (e.g., energy (E), carbohydrates (C), protein (P), and fat (F). For example, "F+P+V" means the similarity for clustering considers fat, protein, and visual information. As shown in Table 10, this combination (F+P+V) results in a low intra-class variance and high inter-class variance.

TABLE 10

Intra-Cluster and Inter-Class Variances of Clustering Results

| | E ($kcal^2$) Intra↓ | E ($kcal^2$) Inter↑ |
|---|---|---|
| V | 9245.0 | 5029.5 |
| E + V | 1748.8 | 12525.7 |

| | C ($g^2$) Intra | C ($g^2$) Inter | F ($g^2$) Intra | F ($g^2$) Inter | P ($g^2$) Intra | P ($g^2$) Inter |
|---|---|---|---|---|---|---|
| V | 187.8 | 99.9 | 56.5 | 13.5 | 28.3 | 31.1 |
| C + V | 16.4 | 271.3 | 55.5 | 14.5 | 26.7 | 32.7 |
| F + V | 163.6 | 124.1 | 6.2 | 63.8 | 27.0 | 32.4 |
| P + V | 143.7 | 144.0 | 51.8 | 18.2 | 3.3 | 56.1 |
| C + F + V | 77.5 | 210.2 | 8.6 | 61.3 | 18.2 | 41.2 |
| C + P + V | 49.8 | 238.9 | 42.1 | 27.9 | 3.7 | 55.7 |
| F + P + V | 98.1 | 189.6 | 17.2 | 52.8 | 7.8 | 51.6 |
| C + F + P + V | 53.0 | 234.7 | 22.3 | 47.7 | 8.6 | 50.8 |

A visual distance matrix was generated to evaluate the visual similarity of clustering results, as shown in Equation 12, $$D_V = 1 - S_{visual} \quad \text{Equation 12}$$

where $S_V$ is the visual similarity matrix containing similarity score $S_V$ in the range (0,1]. The inter-cluster distance and intra-cluster distance were formulated as shown in Equation 13 and Equation 14, respectively:

$$D_{intra-cluster} = \max_i\left(\frac{2}{N_i(N_i-1)}\sum_{0<j<k<N_i} d_{jk}\right) \quad \text{Equation 13}$$

$$D_{inter-class} = \frac{2}{N_c(N_c-1)}\sum_{0<j<k<N_c} D_{jk} \quad \text{Equation 14}$$

where $N_i$ is the total food category number in the cluster i and $d_{jk}$ is the visual distance between category j and k in cluster i. For intra-cluster distance, the maximum distance was chosen, assuming worst case scenario. For inter-cluster distance, the exemplar, determined by Affinity Propagation, was chosen as the centroid to represent cluster. $D_{jk}$ is the distance between cluster j and cluster k. $N_c$ is the total number of clusters.

Table 11 shows the visual distance of the intra-cluster, inter-cluster, and the ratios between them for different clustering results. Clustering based on visual similarity alone has the best ratio. All other cases, which embed nutrition information, have higher ratios, but still less than 1, indicating nutritional and visual information are successfully combined during clustering.

TABLE 11

| Visual Distance of Intra-Cluster, Inter-Cluster and Ratio | | | |
|---|---|---|---|
| | Visual Distance | | |
| | Intra ↓ | Inter↑ | Intra/Inter↓ |
| V | 0.4345 | 0.5302 | 0.8195 |
| V + E | 0.4320 | 0.5026 | 0.8595 |
| C + V | 0.4299 | 0.4803 | 0.8949 |
| F + V | 0.4625 | 0.4673 | 0.9896 |
| P + V | 0.4456 | 0.5222 | 0.8534 |
| C + F + V | 0.4255 | 0.4995 | 0.8519 |
| C + P + V | 0.4514 | 0.4913 | 0.9189 |
| F + P + V | 0.4781 | 0.4993 | 0.9574 |
| C + F + P + V | 0.4320 | 0.5072 | 0.8517 |

The food classification techniques described herein were evaluated and compared to a flat training classification model. For these experiments, pre-trained ResNet-50 was used as the model backbone CNN model. Flat training classification and all hierarchy based classifications were found to have comparable accuracy between 70-71%.

Mean absolute error (MAE) of nutrition information was used to evaluate which food classification system was making "better mistakes." FIG. 16A-D are charts that compare the MAE of nutrition information for the different food classification systems. The flat trained and visual-based hierarchical classifications are treated as baselines and are compared to those that have nutritional information embedded. As shown, incorporating nutritional information results in a reduction of error, as compared to using flat trained and visual-hierarchical classification techniques. Energy+Visual (FIG. 16A), Carbohydrate+Protein+Visual (FIG. 16B), Fat+Visual (FIG. 16C), and Fat+Protein+Visual (FIG. 16D) represent the worst case scenario in relative error reduction for each domain. Yet, even in the worst case scenario, embedding nutritional information still achieves a reduction in error.

Figure 17:
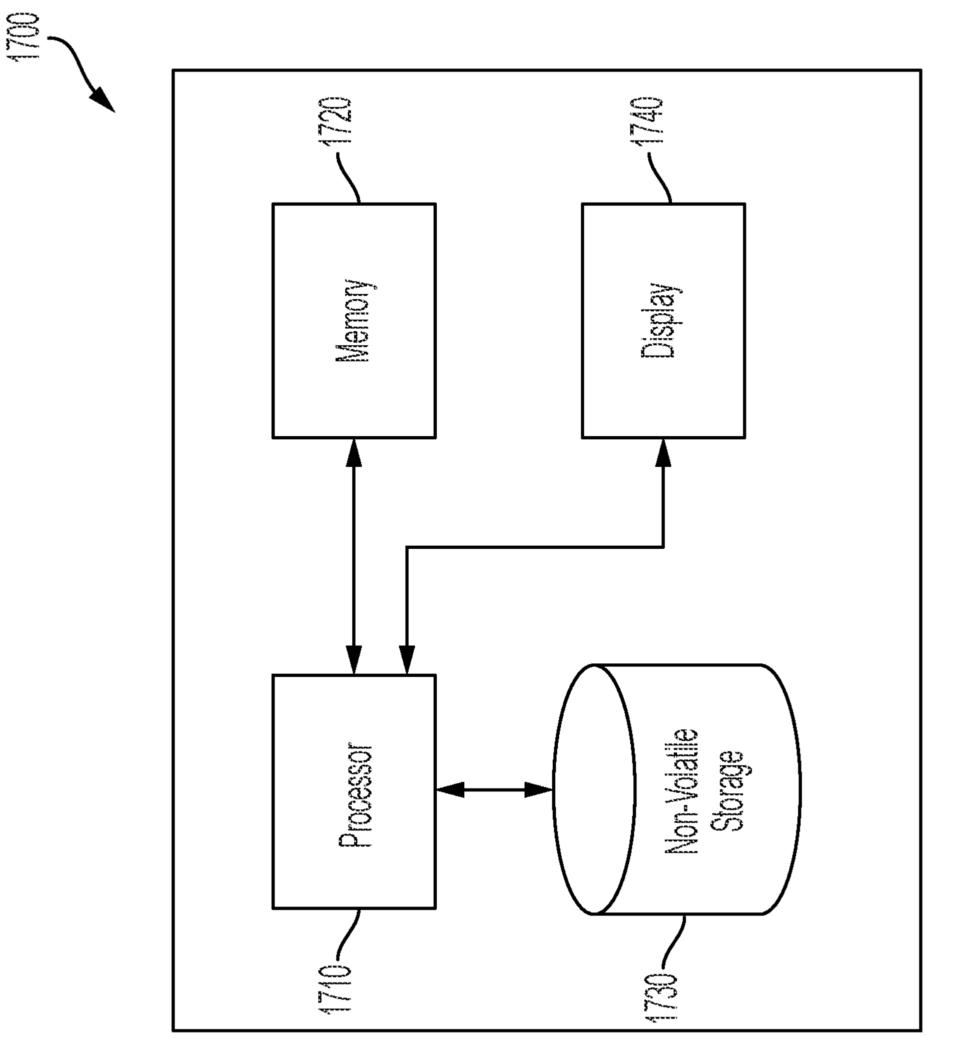
FIG. 17 shows an illustrative implementation of a computer system that may be used to perform any of the aspects of the techniques and embodiments disclosed herein, according to some embodiments.

An illustrative implementation of a computer system 1700 that may be used to perform any of the aspects of the techniques and embodiments disclosed herein is shown in FIG. 17. The computer system 1700 may include one or more processors 1710 and one or more non-transitory computer-readable storage media (e.g., memory 1720 and one or more non-volatile storage media 1730) and a display 1740. The processor 1710 may control writing data to and reading data from the memory 1720 and the non-volatile storage device 1730 in any suitable manner, as the aspects of the invention described herein are not limited in this respect. To perform functionality and/or techniques described herein, the processor 1710 may execute one or more instructions stored in one or more computer-readable storage media (e.g., the memory 1720, storage media, etc.), which may serve as non-transitory computer-readable storage media storing instructions for execution by the processor 1710.

In connection with techniques described herein, code used to, for example, recognize food or other objects in images may be stored on one or more computer-readable storage media of computer system 1700. Processor 1710 may execute any such code to provide any techniques for recognizing objects as described herein. Any other software, programs or instructions described herein may also be stored and executed by computer system 1700. It will be appreciated that computer code may be applied to any aspects of methods and techniques described herein. For example, computer code may be applied to interact with an operating system to recognize objects through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

Various aspects are described in this disclosure, which include, but are not limited to, the following aspects:

1. A computerized method for grouping images of objects based on semantic and visual information associated with the objects, the method comprising: accessing a set of digital images, each digital image comprising an object associated with a semantic category of the object, wherein the semantic category is one of a plurality of semantic categories associated with the set of digital images, and wherein each digital image is labelled with data indicative of the semantic category to which the digital image is associated; determining, using a trained machine learning model, a visual feature vector for each digital image of the set of digital images, wherein the visual feature vector comprises a value for each of a plurality of visual features; for each semantic category of the plurality of semantic categories, calculating, for each visual feature of the plurality of visual features, a probability distribution of the values of the visual feature in the visual feature vectors of each image in the set of digital images associated with the semantic category; determining, based on the probability distributions, data indicative of similarities between digital images associated with different semantic categories of the plurality of semantic categories; and grouping, based on the data indicative of similarities between the digital images associated with different semantic categories, the plurality of semantic categories into clusters of semantic categories.
2. The method of aspect 1, wherein, for each image of the set of digital images, the object is food and the semantic category is a food category of the food.
3. The method of any of aspects 1-2, wherein the visual feature vector comprises a 1024-dimension space vector, wherein each dimension of the visual feature vector corresponds to a different visual feature.
4. The method of any of aspects 1-3, wherein the calculated probability distributions are Gaussian distributions.
5. The method of any of aspects 1-4, wherein determining data indicative of similarities between digital images of different semantic categories comprises: generating a similarity matrix comprising a number of rows and a number of columns that are both equal to a total number of the plurality of semantic categories, such that each row and each column are associated with a semantic category of the plurality of semantic categories; and for each matrix entry in the similarity matrix, determining data indicative of a similarity between the visual feature vectors of (a) a first set of digital images of the set of digital images associated with the semantic category of the row of the matrix entry and (b) a second set of digital images of the set of digital images associated with the semantic category of the column the matrix entry.
6. The method of aspect 5, wherein: the calculated probability distributions are Gaussian distributions; and determining, for each matrix entry in the similarity matrix, the data indicative of the similarity between the visual feature vectors comprises: for each visual feature of the plurality of visual features, generating an overlap coefficient indicative of an overlap between the Gaussian distributions for the visual feature of (a) the first set of digital images and (b) the second set of digital images, generating an averaged overlap coefficient by averaging the overlap coefficients, and providing the averaged overlap coefficient as the data indicative of the similarity between the visual feature vectors.
7. The method of aspect 6, wherein grouping, based on the data indicative of similarities between digital images associated with different semantic categories, the plurality of semantic categories into clusters of semantic categories comprises: grouping, using affinity propagation, the plurality of semantic categories into clusters of semantic categories based on the averaged overlap coefficients of the similarity matrix.

8. A non-transitory computer-readable media comprising instructions that, when executed by one or more processors on a computing device, are operable to cause the one or more processors to execute the method of any of aspects 1-7.

9. A system comprising a memory storing instructions, and a processor configured to execute the instructions to perform the method of any of aspects 1-7.

10. A computerized method for training a machine learning model for object recognition, the method comprising: accessing a set of digital images, each digital image comprising an object and associated with predetermined label information comprising data indicative of: (a) a predetermined semantic category of the object, wherein the semantic category is one of a plurality of semantic categories associated with the set of digital images; and (b) a predetermined visual feature category of the object, wherein the visual feature category is one of a plurality of visual feature categories, and each of the plurality of visual feature categories are determined based on similarities among visual features of the set of digital images; classifying, using a machine learning model, the set of digital images to determine predicted label information for each digital image of the set of digital images, comprising: determining, using a first output layer of the machine learning model, a predicted semantic category of the plurality of the semantic categories; and determining, using a second output layer of the machine learning model, a predicted visual feature category of the plurality of the visual feature categories; training the machine learning model using a loss function, wherein the loss function incorporates data indicative of whether the predicted label information for each digital image is equal to the predetermined label information of the digital image.

11. The method of aspect 10, wherein, for each image of the set of digital images, the object is food and the semantic category is a food category of the food.

12. The method of any of aspects 10-11, wherein classifying the set of digital images comprises, for each digital image of the set of digital images: determining, using the machine learning model, a visual feature vector, wherein the visual feature vector comprises a value for each of a plurality of visual features; determining, using the first output layer and the visual feature vector, the predicted semantic category; and determining, using the second output layer and the visual feature vector, the predicted visual feature category.

13. The method of aspect 12, wherein the visual feature vector comprises a 1024-dimension space vector, wherein each dimension of the visual feature vector corresponds to a different visual feature.

14. The method of any of aspects 10-13, wherein the set of digital images are classified according to a hierarchical structure, wherein: a first level of the hierarchical structure comprises the plurality of semantic categories; a second level of the hierarchical structure below the first level comprises a first set of the plurality of visual feature categories; each semantic category of the first level is associated with a visual feature category of the second level; and the predetermined visual feature category belongs to the first set of the plurality of visual feature categories.

15. The method of aspect 14, wherein: the predetermined visual feature category is a first predetermined visual feature category, and the predetermined label information for each digital image of the set of digital images further comprises a second predetermined visual feature category of the object; a third level of the hierarchical structure below the second level comprises a second set of the plurality of visual feature categories; each visual feature category of the second level is associated with a visual feature category of the third level; and the second predetermined visual feature category belongs to the second set of the plurality of visual feature categories.

16. The method of any of aspects 10-15, wherein classifying, using the machine learning model, the set of digital images to determine predicted label information for each digital image of the set of digital images, comprises determining, using a third output layer of the machine learning model, a predicted second visual feature category of the plurality of the visual feature categories.

17. A non-transitory computer-readable media comprising instructions that, when executed by one or more processors on a computing device, are operable to cause the one or more processors to execute the method of any of aspects 10-16.

18. A system comprising a memory storing instructions, and a processor configured to execute the instructions to perform the method of any of aspects 10-16.

19. A computerized method for grouping images of objects based on semantic, visual, and nutritional information associated with the objects, the method comprising: accessing a set of digital images, each digital image comprising an object associated with a semantic category of the object, wherein the semantic category is one of a plurality of semantic categories associated with the set of digital images, and wherein each digital image is labeled with data indicative of the semantic category to which the digital image is associated; determining, for each semantic category of the plurality of semantic categories, one or more nutrient values wherein each of the one or more nutrient values is associated with a nutrient category of one or more nutrient categories; automatically determining, without human input, based on the one or more nutrient values for each semantic category of the plurality of semantic categories, data indicative of nutritional similarities between different semantic categories of the plurality of semantic categories; and automatically grouping, without human input, based on the data indicative of nutritional similarities between the different semantic categories, the plurality of semantic categories into clusters of semantic categories.

20. The method of aspect 19, further comprising accessing data indicative of visual similarities between digital images of different semantic categories of the plurality of semantic categories; and wherein grouping the plurality of semantic categories into clusters of semantic categories comprises grouping the plurality of semantic categories into clusters of semantic categories based on the data indicative of nutritional similarities and the data indicative of visual similarities.

21. The method of aspect 20, further comprising generating a visual similarity matrix based on the data indicative of the visual similarities.

22. The method of any of aspects 20-21, wherein accessing the data indicative of visual similarities between digital images of different semantic categories further comprises: determining, using a trained machine learning model, a visual feature vector for each digital image of the set of digital images, wherein the visual feature vector comprises a value for each of the plurality of visual features; for each semantic category of the plurality of semantic categories, calculating, for each visual feature of the plurality of visual features, a probability distribution of the values of the visual feature in the visual feature vectors of each image in the set of digital images associated with the semantic category; and determining, based on the probability distributions, the data indicative of visual similarities between digital images associated with different semantic categories of the plurality of semantic categories.

23. The method of any of aspects 19-22, wherein determining data indicative of nutritional similarities between the different semantic categories comprises: generating a nutritional similarity matrix comprising a number of rows and a number of columns that are both equal to a total number of the plurality of semantic categories, such that each row and each column are associated with a semantic category of the plurality of semantic categories; and for each matrix entry in the nutritional similarity matrix, determining data indicative of a similarity between the one or more nutrient values determined for (a) the semantic category of the row of the matrix entry and (b) the semantic category of the column matrix entry.

24. The method of aspect 23, wherein determining, for each matrix entry in the nutritional similarity matrix, the data indicative of the similarity between the one or more nutrient values comprises: determining a similarity measure for each nutrient category of the one or more nutrient categories using the one or more nutrient values determined for (a) the semantic category of the row of the matrix entry and (b) the semantic category of the column of the matrix entry to generate a set of similarity measures; and averaging the set of similarity measures to generate the data indicative of the similarity.

25. The method of aspect 24, wherein averaging the set of similarity measures comprises determining a weighted harmonic mean of the set of similarity measures.

26. The method of aspect 24, further comprising: generating a similarity matrix using the nutritional similarity matrix and the visual similarity matrix, wherein generating the similarity matrix comprises: averaging corresponding matrix entries in the visual similarity matrix and the nutritional similarity matrix.

27. The method of aspect 26, wherein averaging corresponding matrix entries in the visual similarity matrix and the nutritional similarity matrix comprises determining an equal weight harmonic mean of corresponding matrix entries in the visual similarity matrix and the nutritional similarity matrix.

28. The method of any of aspects 26-27, wherein grouping, based on the data indicative of nutritional similarities and the data indicative of visual similarities, the plurality of semantic categories into clusters of semantic categories comprises: grouping, using affinity propagation, the plurality of semantic categories into clusters of semantic categories based on values of the similarity matrix.

29. The method of aspect 19, wherein, for each image of the set of digital images, the object is food and the semantic category is a food category of the food.

30. The method of aspect 19, wherein the one or more nutrient categories include energy, carbohydrates, fat, and proteins.

31. A non-transitory computer-readable media comprising instructions that, when executed by one or more processors on a computing device, are operable to cause the one or more processors to execute the method of any of aspects 19-30.

32. A system comprising a memory storing instructions, and a processor configured to execute the instructions to perform the method of any of aspects 19-30.

33. A computerized method for training a machine learning model for object recognition, the method comprising: accessing a set of digital images, each digital image comprising an object and associated with predetermined label information comprising data indicative of: (a) a predetermined semantic category of the object, wherein the semantic category is one of a plurality of semantic categories associated with the set of digital images; and (b) a predetermined nutritional and visual feature category of the object, wherein the nutritional and visual feature category is one of a plurality of nutritional and visual feature categories associated with the set of digital images, and each of the plurality of nutritional and visual feature categories are determined based on similarities among nutritional and visual features of the set of digital images; classifying, using a machine learning model, the set of digital images to determine predicted label information for each digital image of the set of digital images, comprising: determining, using a first output layer of the machine learning model, a predicted semantic category of the plurality of the semantic categories; and determining, using a second output layer of the machine learning model, a predicted nutritional and visual feature category of the plurality of the nutritional and visual feature categories; training the machine learning model using a loss function, wherein the loss function incorporates data indicative of whether the predicted label information for each digital image is equal to the predetermined label information of the digital image.

34. The method of aspect 33, wherein, for each image of the set of digital images, the object is food and the semantic category is a food category of the food.

35. The method of any of aspects 33-34, wherein classifying the set of digital images comprises, for each digital image of the set of digital images: determining, using the machine learning model, a visual feature vector, wherein the visual feature vector comprises a value for each of a plurality of visual features; determining, using the first output layer and the visual feature vector, the predicted semantic category; and determining, using the second output layer and the visual feature vector, the predicted nutritional and visual feature category.

36. The method of any of aspects 33-35, wherein the set of digital images are classified according to a hierarchical structure, wherein: a first level of the hierarchical structure comprises the plurality of semantic categories; a second level of the hierarchical structure below the first level comprises a first set of the plurality of nutritional and visual feature categories; each semantic category of the first level is associated with a nutritional and visual feature category of the second level; and the predetermined nutritional and visual feature category belongs to the first set of the plurality of nutritional and visual feature categories.

37. A non-transitory computer-readable media comprising instructions that, when executed by one or more processors on a computing device, are operable to cause the one or more processors to execute the method of any of aspects 33-36.

38. A system comprising a memory storing instructions, and a processor configured to execute the instructions to perform the method of any of aspects 33-36.

The invention claimed is:

1. A computerized method for training a machine learning model for recognizing objects based on semantic and visual information associated with the objects, the method comprising:

accessing a set of digital images, each digital image comprising an object associated with a semantic category of the object, wherein the semantic category is one of a plurality of semantic categories associated with the set of digital images, and wherein each digital image is labeled with data indicative of the semantic category to which the digital image is associated;

determining, using a trained machine learning model, a visual feature vector for each digital image of the set of digital images, wherein the visual feature vector comprises a value for each of a plurality of visual features;

for each semantic category of the plurality of semantic categories, calculating, for each visual feature of the plurality of visual features, a separate probability distribution of the values of the visual feature in the visual feature vectors of each image in the set of digital images associated with the semantic category;

determining, based on the probability distributions, data indicative of similarities between digital images associated with different semantic categories of the plurality of semantic categories;

grouping, based on the data indicative of similarities between the digital images associated with different semantic categories, the plurality of semantic categories into clusters of semantic categories;

classifying, using the machine learning model, each digital image of the set of digital images, said classifying comprising:

determining, using a first output layer of the machine learning model, a predicted semantic category of the plurality of semantic categories for said digital image, and determining, using a second output layer of the machine learning model, a predicted cluster for said digital image; and training the machine learning model using a loss function, wherein the loss function incorporates data indicative of (i) whether the predicted semantic category for each digital image corresponds to the semantic category associated with said digital image and (ii) whether the predicted cluster for said digital image corresponds to the cluster into which the semantic category associated with said digital image was grouped.

2. The method of claim 1, wherein, for each image of the set of digital images, the object is food and the semantic category is a food category of the food.

3. The method of claim 1, wherein the visual feature vector comprises a 1024-dimension space vector, wherein each dimension of the visual feature vector corresponds to a different visual feature.

4. The method of claim 1, wherein the calculated probability distributions are Gaussian distributions.

5. The method of claim 1, wherein determining data indicative of similarities between digital images of different semantic categories comprises:

generating a similarity matrix comprising a number of rows and a number of columns that are both equal to a total number of the plurality of semantic categories, such that each row and each column are associated with a semantic category of the plurality of semantic categories; and for each matrix entry in the similarity matrix, determining data indicative of a similarity between the visual feature vectors of (a) a first set of digital images of the set of digital images associated with the semantic category of the row of the matrix entry and (b) a second set of digital images of the set of digital images associated with the semantic category of the column of the matrix entry.

6. The method of claim 5, wherein:

the calculated probability distributions are Gaussian distributions; and determining, for each matrix entry in the similarity matrix, the data indicative of the similarity between the visual feature vectors comprises:

for each visual feature of the plurality of visual features, generating an overlap coefficient indicative of an overlap between the Gaussian distributions for the visual feature of (a) the first set of digital images and (b) the second set of digital images, generating an averaged overlap coefficient by averaging the overlap coefficients, and providing the averaged overlap coefficient as the data indicative of the similarity between the visual feature vectors.

7. The method of claim 6, wherein grouping, based on the data indicative of similarities between digital images associated with different semantic categories, the plurality of semantic categories into clusters of semantic categories comprises:

grouping, using affinity propagation, the plurality of semantic categories into clusters of semantic categories based on the averaged overlap coefficients of the similarity matrix.

8. A non-transitory computer-readable media comprising instructions for training a machine learning model for recognizing objects based on semantic and visual information associated with the objects, wherein the instructions, when executed by one or more processors on a computing device, are operable to cause the one or more processors to:

access a set of digital images, each digital image comprising an object associated with a semantic category of the object, wherein the semantic category is one of a plurality of semantic categories associated with the set of digital images, and wherein each digital image is labeled with data indicative of the semantic category to which the digital image is associated;

determine, using a trained machine learning model, a visual feature vector for each digital image of the set of digital images, wherein the visual feature vector comprises a value for each of a plurality of visual features;

for each semantic category of the plurality of semantic categories, calculate, for each visual feature of the plurality of visual features, a separate probability distribution of the values of the visual feature in the visual feature vectors of each image in the set of digital images associated with the semantic category;

determine, based on the probability distributions, data indicative of similarities between digital images associated with different semantic categories of the plurality of semantic categories;

group, based on the data indicative of similarities between the digital images associated with different semantic categories, the plurality of semantic categories into clusters of semantic categories;

classify, using the machine learning model, each digital image of the set of digital images, said classifying comprising:

determining, using a first output layer of the machine learning model, a predicted semantic category of the plurality of semantic categories for said digital image, and determining, using a second output layer of the machine learning model, a predicted cluster for said digital image; and training the machine learning model using a loss function, wherein the loss function incorporates data indicative of (i) whether the predicted semantic category for each digital image corresponds to the semantic category associated with said digital image and (ii) whether the predicted cluster for said digital image corresponds to the cluster into which the semantic category associated with said digital image was grouped.

9. The non-transitory computer-readable media of claim 8, wherein, for each image of the set of digital images, the object is food and the semantic category is a food category of the food.

10. The non-transitory computer-readable media of claim 8, wherein the visual feature vector comprises a 1024-dimension space vector, wherein each dimension of the visual feature vector corresponds to a different visual feature.

11. The non-transitory computer-readable media of claim 8, wherein the calculated probability distributions are Gaussian distributions.

12. The non-transitory computer-readable media of claim 8, wherein determining data indicative of similarities between digital images of different semantic categories comprises:

generating a similarity matrix comprising a number of rows and a number of columns that are both equal to a total number of the plurality of semantic categories, such that each row and each column are associated with a semantic category of the plurality of semantic categories; and for each matrix entry in the similarity matrix, determining data indicative of a similarity between the visual feature vectors of (a) a first set of digital images of the set of digital images associated with the semantic category of the row of the matrix entry and (b) a second set of digital images of the set of digital images associated with the semantic category of the column of the matrix entry.

13. The non-transitory computer-readable media of claim 12, wherein:

the calculated probability distributions are Gaussian distributions; and determining, for each matrix entry in the similarity matrix, the data indicative of the similarity between the visual feature vectors comprises:

for each visual feature of the plurality of visual features, generating an overlap coefficient indicative of an overlap between the Gaussian distributions for the visual feature of (a) the first set of digital images and (b) the second set of digital images, generating an averaged overlap coefficient by averaging the overlap coefficients, and providing the averaged overlap coefficient as the data indicative of the similarity between the visual feature vectors.

14. The non-transitory computer-readable media of claim 13, wherein grouping, based on the data indicative of similarities between digital images associated with different semantic categories, the plurality of semantic categories into clusters of semantic categories comprises:

grouping, using affinity propagation, the plurality of semantic categories into clusters of semantic categories based on the averaged overlap coefficients of the similarity matrix.

15. A system for training a machine learning model for recognizing objects based on semantic and visual information associated with the objects, the system comprising:

a memory storing instructions; and a processor configured to execute the instructions to:

access a set of digital images, each digital image comprising an object associated with a semantic category of the object, wherein the semantic category is one of a plurality of semantic categories associated with the set of digital images, and wherein each digital image is labeled with data indicative of the semantic category to which the digital image is associated;

determine, using a trained machine learning model, a visual feature vector for each digital image of the set of digital images, wherein the visual feature vector comprises a value for each of a plurality of visual features;

for each semantic category of the plurality of semantic categories, calculate, for each visual feature of the plurality of visual features, a separate probability distribution of the values of the visual feature in the visual feature vectors of each image in the set of digital images associated with the semantic category;

determine, based on the probability distributions, data indicative of similarities between digital images associated with different semantic categories of the plurality of semantic categories;

group, based on the data indicative of similarities between the digital images associated with different semantic categories, the plurality of semantic categories into clusters of semantic categories;

classify, using the machine learning model, each digital image of the set of digital images, said classifying comprising:

determining, using a first output layer of the machine learning model, a predicted semantic category of the plurality of semantic categories for said digital image, and determining, using a second output layer of the machine learning model, a predicted cluster for said digital image; and training the machine learning model using a loss function, wherein the loss function incorporates data indicative of (i) whether the predicted semantic category for each digital image corresponds to the semantic category associated with said digital image and (ii) whether the predicted cluster for said digital image corresponds to the cluster into which the semantic category associated with said digital image was grouped.

16. The system of claim 15, wherein, for each image of the set of digital images, the object is food and the semantic category is a food category of the food.

17. The system of claim 15, wherein the visual feature vector comprises a 1024-dimension space vector, wherein each dimension of the visual feature vector corresponds to a different visual feature.

18. The system of claim 15, wherein the calculated probability distributions are Gaussian distributions.

19. The system of claim 15, wherein determining data indicative of similarities between digital images of different semantic categories comprises:

generating a similarity matrix comprising a number of rows and a number of columns that are both equal to a total number of the plurality of semantic categories, such that each row and each column are associated with a semantic category of the plurality of semantic categories; and for each matrix entry in the similarity matrix, determining data indicative of a similarity between the visual feature vectors of (a) a first set of digital images of the set of digital images associated with the semantic category of the row of the matrix entry and (b) a second set of digital images of the set of digital images associated with the semantic category of the column of the matrix entry.

20. The system of claim 19, wherein:

the calculated probability distributions are Gaussian distributions; and determining, for each matrix entry in the similarity matrix, the data indicative of the similarity between the visual feature vectors comprises:

for each visual feature of the plurality of visual features, generating an overlap coefficient indicative of an overlap between the Gaussian distributions for the visual feature of (a) the first set of digital images and (b) the second set of digital images, generating an averaged overlap coefficient by averaging the overlap coefficients, and providing the averaged overlap coefficient as the data indicative of the similarity between the visual feature vectors.

21. The system of claim 20, wherein grouping, based on the data indicative of similarities between digital images associated with different semantic categories, the plurality of semantic categories into clusters of semantic categories comprises:

grouping, using affinity propagation, the plurality of semantic categories into clusters of semantic categories based on the averaged overlap coefficients of the similarity matrix.

* * * * *